(12) United States Patent
Yeom

(10) Patent No.: US 10,095,401 B2
(45) Date of Patent: Oct. 9, 2018

(54) METHOD FOR EDITING DISPLAY INFORMATION AND ELECTRONIC DEVICE THEREOF

(71) Applicant: Samsung Electronics Co. Ltd., Suwon-si, Gyeonggi-do (KR)

(72) Inventor: Dong-Hyun Yeom, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 14/016,799

(22) Filed: Sep. 3, 2013

(65) Prior Publication Data
US 2014/0078083 A1    Mar. 20, 2014

(30) Foreign Application Priority Data

Sep. 14, 2012 (KR) .................... 10-2012-0101927

(51) Int. Cl.
| | |
|---|---|
| *G06F 3/01* | (2006.01) |
| *G06F 3/0486* | (2013.01) |
| *G06F 3/0487* | (2013.01) |
| *G06F 3/0488* | (2013.01) |
| *G06F 3/0484* | (2013.01) |

(52) U.S. Cl.
CPC ........ *G06F 3/0488* (2013.01); *G06F 3/04845* (2013.01); *G06F 3/04883* (2013.01); *G06F 3/017* (2013.01); *G06F 3/0486* (2013.01); *G06F 3/0487* (2013.01); *G06F 2203/04807* (2013.01); *G06F 2203/04808* (2013.01)

(58) Field of Classification Search
CPC ...... G06F 3/017; G06F 3/0486; G06F 3/0487; G06F 3/0488; G06F 3/04845; G06F 3/04883; G06F 2203/04808; G06F 2203/04807
USPC ........ 715/770, 769, 773, 863, 864; 345/173, 345/179, 180
See application file for complete search history.

(56) References Cited

U.S. PATENT DOCUMENTS

| | | | |
|---|---|---|---|
| 5,636,336 A | 6/1997 | Adachi | |
| 6,081,818 A * | 6/2000 | Shieh | ............................ 715/210 |
| 2004/0174399 A1* | 9/2004 | Wu et al. | ...................... 345/863 |
| 2006/0048052 A1* | 3/2006 | Lehenbauer et al. | ......... 715/517 |
| 2007/0115264 A1 | 5/2007 | Yu et al. | |
| 2007/0257906 A1* | 11/2007 | Shimura | ................. A63F 13/10 345/419 |
| 2010/0090971 A1 | 4/2010 | Choi et al. | |
| 2011/0202882 A1 | 8/2011 | Forstall et al. | |
| 2012/0166944 A1 | 6/2012 | Cotterill | |
| 2012/0180002 A1* | 7/2012 | Campbell et al. | ............ 715/863 |
| 2013/0132878 A1* | 5/2013 | Tijssen | .......................... 715/770 |

(Continued)

FOREIGN PATENT DOCUMENTS

| | | |
|---|---|---|
| CN | 101356492 A | 1/2009 |
| CN | 102629180 A | 8/2012 |
| CN | 103907086 A | 7/2014 |

(Continued)

*Primary Examiner* — Ting Lee
(74) *Attorney, Agent, or Firm* — Jefferson IP Law, LLP

(57) ABSTRACT

An apparatus and a method for editing display information in an electronic device having a touchscreen are provided. The method includes, when a first edit event occurs with a first touch maintained, storing object information of a first touch point, and when a second touch is detected, displaying an object of the first touch point on a second touch point.

6 Claims, 63 Drawing Sheets

(56) References Cited

U.S. PATENT DOCUMENTS

2014/0043245 A1* 2/2014 Dowd et al. .................. 345/173
2014/0304599 A1 10/2014 Alexandersson

FOREIGN PATENT DOCUMENTS

| JP | 2003-177864 A | 6/2003 |
| JP | 2004054753 A | 2/2004 |
| JP | 2010256969 A | 11/2010 |
| KR | 10-2008-0019742 A | 3/2008 |
| KR | 10-2012-0092037 A | 8/2012 |
| WO | 2010/071630 A1 | 6/2010 |

* cited by examiner

METHOD FOR EDITING DISPLAY INFORMATION AND ELECTRONIC DEVICE THEREOF

CROSS-REFERENCE TO RELATED APPLICATION(S)

This application claims the benefit under 35 U.S.C. § 119(a) of a Korean patent application filed on Sep. 14, 2012 in the Korean Intellectual Property Office and assigned Serial No. 10-2012-0101927, the entire disclosure of which is hereby incorporated by reference.

TECHNICAL FIELD

The present disclosure relates to an electronic device. More particularly, the present disclosure relates to an apparatus and a method for editing display information in an electronic device.

BACKGROUND

With advances in communication technology, multimedia services used by portable electronic devices have increased in popularity. Accordingly, an amount of information to be processed and displayed by the portable electronic device has increased. At the same time, portable electronic devices are now typically provided with a touchscreen that is capable of increasing the size of a display unit by improving space utilization efficiency.

A touchscreen is an Input/Output (I/O) unit for performing input and output of information using one screen. In the case where a portable electronic device uses a touchscreen, the portable electronic device may increase a display area by removing a separate input unit such as a keypad. In case of using the touchscreen as described above, since the electronic device does not have a separate input unit such as a keypad, a manipulation method of the electronic device is different from that of an electronic device having a separate input unit. Furthermore, since the electronic device may display more information via an expanded screen of the touchscreen, the electronic device may require a separate user interface corresponding to the touchscreen.

Accordingly, there is a need for an improved apparatus and device for editing display information in an electronic device having a touchscreen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for editing display information in an electronic device having a touchscreen.

Another aspect of the present disclosure is to provide an apparatus and a method for editing display information according to a sponge edit method in an electronic device having a touchscreen.

Another aspect of the present disclosure is to provide an apparatus and a method for editing display information using a touch pen in an electronic device having a touchscreen.

Another aspect of the present disclosure is to provide an apparatus and a method for editing display information by considering touch information by a touch pen and button input information in an electronic device having a touchscreen.

Another aspect of the present disclosure is to provide an apparatus and a method for editing an icon by considering touch information of a touch pen and button input information in an electronic device having a touchscreen.

Another aspect of the present disclosure is to provide an apparatus and a method for editing text by considering touch information of a touch pen and button input information in an electronic device having a touchscreen.

Another aspect of the present disclosure is to provide an apparatus and a method for editing a reproduction list by considering touch information of a touch pen and button input information in an electronic device having a touchscreen.

In accordance with an aspect of the present disclosure, a method for editing an object displayed on a display unit in an electronic device is provided. The method includes, when a first edit event occurs with a first touch maintained, storing object information of a first touch point, and when detecting a second touch, displaying an object of the first touch point on a second touch point.

In accordance with another aspect of the present disclosure, a method for editing an object displayed on a display unit in an electronic device is provided. The method includes determining an object group including at least one object among a plurality of objects displayed on a display unit, when a first edit event occurs with a first touch of at least one of the objects included in the object group maintained, storing information of the at least one object included in the object group, and when detecting a second touch, displaying the at least one object included in the object group on a second touch point.

In accordance with still another aspect of the present disclosure, a method for editing an object displayed on a display unit in an electronic device is provided. The method includes, when a first edit event occurs with a first touch maintained, determining whether an object has been touched via the first touch, and when the object has been touched via the first touch, cutting the object of the first touch point.

In accordance with further another aspect of the present disclosure, a method for operating an electronic device is provided. The method includes, when detecting a button input of a touch pen with a first touch maintained by the touch pen, cutting at least one object on a first touch point according to a sponge edit method, displaying cutting information of the at least one object on a display unit, and when detecting a button input of the touch pen with a second touch maintained by the touch pen, pasting the cut at least one object on a second touch point according to the sponge edit method.

In accordance with another aspect of the present disclosure, an electronic device is provided. The electronic device includes a touchscreen, at least one processor, and a memory, wherein when a first edit event occurs with a first touch maintained, the processor may store information of an object of a first touch point in the memory, and when detecting a second touch, display the object of the first touch point on a second touch point of the touchscreen.

In accordance with another aspect of the present disclosure, an electronic device is provided. The electronic device includes a touchscreen, at least one processor, and a memory, wherein the processor may determine an object group including at least one of a plurality of objects displayed on the touchscreen, when a first edit event occurs with a first touch of one of the objects included in the object group maintained, store information of the at least one object included in the object group in the memory, when detecting a second touch, display at least one object included in the object group on a second touch point of the touchscreen.

In accordance with another aspect of the present disclosure, an electronic device is provided. The electronic device includes a touchscreen, at least one processor, and a memory, wherein when a first edit event occurs with a first touch maintained, the processor may determine whether an object is touched via the first touch, and when the object is touched via the first touch, cut the object of a first touch point.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings in which.

Throughout the drawings, like reference numerals will be understood to refer to like parts, components and structures.

DETAILED DESCRIPTION

Figure 1:
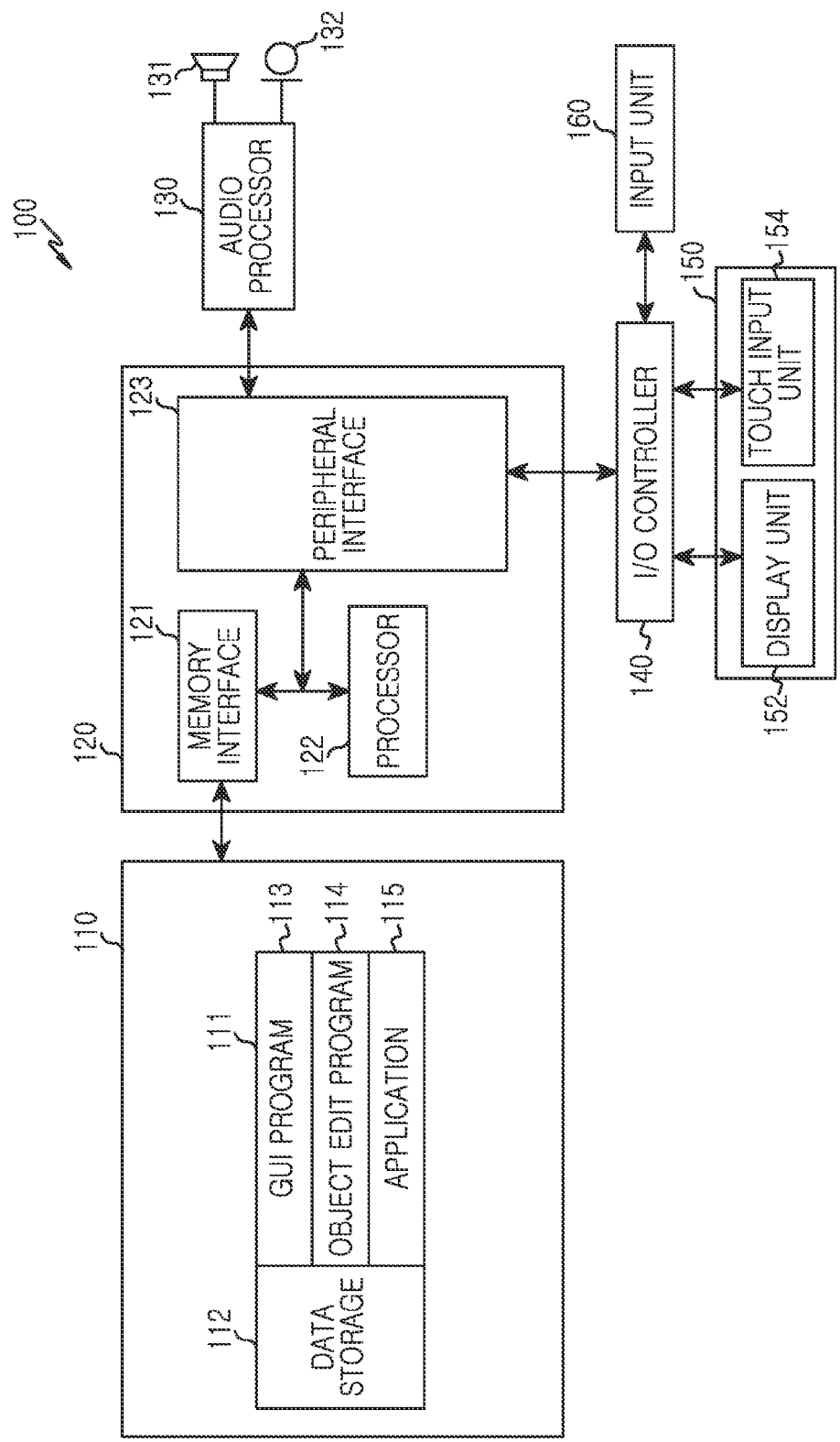
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure provide a technology for editing display information in an electronic device having a touchscreen. Here, the display information is information displayed on a display unit to provide a service in an electronic device and may include an object forming a screen displayed on the display unit for an interface between the electronic device and a user using graphics.

In the following description, the term "electronic device" denotes any of a plurality of devices and may be a device such as a portable electronic device, a portable terminal, a mobile station, a Personal Digital Assistant (PDA), a laptop computer, a smart phone, a net-book, a television (TV), a Mobile Internet Device (MID), an Ultra Mobile Personal Computer (UMPC), a tablet Personal Computer (PC), a desktop computer, a smart TV, a digital camera, a wrist watch, a navigation device, an MP3 player, etc. Also, the electronic device may be an arbitrary wireless device that combines the functions of two or more devices among the above devices.

Also, in the following description, the electronic device may edit an object according to a sponge edit method. The electronic device may perform editing such as copy, move, cut, paste, delete, etc. on an object using the sponge edit method. In the following description, it may be assumed that the electronic device performs editing of cut and paste on an object according to the sponge edit method. However, the electronic device may provide editing such as move and copy via the sponge edit method in the same manner. Here, the sponge edit method may denote an edit method in which an object touched by a touch pen or a finger is absorbed into the touch pen or the finger similar to a sponge or pipette absorbing liquid, and the previously absorbed object is emitted and displayed on a point touched by the touch pen or the finger similar to the sponge or pipette emitting liquid.

FIG. 1 is a block diagram illustrating an electronic device according to an embodiment of the present disclosure.

Referring to FIG. 1, the electronic device 100 may include a memory 110, a processor unit 120, an audio processor 130, an Input/Output (I/O) controller 140, a touchscreen 150, and an input unit 160. Here, a plurality of memories 110 may exist.

The memory 110 may include a program storage 111 for storing a program for controlling an operation of the electronic device 100, and a data storage 112 for storing data occurring during execution of a program.

The data storage 112 may store an object cut by an object edit program 114. In the case where a delete event occurs, the data storage 112 may delete object information stored via cut.

The program storage 111 may include a Graphic User Interface (GUI) program 113, the object edit program 114, and at least one application 115. Here, a program included in the program storage 111 is a set of instructions and may be expressed as an instruction set.

The GUI program 113 may include at least one software element for providing a user interface using graphics on a display unit 152. The GUI program 113 may control to display application information driven by a processor 122 on the display unit 152. At this point, the GUI program 113 may control to represent a sponge effect of an object edit by the object edit program 114. For example, in case of cutting an object touched by a touch pen or a finger, the GUI program 113 may control to represent an effect illustrating the object being absorbed by the touch pen or the finger similar to a sponge or pipette absorbing liquid. Also, the GUI program 113 may control to represent an effect of displaying a previously absorbed object on a point touched by the touch pen or the finger like the sponge emitting liquid.

The object edit program 114 may include at least one software element for editing an object by considering of touch information detected via a touch input unit 154 and edit event occurrence information. For example, in the case where a cut event occurs based on the maintaining of a first touch on an object, the object edit program 114 may control to cut the object of the first touch point. After that, in the case where a second touch is detected, the object edit program 114 may control to paste the cut object on the second touch point. At this point, in the case where a paste event occurs with the second touch maintained, the object edit program 114 may control to paste the cut object on the second touch point. Here, the object edit program 114 may detect cut event occurrence and paste event occurrence using at least one input method of a button input of the touch pen, a hardware button input of the electronic device, an icon selection, a motion detection of the electronic device, a user gesture detection, etc. Also, a cut event and a paste event may be generated by the same input method or different input methods.

For another example, in the case where a cut event occurs by maintaining a first touch on at least one object included in an object group, the object edit program 114 may control to cut an object included in the object group. After that, when detecting a second touch, the object edit program 114 may control to paste the cut object of the object group on the second touch point. At this point, in the case where a paste event occurs with the second touch maintained, the object edit program 114 may control to paste the cut object on the second touch point.

For another example, in the case where an edit event occurs by maintaining a touch detected via the touch input unit 154, the object edit program 114 may determine whether a touch of an object occurs. For example, the object edit program 114 may determine that the touch of the object occurs by comparing an object recognize region with a touch point. In the case where a touch of an object occurs, the object edit program 114 may control to cut the object on the touch point. Meanwhile, in the case where the touch of the object does not occur, the object edit program 114 may control to paste a previously cut object on the touch point. At this point, the object edit program 114 may recognize an object recognize region differently depending on a touch method. For example, in the case where a touch is detected via the touch pen, the object edit program 114 may recognize an object recognize region narrower than in the case where a touch is detected by a hand.

In case of cutting a plurality of objects, the object edit program 114 may control to paste at least one of the plurality of cut objects selected by a user.

The application 115 may include a software element for at least one application installed in the electronic device 100.

The processor unit 120 may include a memory interface 121, at least one processor 122, and a peripheral interface 123. Here, the memory interface 121, the at least one processor 122, and the peripheral interface 123 included in the processor unit 120 may be integrated in at least one Integrated Circuit (IC) or implemented as separate elements.

The memory interface 121 may control an access of the memory 110 by an element such as the processor 122 or the peripheral interface 123.

The peripheral interface 123 may control connection between I/O peripherals of the electronic device 100 and the processor 122 and the memory interface 121.

The processor 122 may control the electronic device 100 to provide various multimedia services using at least one software program. At this point, the processor 122 may control to execute at least one program stored in the memory 110 and provide a service corresponding to the relevant program. For example, the processor 122 may execute the object edit program 114 stored in the program storage 111 to edit an object by considering touch information detected via the touch input unit 154 and edit event occur information.

The audio processor 130 may provide an audio interface between a user and the electronic device 100 via a speaker 131 and a microphone 132. For example, in case of cutting an object according to a sponge edit method, the audio processor 130 generates a sound via the speaker 131 as if the object were being absorbed by a sponge or pipette. For another example, in case of pasting an object according to the sponge edit method, the audio processor 130 may generate a sound via the speaker as if the object were emitted.

The I/O controller 140 may provide an interface between an I/O unit such as the touchscreen 150 and the input unit 160 and the peripheral interface 123.

The touchscreen 150 is an I/O unit for performing output of information and input of information, and may include the display unit 152 and the touch input unit 154.

The display unit 152 may display state information of the electronic device 100, a character input by a user, a moving picture, a still picture, etc. For example, the display unit 152 may display application information driven by the processor 122. For another example, in the case where the object edit program 114 performs a cut on an object, the display unit 152 may represent an animation effect as if the relevant object were being absorbed by the touch pen or the finger that has touched the object similar to a sponge or pipette absorbing liquid. For still another example, in the case where the object edit program 114 performs paste on an object, the display unit 152 may represent an animation effect as if the object were emitted from the touch pen or the finger like the sponge or pipette emitting liquid.

The touch input unit 154 may provide touch information detected via a touch panel to the processor unit 120 via the I/O controller 140. At this point, the touch input unit 154 may provide touch information by the touch pen or the finger to the processor unit 120 via the I/O controller 140.

The input unit 160 may provide input data generated by a user's selection to the processor unit 120 via the I/O controller 140. For example, the input unit 160 includes only a control button for controlling the electronic device 100. For another example, the input unit 160 may include a keypad for receiving input data from a user.

Though not shown, the electronic device 100 may further include a communication system for performing a communication function for voice communication and data communication. At this point, the communication system may be classified into a plurality of communication submodules supporting different communication networks. For example, though not limited thereto, the communication network may include a Global System for Mobile Communication (GSM) network, an Enhanced Data GSM Environment (EDGE) network, a Code Division Multiple Access (CDMA) network, a Wideband CDMA (WCDMA) network, a Long Term Evolution (LTE) network, an Orthogonal Frequency Division Multiple Access (OFDMA) network, a wireless Local Area Network (LAN), a Bluetooth network, a Near Field Communication (NFC), etc.

In the above embodiment, the processor 122 may execute software elements stored in the program storage 111 inside one module to edit an object.

Figure 2:
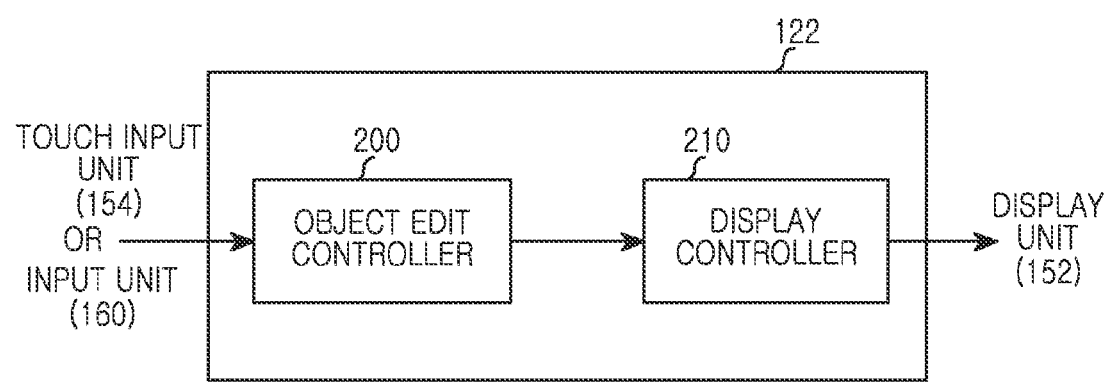
FIG. 2 is a block diagram illustrating a processor according to an embodiment of the present disclosure.

In another embodiment, the processor 122 may be configured to include elements for editing an object as separate modules as illustrated in FIG. 2.

FIG. 2 is a block diagram illustrating a processor according to an embodiment of the present disclosure.

Referring to FIG. 2, the processor 122 may include an object edit controller 200, and a display controller 210.

The object edit controller 200 may execute the object edit program 114 stored in the program storage 111 to edit an object. For example, in the case where a cut event occurs with a first touch of an object maintained, the object edit controller 200 may cut an object on the first touch point. After that, when detecting a second touch, the object edit controller 200 may paste the cut object on the second touch point. At this point, in the case where a paste event occurs with the second touch maintained, the object edit controller 200 may paste the cut object on the second touch point. Here, the object edit controller 200 may detect occurrence of a cut event and occurrence of a paste event using at least one input method of a button input of the touch pen, a hardware button input of the electronic device, an icon selection, a motion detection of the electronic device, a user gesture detection, etc. At this point, the cut event and the paste event may be generated by the same input method or other input methods.

For another example, in the case where a cut event occurs by maintaining a first touch of at least one object included in an object group, the object edit controller 200 may cut the object included in the object group. After that, when detecting a second touch, the object edit controller 200 may paste the cut object of the object group on the second touch point. At this point, in the case where a paste event occurs with the second touch maintained, the object edit controller 200 may paste the cut object on the second touch point.

For another example, in the case where an edit event occurs by maintaining a touch detected via the touch input unit 154, the object edit controller 200 may determine whether a touch of the object occurs. At this point, the object edit controller 200 may determine whether the touch of the object occurs by comparing an object recognize region with a touch point. In the case where the touch of the object occurs, the object edit controller 200 may cut the object on the touch point. In contrast, in the case where the touch of the object does not occur, the object edit controller 200 may paste a previously cut object on the touch point. At this point, the object edit controller 200 may recognize an object recognize region differently depending on a touch method. For example, in the case where a touch is detected via the touch pen, the object edit controller 200 may recognize an object recognize region narrower than that in the case where a touch is detected by a hand.

In case of cutting a plurality of objects, the object edit controller 200 may control to paste at least one of the plurality of cut objects selected by a user.

The display controller 210 may control to execute the GUI program 113 stored in the program storage 111 and display a user interface using graphics on the display unit 152. For example, the display controller 210 may control to display information of an application driven by the processor 122 on the display unit 152. For another example, in the case where the object edit controller 200 performs a cut of an object, the display controller 210 may control to represent an animation effect as if a relevant object were absorbed into the touch pen or the finger that has touched the object similar to a sponge or pipette absorbing liquid. For still another example, in the case where the object edit controller 200 performs paste on an object, the display controller 210 may control to represent an animation effect as if the object were emitted from the touch pen or the finger like a sponge emitting liquid.

Though not shown, the processor 122 may further include an audio controller for controlling to generate sound effects depending on the sponge edit method. For example, in the case where the object edit controller 200 cuts an object, the audio controller may control to generate a sound via the speaker 131 as if the object were absorbed. For another example, in the case where the object edit controller 200 pastes an object, the audio controller may control to generate a sound via the speaker 131 as if the object were emitted.

As described above, the electronic device may edit an object by considering touch information and edit event occurrence information. Accordingly, to discriminate an object edit function from a different service that may occur by considering touch information, the electronic device may switch to an object edit mode and edit an object by considering touch information and edit event occurrence information. Here, the electronic device may enter the object edit mode using at least one input method of a button input of the touch pen, a hardware button input of the electronic device, an icon selection, a motion detection of the electronic device, a user gesture detection, etc.

In the above embodiment, the object edit controller 200 may cut an object on a first touch point and paste the cut object on a second touch point. At this point, the object edit controller 200 may paste the cut object by considering whether an object exists on the second touch point. For example, in the case where another object exists on the second touch point, the object edit controller 200 may change the position of another object existing on the second touch point and paste the cut object on the second touch point. For another example, the object edit controller 200 may change the paste position on which the cut object is to be pasted to a point on which another object does not exist and paste the cut object.

Figure 3:
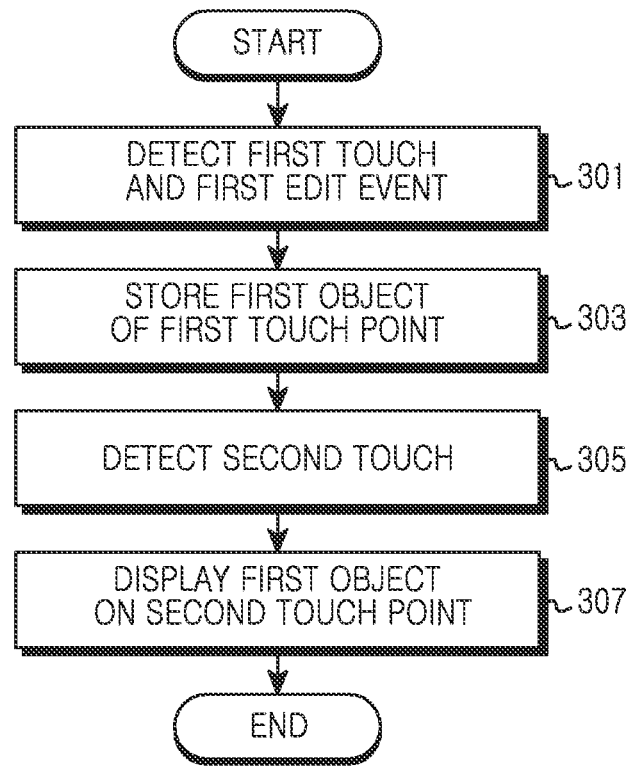
FIG. 3 is a flowchart illustrating a procedure for editing display information in an electronic device according to an embodiment of the present disclosure.

FIG. 3 is a flowchart illustrating a procedure for editing display information in an electronic device according to an embodiment of the present disclosure.

Referring to FIG. 3, when a first edit event occurs upon maintaining of a first touch of a first object in operation 301, the electronic device may proceed to operation 303 to store the first object. At this point, the electronic device generates an animation edit effect as if the first object were absorbed into the touch pen or the finger that has touched the first object according to the sponge edit method. Here, the electronic device may detect occurrence of a first edit event by considering at least one of button input information of the touch pen, hardware button input information of the electronic device, icon selection information, motion detection information of the electronic device, user gesture detection information, etc.

After that, the electronic device may proceed to operation 305 and when detecting a second touch, proceed to operation 307 to display the first object stored in operation 303 on the second touch point. For example, the electronic device may generate an animation effect as if the first object were emitted from the touch pen or the finger according to the sponge edit method and display the first object on the second touch point.

Figure 4:
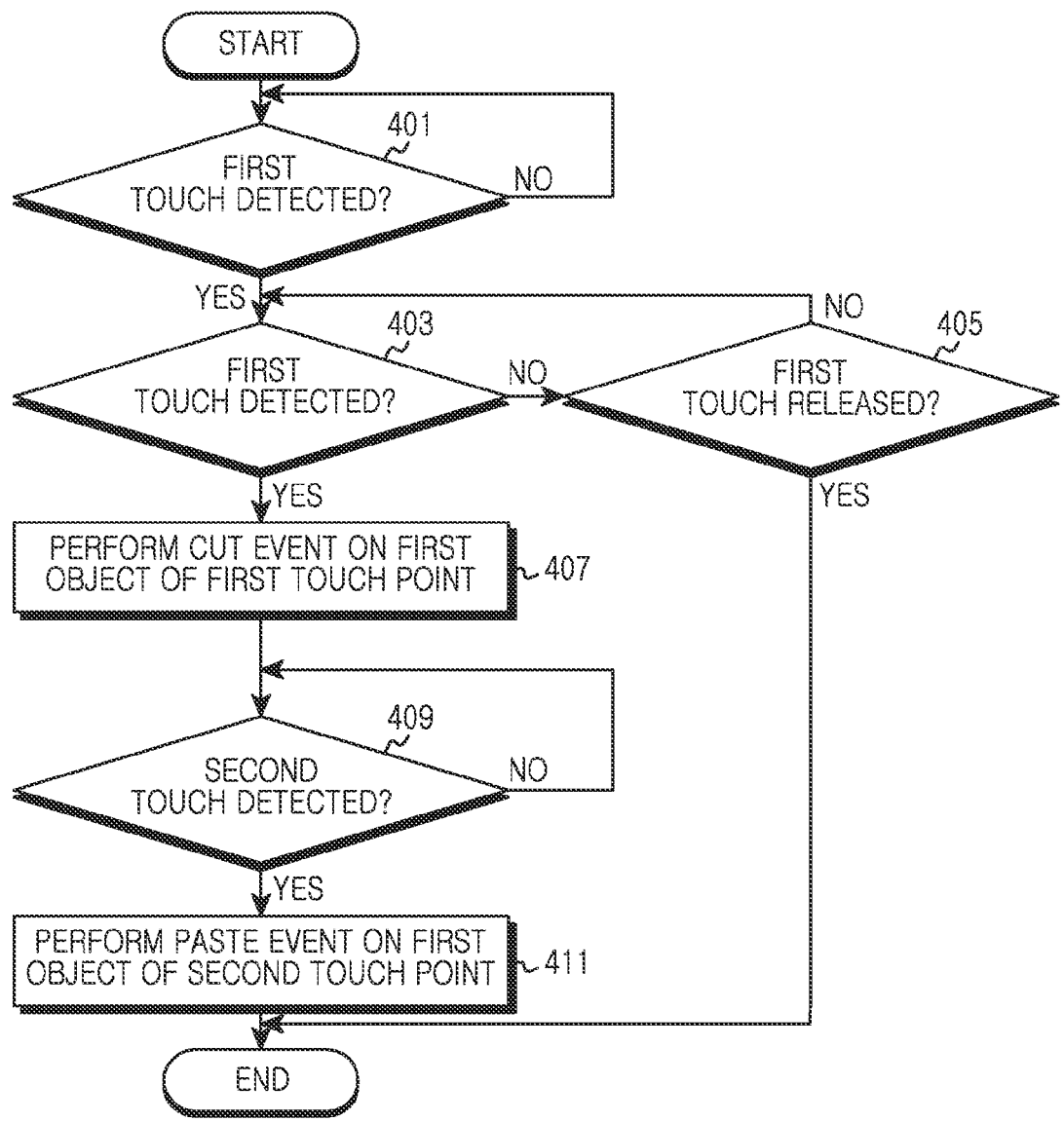
FIG. 4 is a flowchart illustrating a procedure for editing display information using a sponge edit method in an electronic device according to an embodiment of the present disclosure.

FIG. 4 is a flowchart illustrating a procedure for editing display information using a sponge edit method in an electronic device according to an embodiment of the present disclosure.

Referring to FIG. 4, the electronic device may determine whether a first touch of a first object is detected in operation 401. For example, the electronic device may determine whether the first touch of the first object is detected via the touch input unit 154.

When detecting the first touch of the first object, the electronic device may proceed to operation 403 to determine whether a first edit event occurs by maintaining of the first touch. For example, the electronic device may determine whether a cut event occurs by considering at least one of button input information of the touch pen, hardware button input information of the electronic device, icon selection information, motion detection information of the electronic device, user gesture detection information with the first touch maintained, etc.

In the case where the first edit event does not occur, the electronic device may proceed to operation 405 to determine whether the first touch is released.

In the case where the first touch is released, the electronic device may recognize it does not perform editing on the first object. Accordingly, the electronic device ends the present algorithm.

In the case where the first touch is not released, the electronic device may proceed to operation 403 to determine whether the first edit event occurs by maintaining of the first touch.

In the case where the first edit event occurs with the first touch maintained in operation 403, the electronic device may proceed to operation 407 to cut the first object on the first touch point. At this point, the electronic device generates an animation effect as if the first object were absorbed into the touch pen or the finger that has touched the first object according to the sponge edit method. The electronic device may generate a sound as if the first object were absorbed according to the sponge edit method. Here, the electronic device may store the cut first object in the data storage 112.

After that, the electronic device may proceed to operation 409 to determine whether a second touch is detected. For example, the electronic device may determine whether the second touch is detected via the touch input unit 154.

When detecting the second touch, the electronic device may proceed to operation 411 to paste the first object cut in operation 407 on the second touch point. For example, the electronic device may generate an animation effect as if the first object were emitted from the touch pen or the finger that has touched the second touch point according to the sponge edit method and display the first object on the second touch point. The electronic device may generate a sound as if the first object were emitted according to the sponge edit method.

As described above, the electronic device may paste the cut first object on the second touch point. At this point, the electronic device may delete cut information of the first object from the data storage 112. For another example, the electronic device may store the cut information of the first object in the data storage 112 until a cancel event of the first object occurs. Here, in case of receiving button input information from the touch pen not touching the screen, the electronic device may recognize that the cancel event has occurred. For still another example, the electronic device may store the cut information of the first object in the data storage 112 for a reference time after performing paste on the first object.

The electronic device may paste the first object by considering whether an object exists on the second touch point. For example, in the case where another object exists on the second touch point, the electronic device may change the position of the other object existing on the second touch point and paste the first object on the second touch point. For another example, the electronic device may change the paste position of the first object to a point on which another object does not exist and paste the first object.

Figure 5:
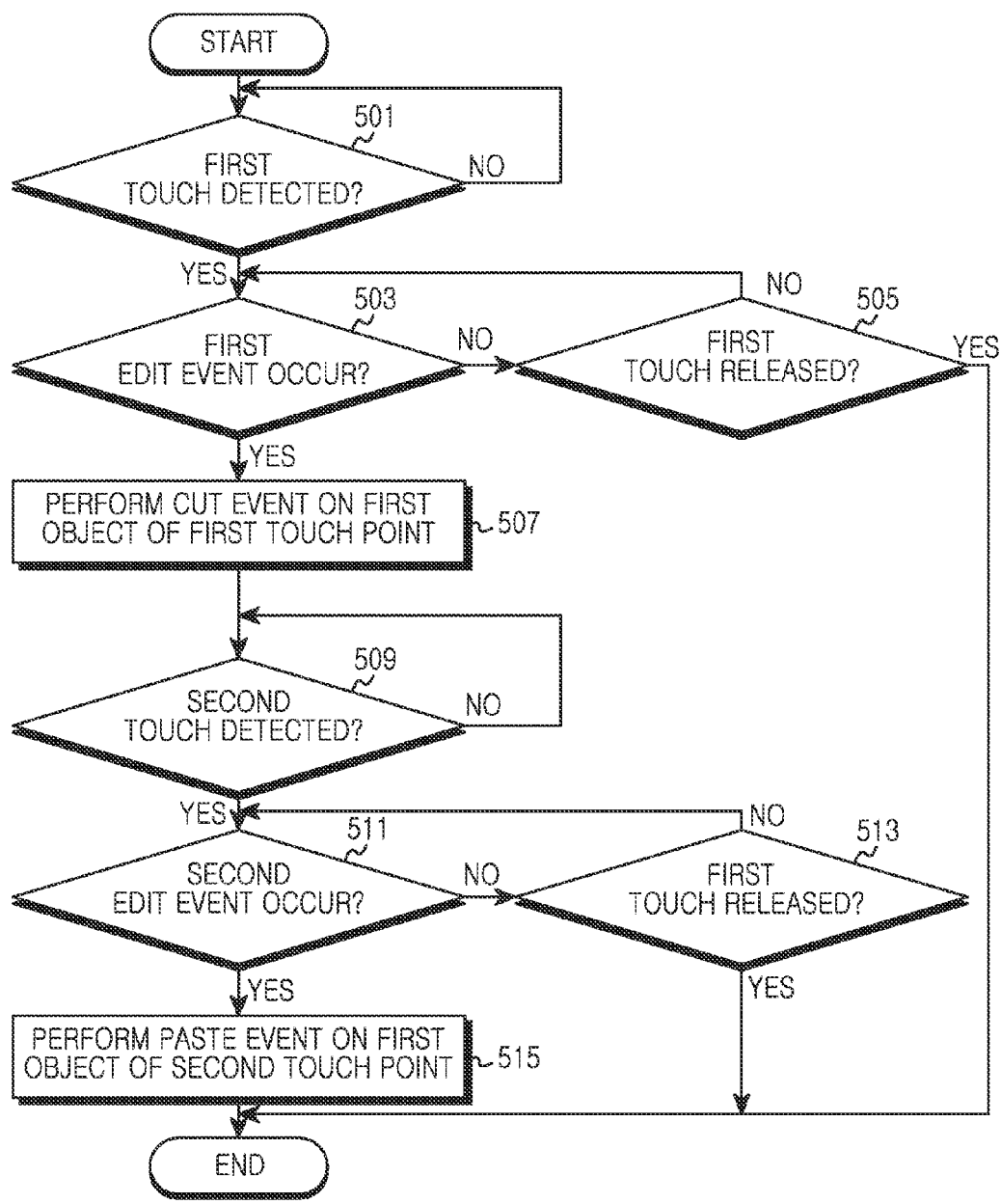
FIG. 5 is a flowchart illustrating a procedure for editing display information using a sponge edit method in an electronic device according to an embodiment of the present disclosure.

FIG. 5 is a flowchart illustrating a procedure for editing display information using a sponge edit method in an electronic device according to another embodiment of the present disclosure.

Referring to FIG. 5, the electronic device may determine whether a first touch of a first object is detected in operation 501. For example, the electronic device may determine whether the first touch of the first object is detected via the touch input unit 154.

When detecting the first touch of the first object, the electronic device may proceed to operation 503 to determine whether a first edit event occurs through maintaining of the first touch. For example, the electronic device may determine whether a cut event occurs by considering at least one of button input information of the touch pen, hardware button input information of the electronic device, icon selection information, motion detection information of the electronic device, user gesture detection information, etc.

In the case where the first edit event does not occur, the electronic device may proceed to operation 505 to determine whether the first touch is released.

In the case where the first touch is released, the electronic device may recognize it does not perform editing on the first object. Accordingly, the electronic device may end the present algorithm.

In the case where the first touch is not released, the electronic device may proceed to operation 503 to determine whether the first edit event occurs with the first touch maintained.

In the case where the first edit event occurs with the first touch maintained in operation 503, the electronic device may proceed to operation 507 to cut the first object on the first touch point. At this point, the electronic device generates an animation effect as if the first object were absorbed into the touch pen or the finger that has touched the first object according to the sponge edit method. Additionally, the electronic device may generate a sound as if the first object were absorbed according to the sponge edit method. Here, the electronic device may store the cut first object in the data storage 112.

After that, the electronic device may proceed to operation 509 to determine whether a second touch is detected. For example, the electronic device may determine whether the second touch is detected via the touch input unit 154.

When detecting the second touch, the electronic device may proceed to operation 511 to determine whether a second edit event occurs through maintaining of the second touch. For example, the electronic device may determine whether a paste event occurs by considering at least one of button input information of the touch pen, hardware button input information of the electronic device, icon selection information, motion detection information of the electronic device, user gesture detection information with the second touch maintained, etc.

In the case where the second edit event does not occur, the electronic device may proceed to operation 513 to determine whether the second touch is released.

In the case where the second touch is released, the electronic device may recognize it does not perform editing on the first object. Accordingly, the electronic device may end the present algorithm. At this point, the electronic device may restore the cut first object to a previous state of the cut event occurrence.

In contrast, in the case where the second touch is not released, the electronic device may proceed to operation 511 to determine whether the second edit event occurs with the second touch maintained.

Meanwhile, in the case where the second edit event occurs by maintaining of the second touch in operation 511, the electronic device may proceed to operation 515 to paste the first object cut in operation 507 on the second touch point. For example, the electronic device may generate an animation effect as if the first object were emitted from the touch pen or the finger that has touched the second touch point according to the sponge edit method and display the first object on the second touch point. Additionally, the electronic device may generate a sound as if the first object were emitted according to the sponge edit method.

As described above, the electronic device may paste the cut first object on the second touch point. At this point, the electronic device may delete cut information of the first object from the data storage 112. For another example, the electronic device may store the cut information of the first object in the data storage 112 until a cancel event of the first object occurs. Here, the electronic device may determine a cancel event by considering button input information of the touch pen not touching the screen. For still another example, the electronic device may perform paste on the first object and store the cut information of the first object in the data storage 112 for a reference time.

The electronic device may paste the first object by considering whether an object exists on a second touch point. For example, in the case where another object exists on the second touch point, the electronic device may change the position of another object existing on the second touch point and paste the first object on the second touch point. For another example, the electronic device may change the paste position of the first object to a point on which another object does not exist and paste the first object.

Figure 6:
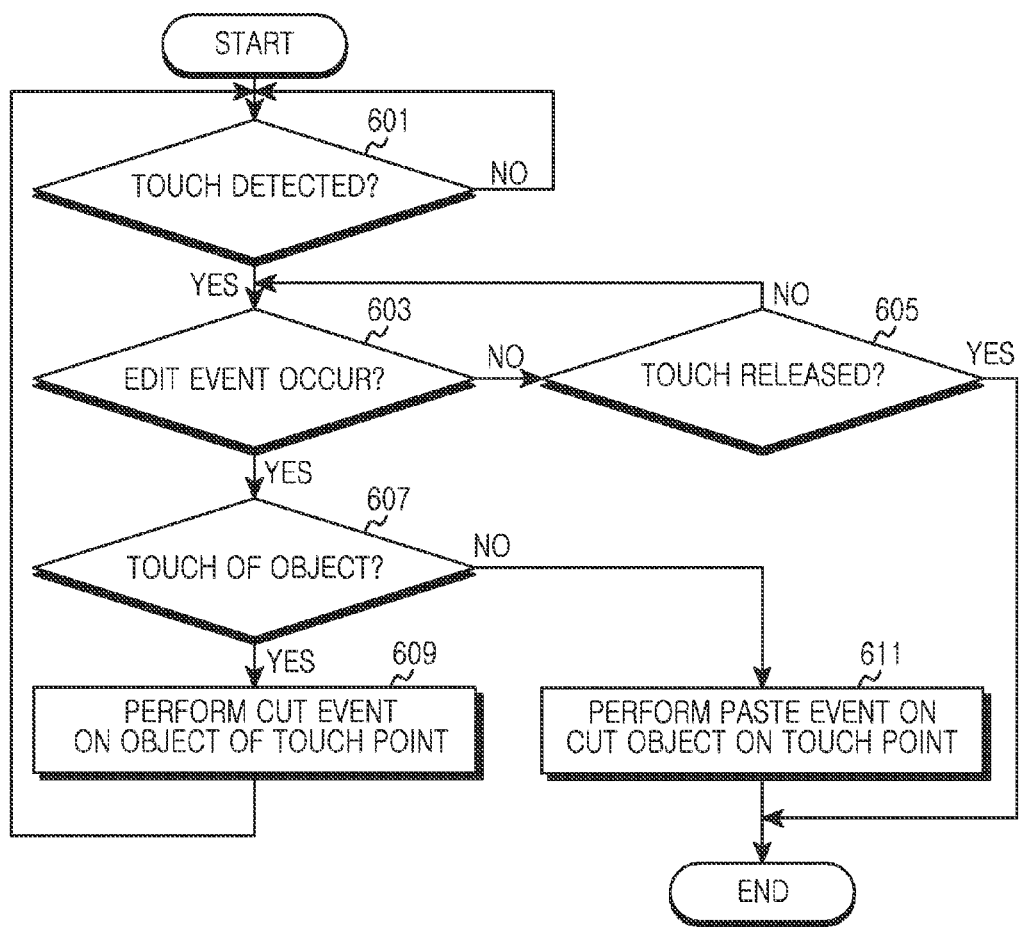
FIG. 6 is a flowchart illustrating a procedure for editing display information using a sponge edit method in an electronic device according to an embodiment of the present disclosure.

FIG. 6 is a flowchart illustrating a procedure for editing display information using a sponge edit method in an electronic device according to still another embodiment of the present disclosure.

Referring to FIG. 6, the electronic device may determine whether a touch is detected in operation 601. For example, the electronic device may determine whether a touch is detected via the touch input unit 154.

When detecting the touch, the electronic device may proceed to operation 603 to determine whether an edit event occurs by maintaining of the touch. For example, the electronic device may determine whether an edit event occurs by considering at least one of button input information of the touch pen, hardware button input information of the electronic device, icon selection information, motion detection information of the electronic device, user gesture detection information with the touch maintained, etc.

In the case where the edit event occurs, the electronic device may proceed to operation 605 to determine whether the touch is released.

In the case where the touch is released, the electronic device may recognize it does not perform object editing. Accordingly, the electronic device may end the present algorithm.

In the case where the touch is not released, the electronic device may proceed to operation 603 to determine whether an edit event occurs with the touch maintained.

In the case where an edit event occurs by maintaining of the touch in operation 603, the electronic device may proceed to operation 607 to determine whether an object exists on the touch point detected in operation 601. For example, the electronic device may determine whether the touch of the object has occurred by comparing an object recognize region with the touch point. At this point, the electronic device may recognize the object recognize region differently depending on a touch method. More specifically, when detecting a touch by the touch pen, the electronic device may recognize it may perform a more detailed touch using the touch pen than a case by a hand touch. Accordingly, the electronic device may recognize an object recognize region narrower than that in a case of detection by the hand touch. Here, a region that may recognize a relevant object may be represented by considering touch information.

In the case where a touch of the object occurs in operation 607, the electronic device may proceed to operation 609 to cut the object on the touch point. At this point, the electronic device generates an animation effect as if the object touched by the touch pen or the finger were absorbed into the touch pen or the finger according to the sponge edit method. The electronic device may generate a sound as if the object were absorbed according to the sponge edit method. Here, the electronic device may store the cut first object in the data storage 112.

In the case where a touch of the object does not occur in operation 607, the electronic device may proceed to operation 611 to paste a previously cut object on the touch point. For example, the electronic device may generate an animation effect as if the previously cut object were emitted from the touch pen or the finger that has touched the touch point according to the sponge edit method and display the object on the touch point. The electronic device may generate a sound as if the object were emitted according to the sponge edit method.

As described above, the electronic device may paste the cut object on the touch point where an object does not exist. At this point, the electronic device may delete cut information of the object from the data storage 112. For another example, the electronic device may store the cut information of the object in the data storage 112 until a cancel event of the object occurs. Here, the electronic device may determine a cancel event by considering button input information of the touch pen not touching the screen.

FIGS. 11A, 11B, 11C, 11D, 11E, 11F, and 11G are views illustrating a screen configuration for editing an icon using a touch pen in an electronic device according to an embodiment of the present disclosure.

Figure 11A:
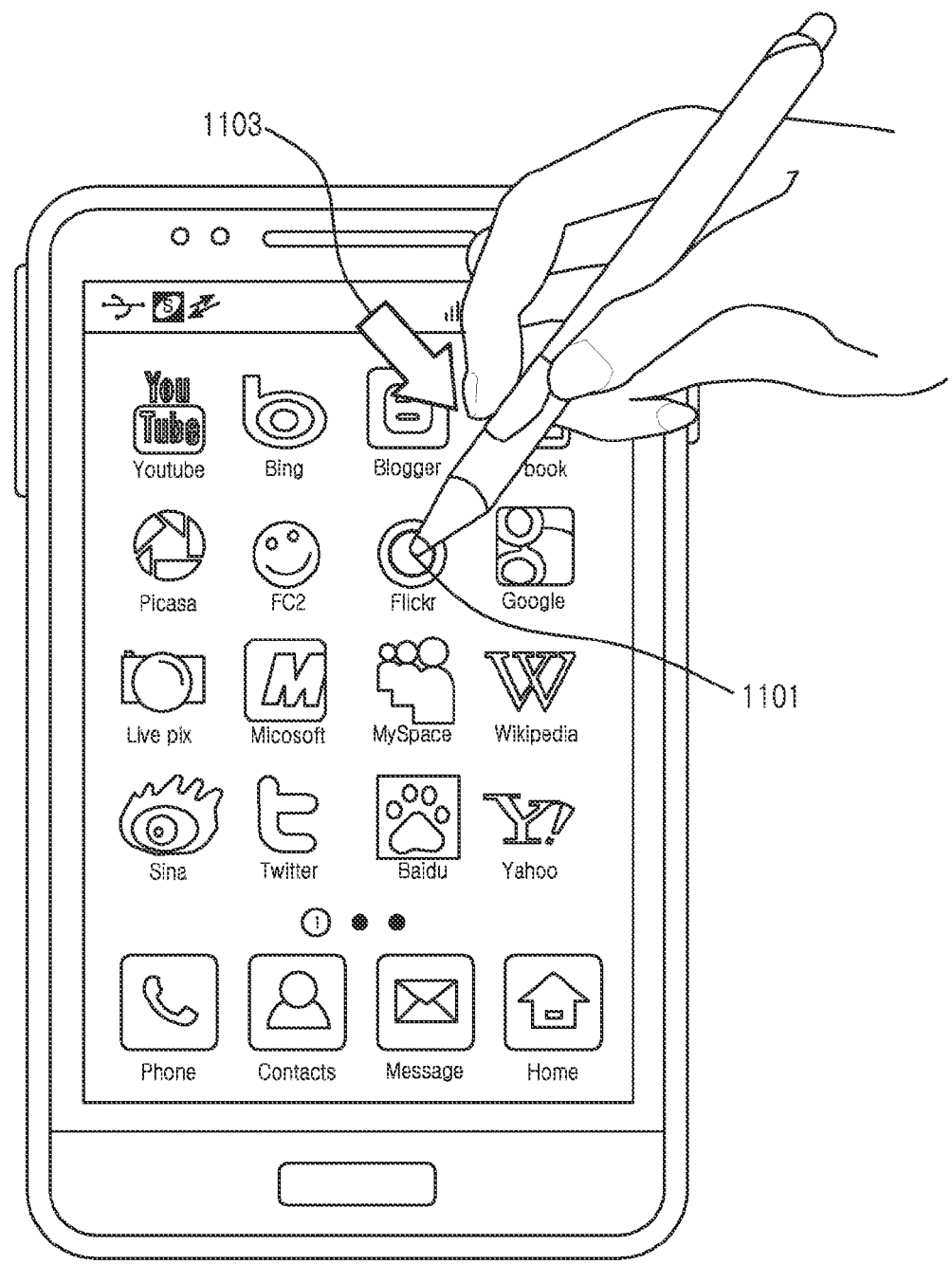
FIGS. 11A, 11B, 11C, 11D, 11E, 11F, and 11G are views illustrating a screen configuration for editing an icon using a touch pen in an electronic device according to an embodiment of the present disclosure.
Figure 11B:
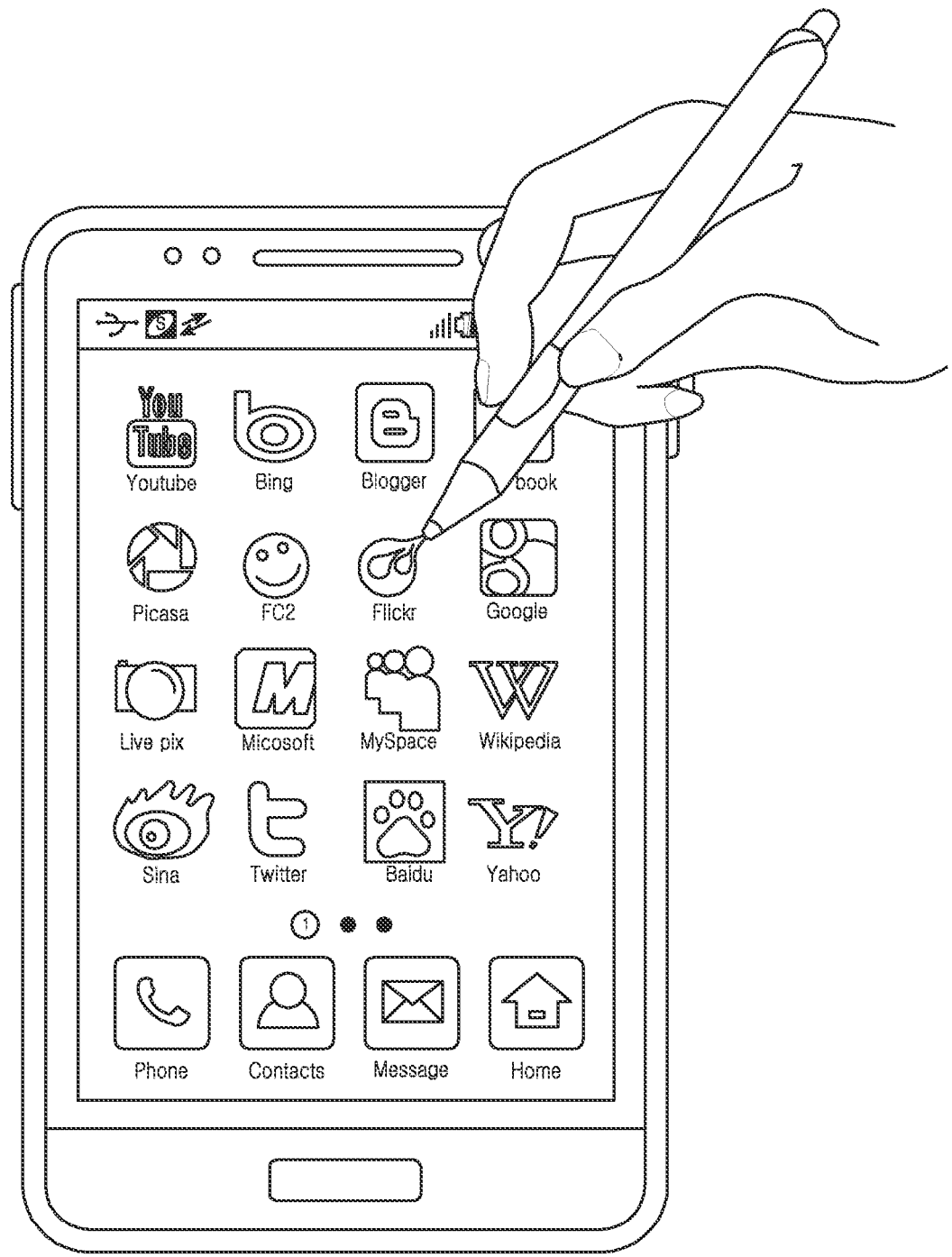

As illustrated in FIGS. 3 to 6, the electronic device may edit a touched object by considering touch information detected via the touch input unit 154 and edit event occurrence information. For example, as illustrated in FIG. 11A, when detecting a button input 1103 of the touch pen by maintaining of a touch 1101 of an icon "Flickr" by the touch pen, the electronic device may cut the icon "Flickr". At this point, as illustrated in FIG. 11B, the electronic device may cut the icon "Flickr" with an animation effect as if the icon "Flickr" were absorbed into the touch pen like a sponge or pipette absorbing liquid. Similarly with an operation of absorbing liquid using a pipette, the electronic device may cut the icon "Flickr" using the sponge effect at a point at which a button input is released after the button input 1103 of the touch pen has been detected.

Figure 11C:

In case of cutting the icon "Flickr", the electronic device may rearrange icons displayed on the display unit 152 as illustrated in FIG. 11C. The electronic device may display a notice icon 1111 representing whether a cut icon exists as illustrated in FIG. 11C. At this point, the notice icon 1111 may represent the number of cut icons.

Figure 11D:
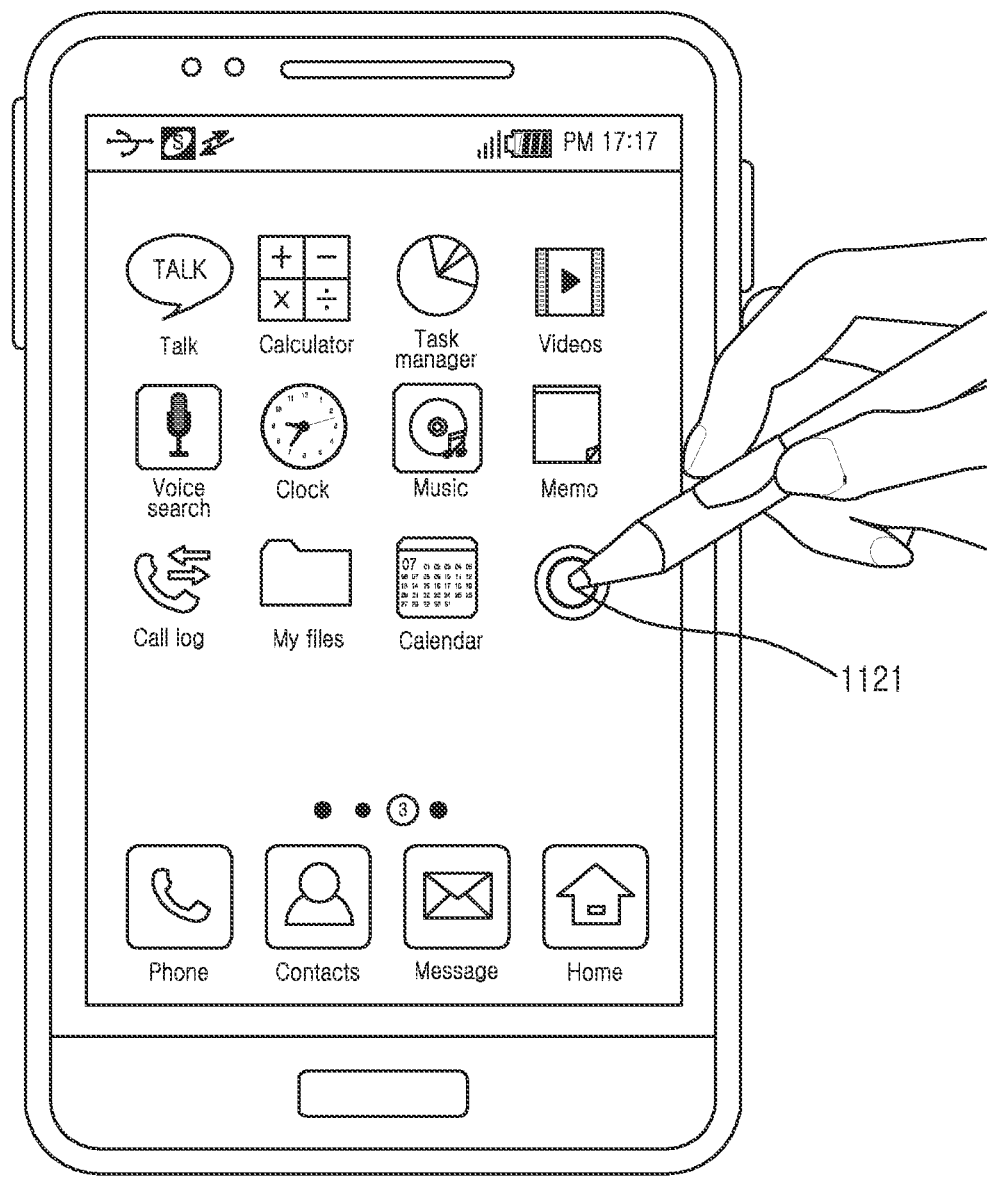
Figure 11E:
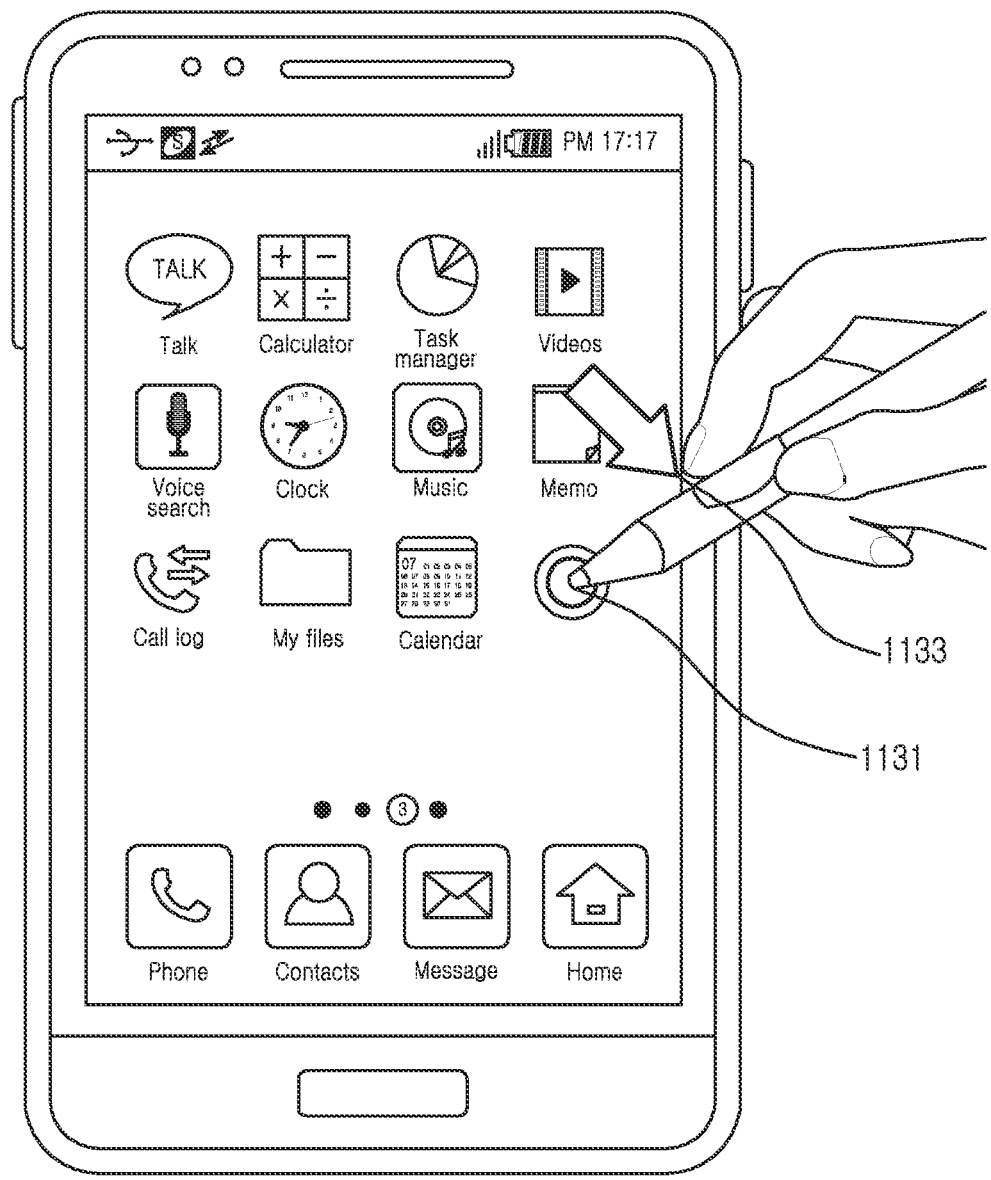
Figure 11F:
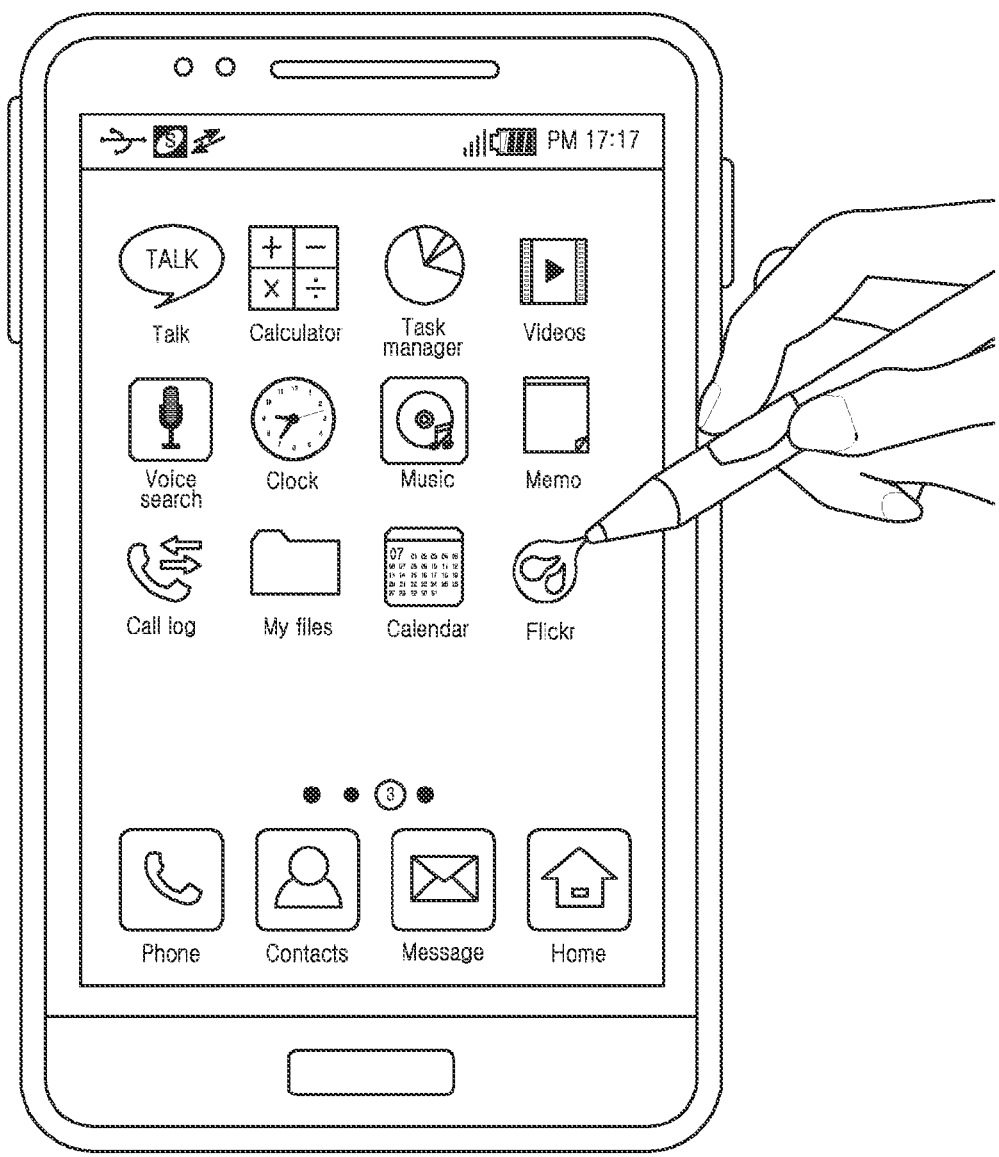
Figure 11G:

After cutting the icon "Flickr", when detecting a second touch 1121 as illustrated in FIG. 11D, the electronic device may paste the cut icon "Flickr" on the second touch point as illustrated in FIG. 11G. At this point, as illustrated in FIG. 11F, the electronic device may paste the icon "Flickr" on the second touch point with an animation effect as if the icon "Flickr" were emitted from the touch pen like a sponge or pipette emitting liquid.

After cutting the icon "Flickr", when detecting a button input 1133 of the touch pen with the second touch 1131 maintained as illustrated in FIG. 11E, the electronic device may paste the icon "Flickr" on the second touch point. At this point, as illustrated in FIG. 11F, the electronic device may paste the icon "Flickr" on the second touch point with an animation effect as if the icon "Flickr" were emitted from the touch pen like a sponge or pipette emitting liquid.

FIGS. 12A, 12B, 12C, 12D, and 12E are views illustrating a screen configuration for editing an icon using a hand touch in an electronic device according to an embodiment of the present disclosure.

Figure 12A:
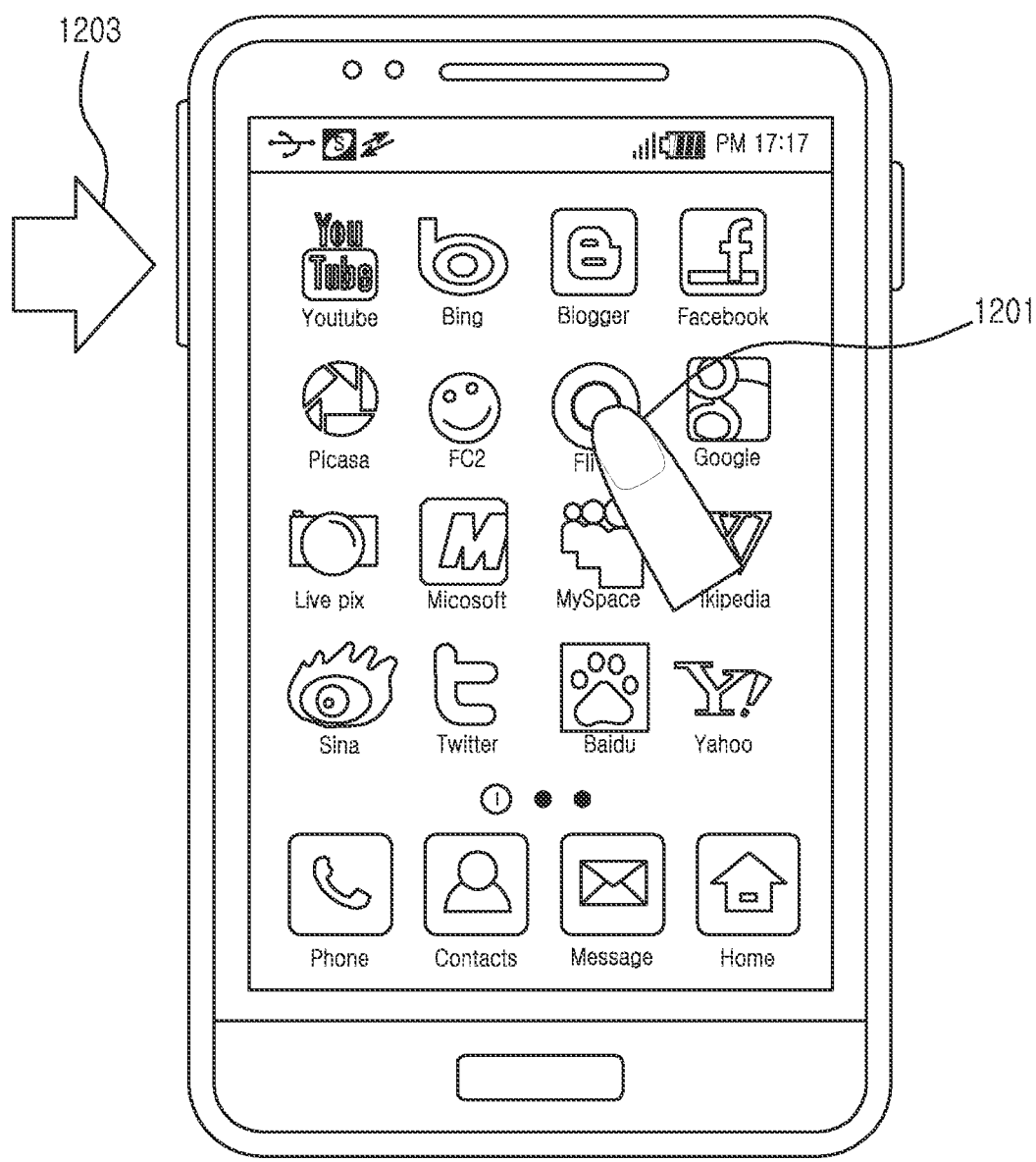
FIGS. 12A, 12B, 12C, 12D, and 12E are views illustrating a screen configuration for editing an icon using a hand touch in an electronic device according to an embodiment of the present disclosure.
Figure 12B:

Referring to FIG. 12A, when detecting a hardware button input 1203 (e.g., volume button) of the electronic device by maintaining of a touch 1201 of the icon "Flickr" by a user's finger, the electronic device may cut the icon "Flickr". At this point, the electronic device may cut the icon "Flickr" with an animation effect as if the icon "Flickr" were absorbed into the finger like a sponge or pipette absorbing liquid as illustrated in FIG. 12B. In case of cutting the icon "Flickr", the electronic device may rearrange icons displayed on the display unit 152 as illustrated in FIG. 11C. Also, the electronic device may display a notice icon 1111 representing whether a cut icon exists as illustrated in FIG. 11C.

Figure 12C:
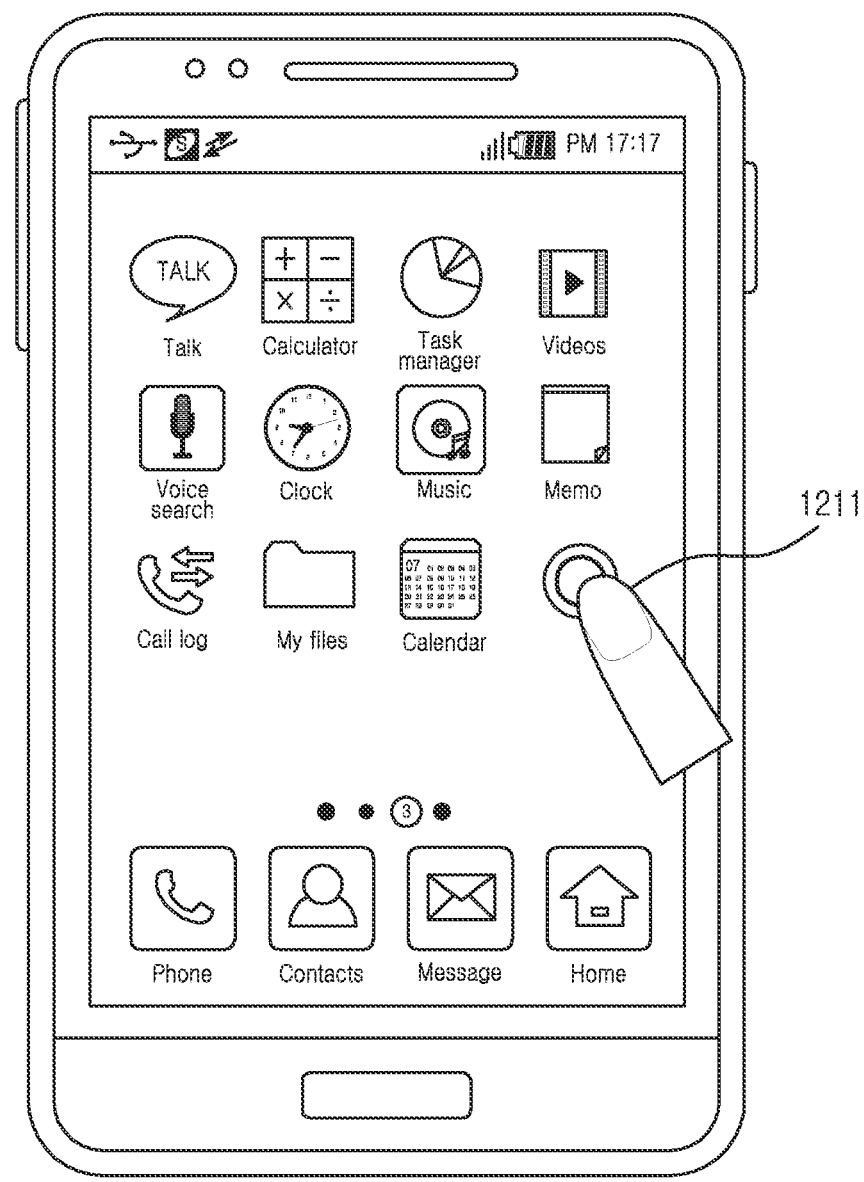

After cutting the icon "Flickr", when detecting a second touch 1211 as illustrated in FIG. 12C, the electronic device may paste the cut icon "Flickr" on the second touch point. At this point, as illustrated in FIG. 12E, the electronic device may paste the icon "Flickr" on the second touch point with an animation effect as if the icon "Flickr" were emitted from the finger like a sponge or pipette emitting liquid.

Figure 12D:
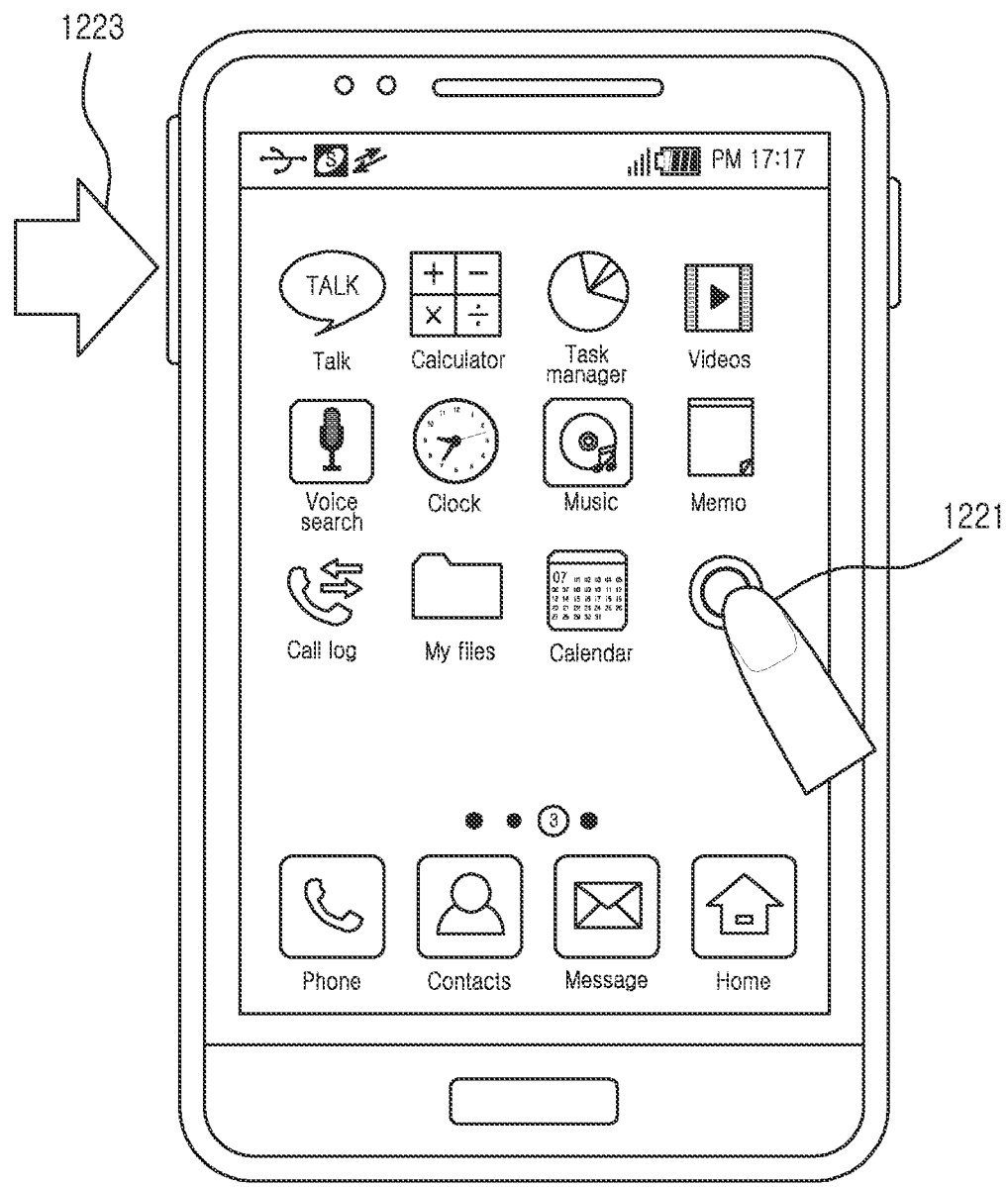
Figure 12E:

After cutting the icon "Flickr", when detecting a hardware button input 1223 of the electronic device with the second touch 1221 maintained as illustrated in FIG. 12D, the electronic device may paste the cut icon "Flickr" on the second touch point. At this point, as illustrated in FIG. 12E, the electronic device may paste the icon "Flickr" on the second touch point with an animation effect as if the icon "Flickr" were emitted from the finger like a sponge or pipette emitting liquid.

In the above embodiment of the present disclosure, the electronic device may edit an icon according to the sponge edit method.

FIGS. 13A, 13B, 13C, 13D, 13E, 13F, and 13G are views illustrating a screen configuration for editing text using a touch pen in an electronic device according to an embodiment of the present disclosure.

FIGS. 14A, 14B, 14C, 14D, and 14E are views illustrating a screen configuration for editing text using a hand touch in an electronic device according to an embodiment of the present disclosure.

Figure 13A:
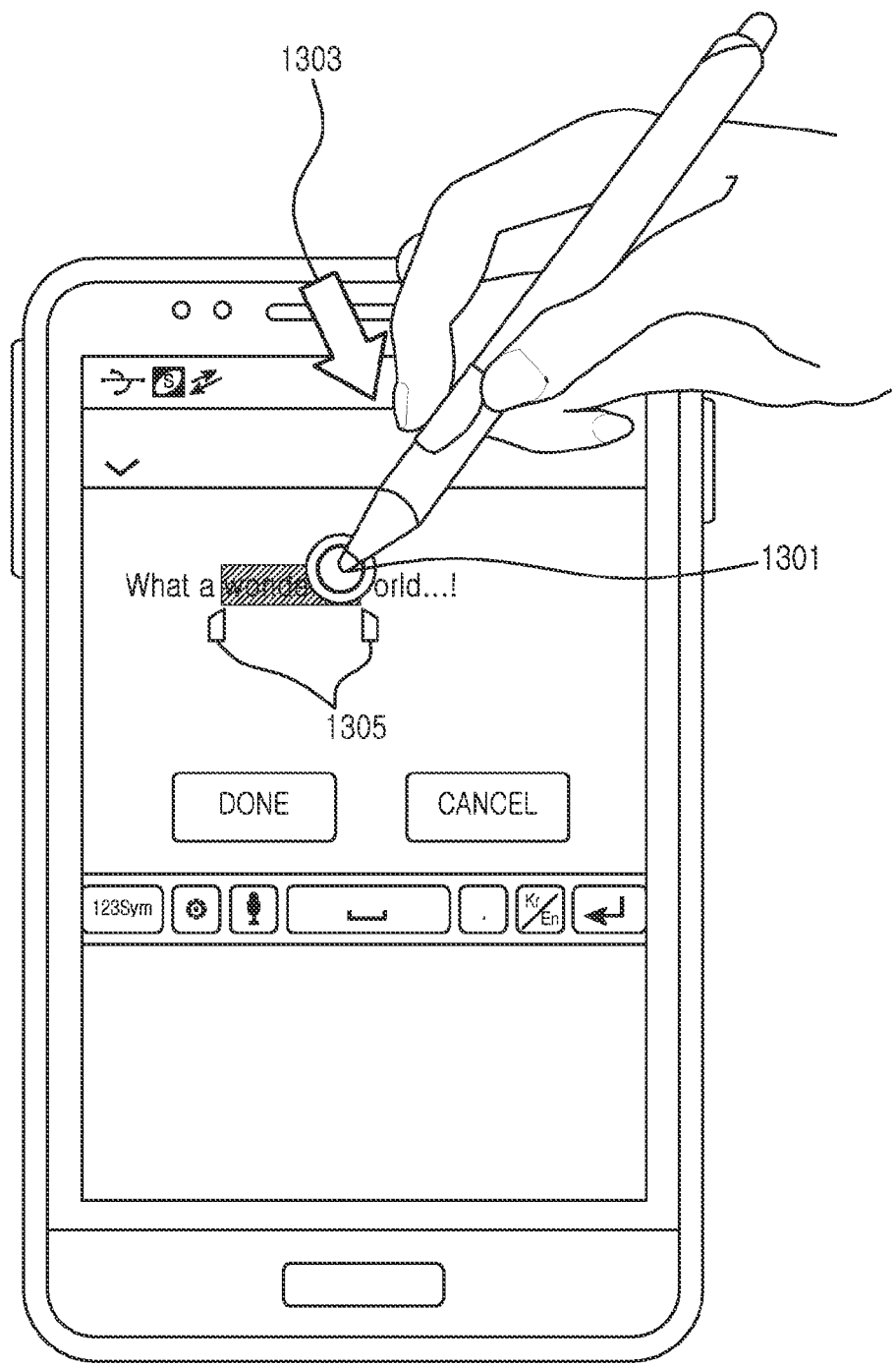
FIGS. 13A, 13B, 13C, 13D, 13E, 13F, and 13G are views illustrating a screen configuration for editing text using a touch pen in an electronic device according to an embodiment of the present disclosure.
Figure 13B:
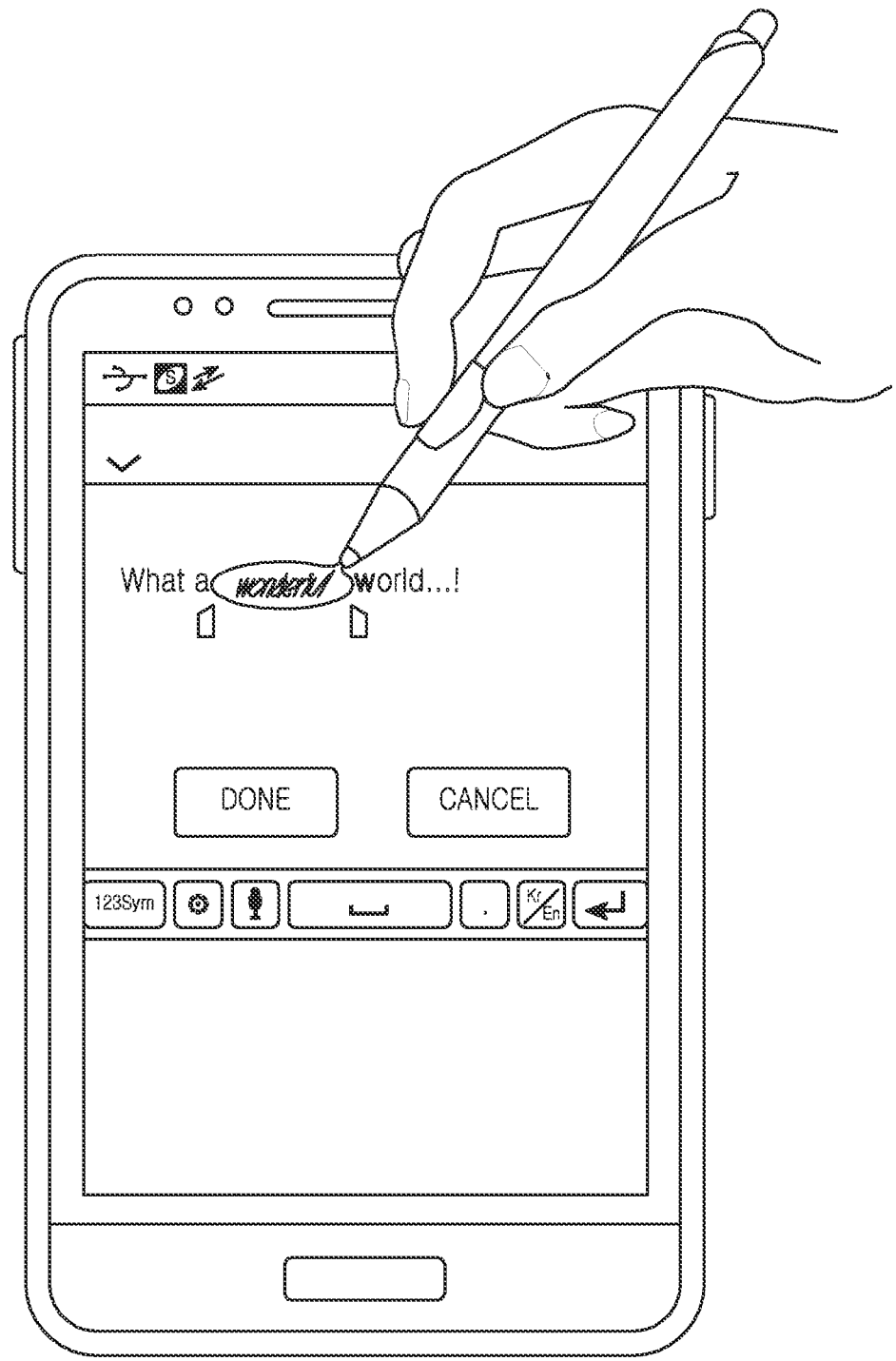

In another embodiment of the present disclosure, the electronic device may edit text according to the sponge edit method as illustrated in FIGS. 13A to 13G, or FIGS. 14A to 14E. For example, when detecting a button input 1303 of the touch pen by maintaining of a touch 1301 of a word "wonderful" by the touch pen as illustrated in FIG. 13A, the electronic device may cut the word "wonderful". At this point, as illustrated in FIG. 13B, the electronic device may cut the word "wonderful" with an animation effect as if the word "wonderful" were absorbed into the touch pen like a sponge or pipette absorbing liquid. In this case, the electronic device may automatically set a text region for cutting or determine the text region depending on a user's input information. For example, when detecting a button input 1303 of the touch pen by maintaining of a touch 1301 by the touch pen, the electronic device may automatically set a text region for cutting by considering a touch point and a word spacing point of text. At this point, the electronic device may change the size of the text region by considering input information of a text region change bar 1305 as illustrated in FIG. 13A. Similarly with an operation of absorbing liquid using a pipette, the electronic device may cut the word "wonderful" using the sponge effect at a point at which the button input is released after the button input 1303 of the touch pen is detected.

Figure 13C:
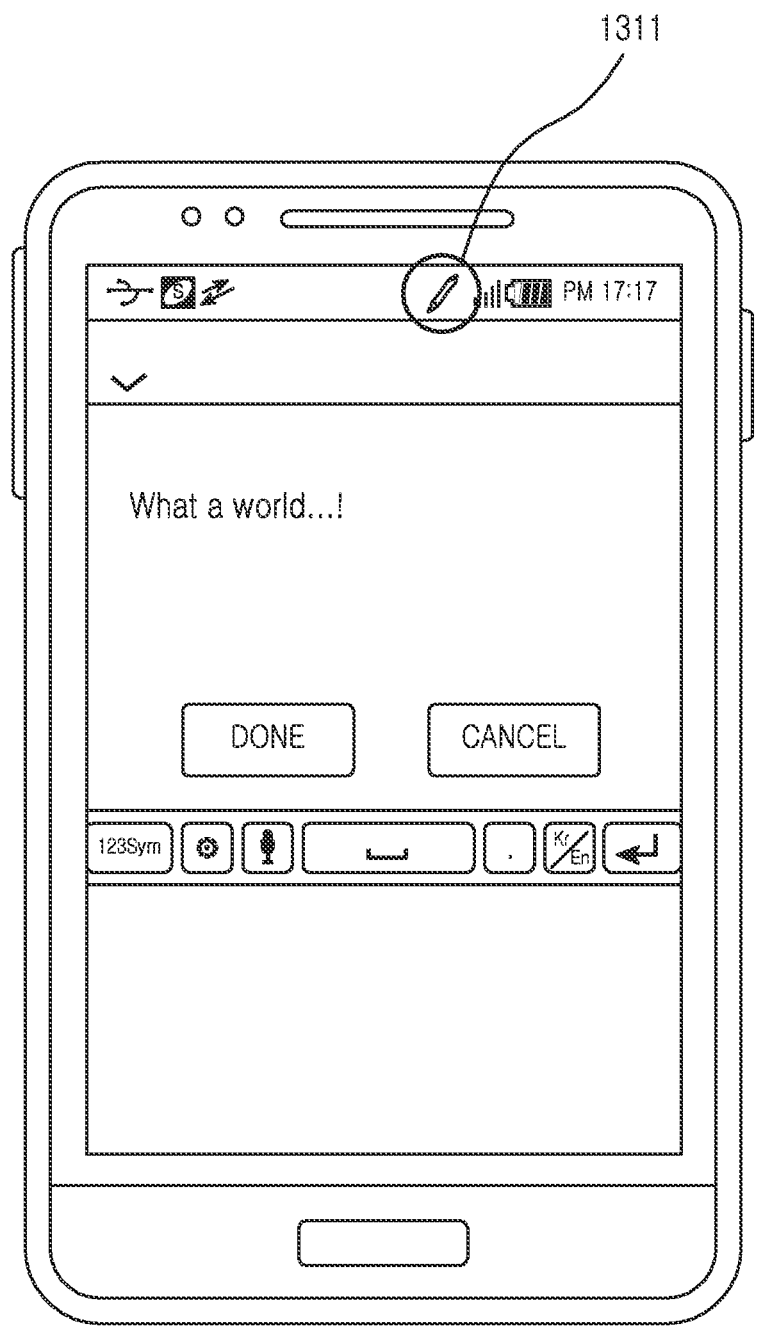

In case of cutting the word "wonderful", the electronic device may rearrange text displayed on the display unit 152 as illustrated in FIG. 13C. As illustrated in FIG. 13C, the electronic device may display a notice icon 1311 representing whether cut text exists. At this point, the notice icon 1311 may display the number of cut text.

Figure 13D:
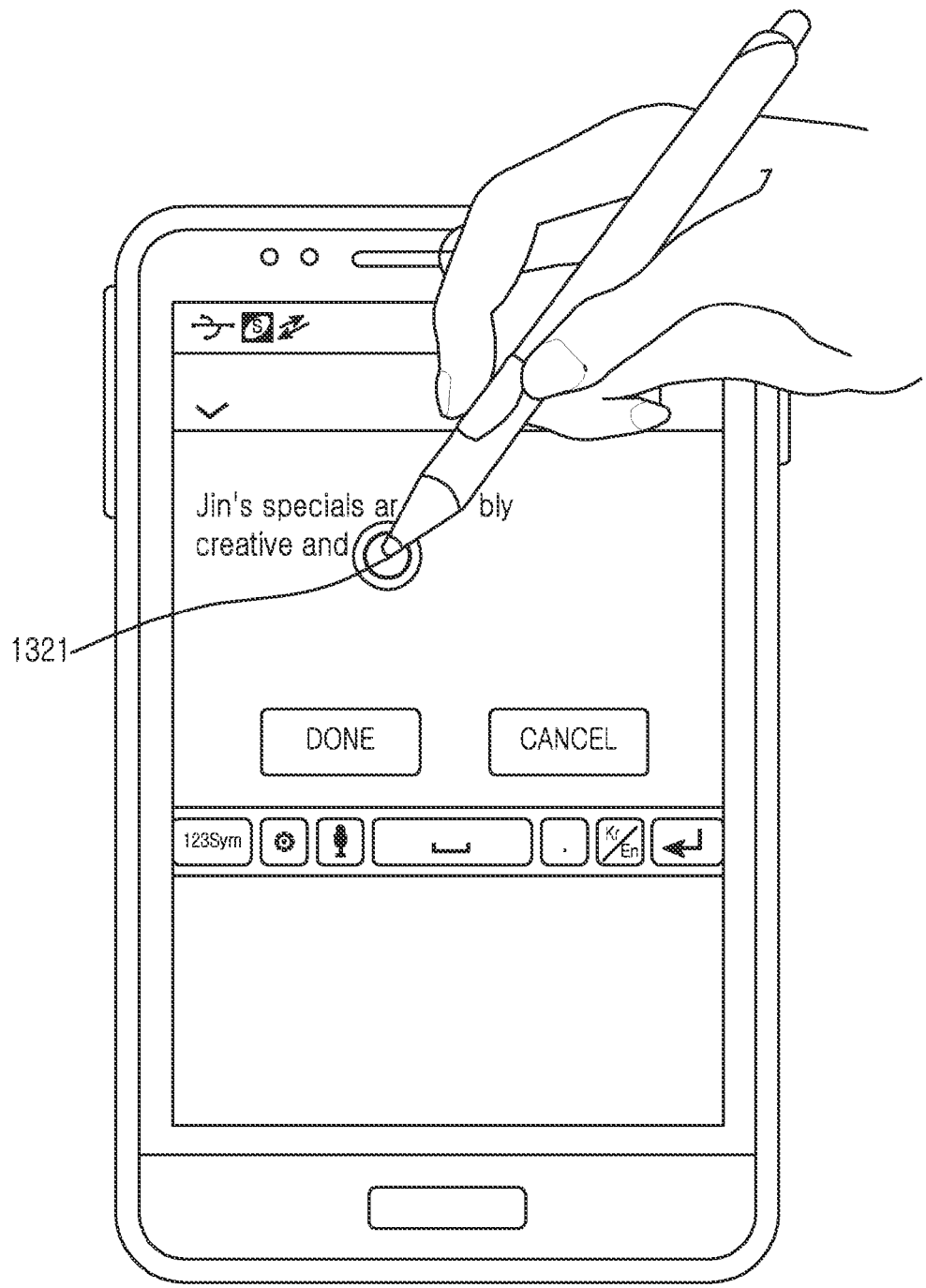
Figure 13E:
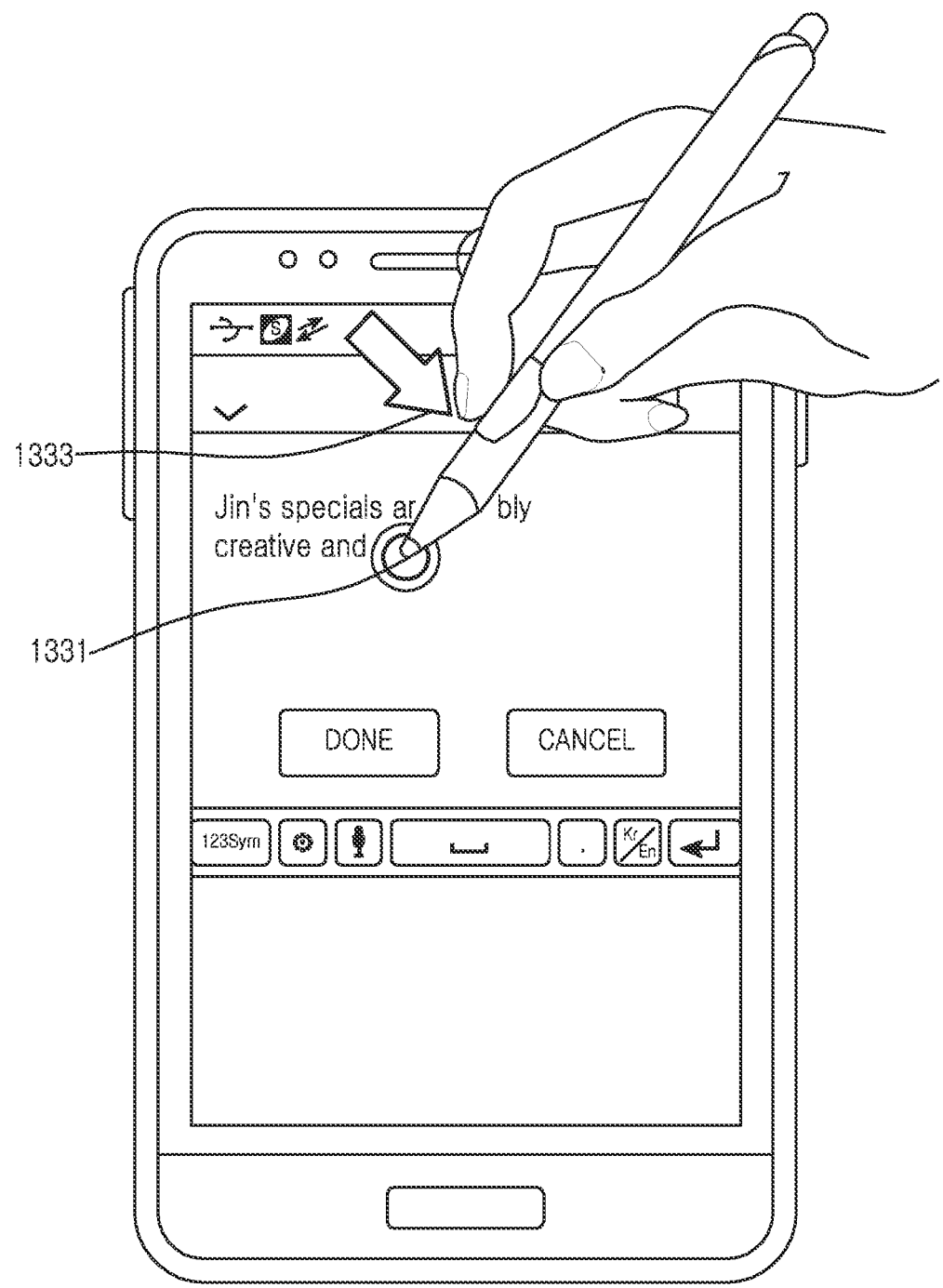
Figure 13F:
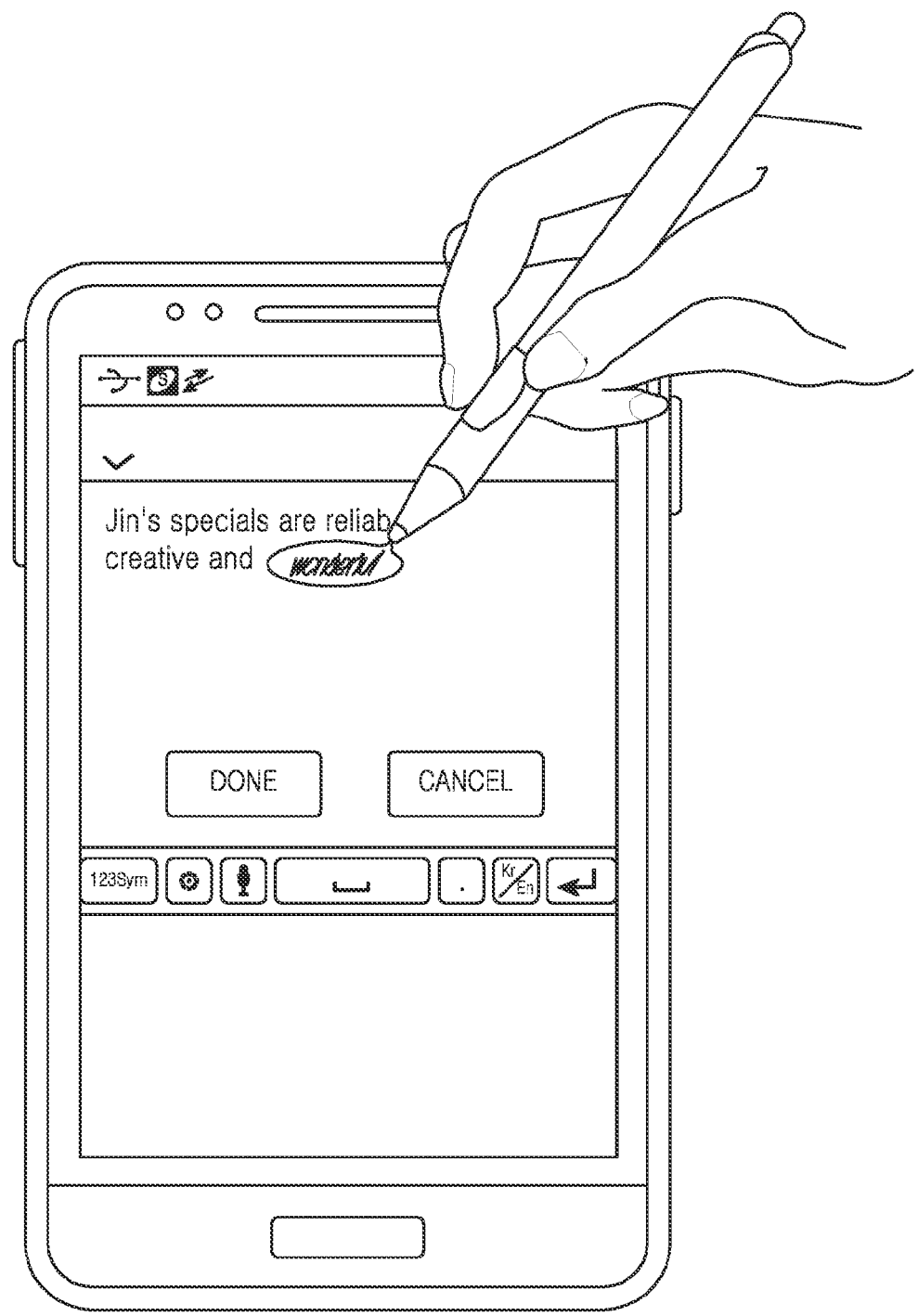
Figure 13G:
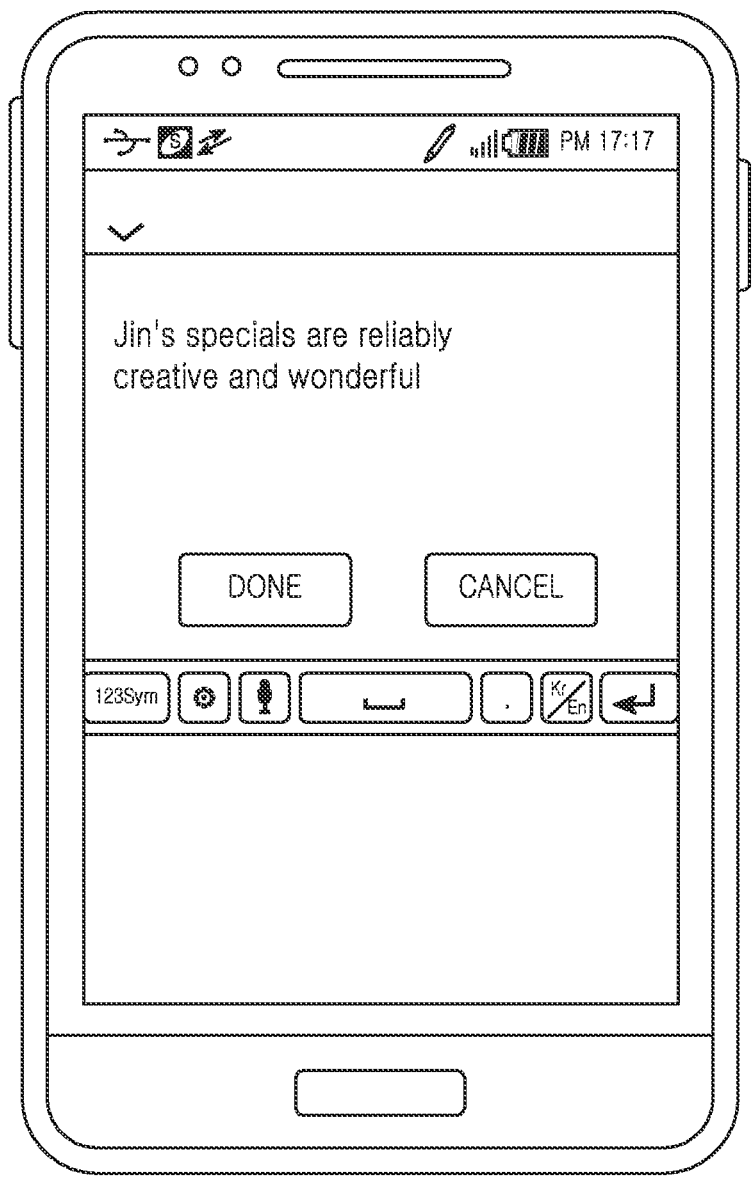

After cutting the word "wonderful", when detecting a second touch 1321 as illustrated in FIG. 13D, the electronic device may paste the cut word "wonderful" on the second touch point as illustrated in FIG. 13G. At this point, as illustrated in FIG. 13F, the electronic device may paste the word "wonderful" on the second touch point with an animation effect as if the word "wonderful" were emitted from the touch pen like a sponge or pipette emitting liquid.

After cutting the word "wonderful", when detecting a button input 1333 of the touch pen with a second touch 1331 maintained as illustrated in FIG. 13E, the electronic device may paste the word "wonderful" on the second touch point. At this point, as illustrated in FIG. 13F, the electronic device may paste the word "wonderful" on the second touch point with an animation effect as if the word "wonderful" were emitted from the touch pen like a sponge or pipette emitting liquid.

Figure 14A:
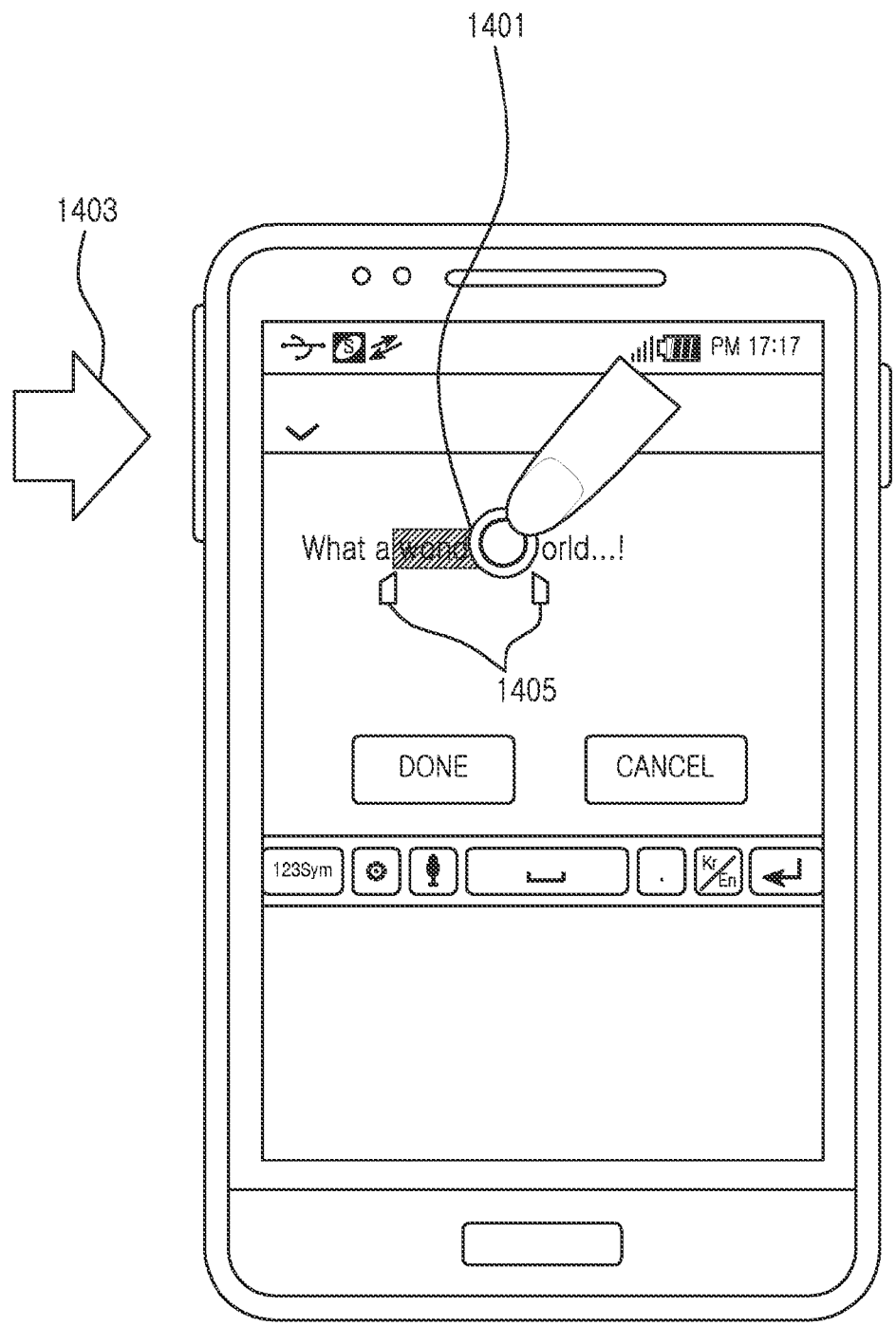
FIGS. 14A, 14B, 14C, 14D, and 14E are views illustrating a screen configuration for editing text using a hand touch in an electronic device according to an embodiment of the present disclosure.
Figure 14B:
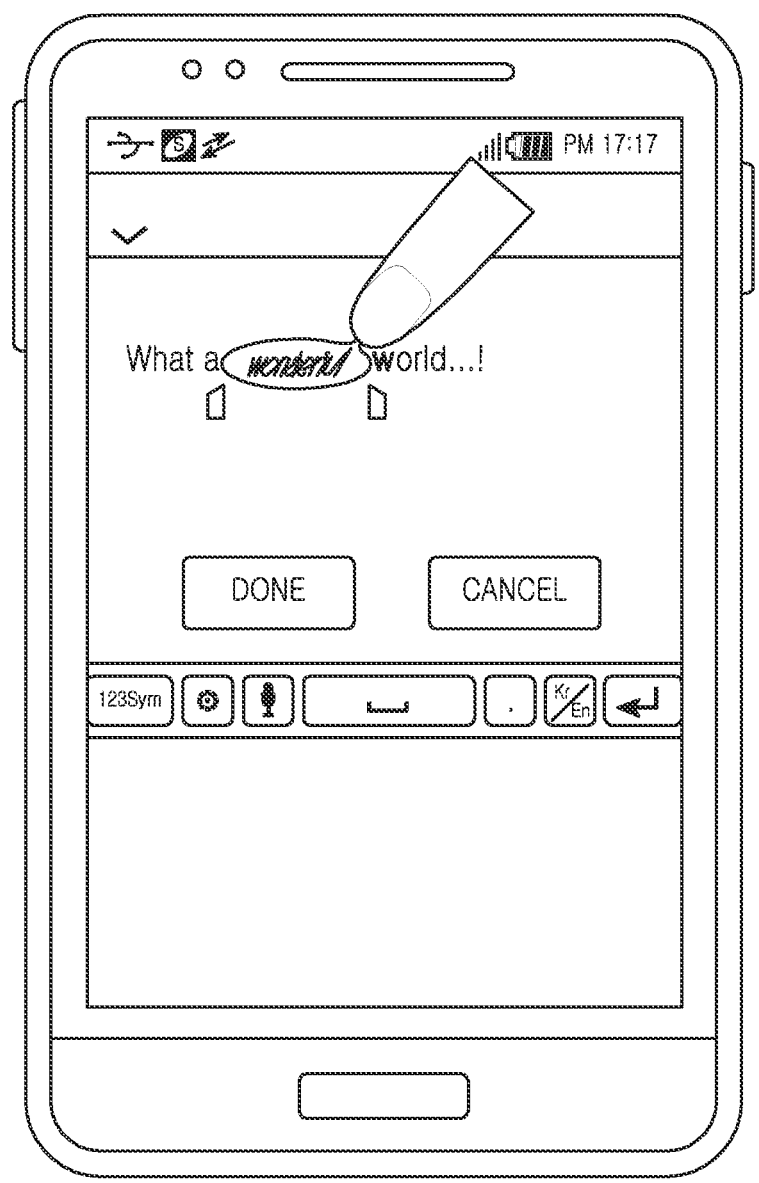

For another example, when detecting a hardware button input 1403 of the electronic device by maintaining of a touch 1401 of the word "wonderful" by a user's finger as illustrated in FIG. 14A, the electronic device may cut the word "wonderful". At this point, as illustrated in FIG. 14B, the electronic device may cut the word "wonderful" with an animation effect as if the word "wonderful" were absorbed into the finger like a sponge or pipette absorbing liquid. In this case, the electronic device may automatically set a text region for cutting or determine the text region depending on a user's input information. For example, when detecting the button input 1403 of the touch pen by maintaining of the touch 1401 by the finger, the electronic device may automatically set a text region for cutting by considering a touch point and a word spacing point of text. At this point, the electronic device may change the size of the text region by considering input information of a text region change bar 1405 as illustrated in FIG. 14A In case of cutting the word "wonderful", the electronic device may rearrange the arrangement of text displayed on the display unit 152 as illustrated in FIG. 13C. Also, the electronic device may display a notice icon 1311 representing whether cut text exists as illustrated in FIG. 13C.

Figure 14C:
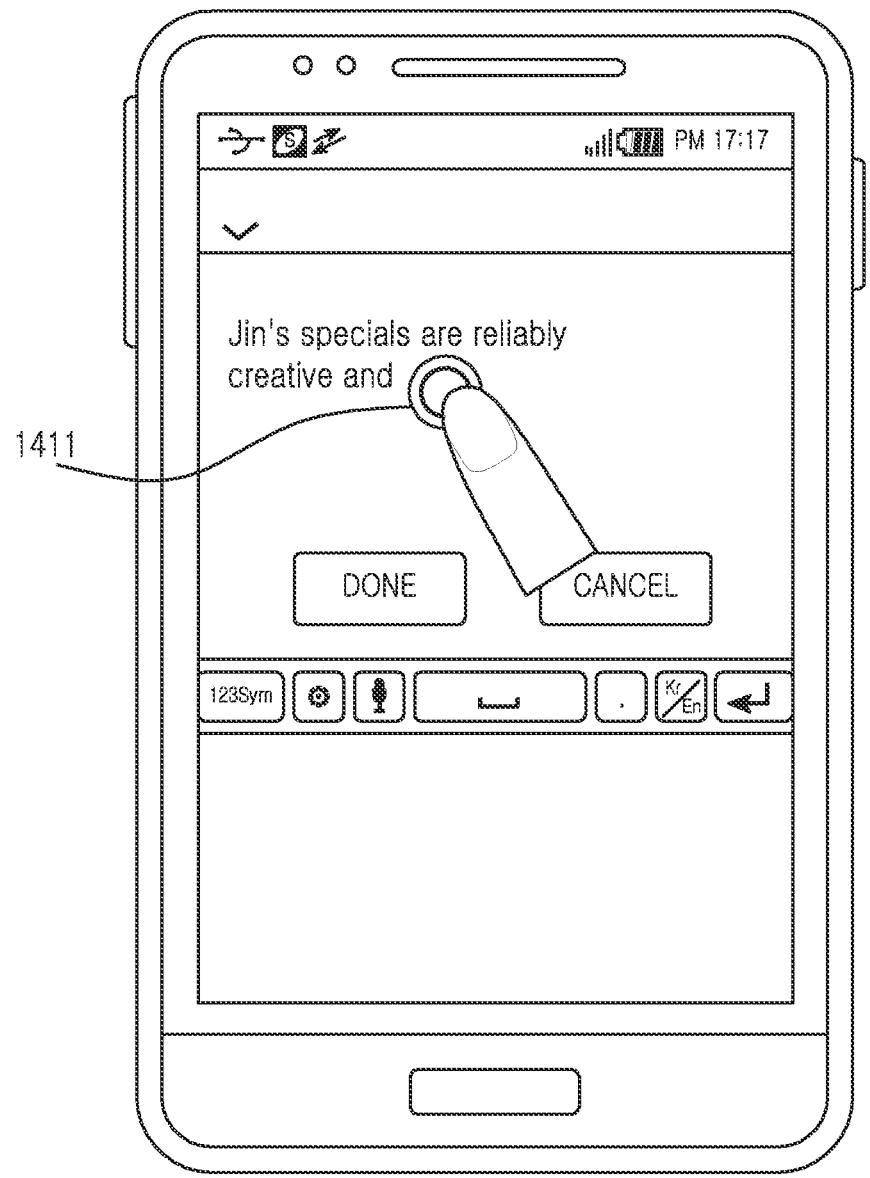

After cutting the word "wonderful", when detecting a second touch 1411 as illustrated in FIG. 14C, the electronic device may paste the cut word "wonderful" on the second touch point. At this point, as illustrated in FIG. 14E, the electronic device may paste the word "wonderful" with an animation effect as if the word "wonderful" were emitted from the finger like a sponge or pipette emitting liquid.

Figure 14D:
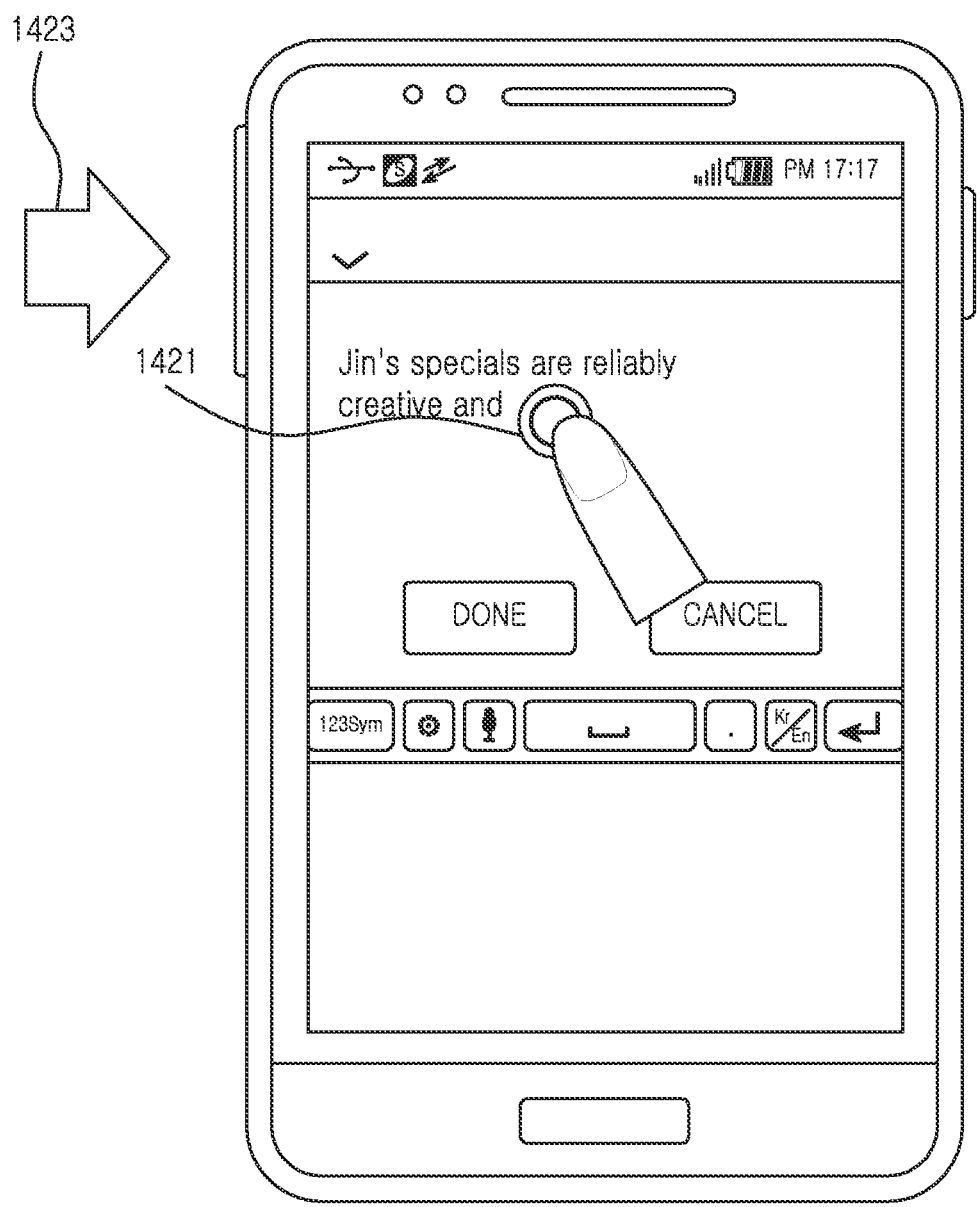
Figure 14E:
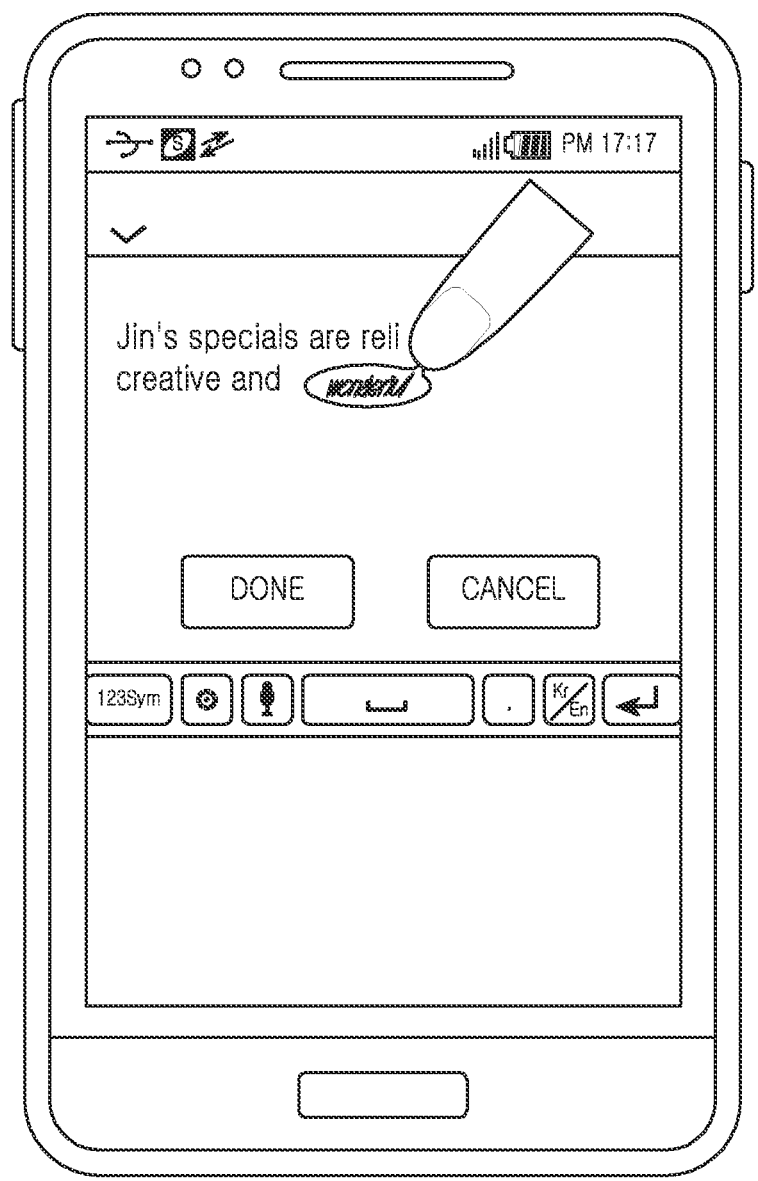

After cutting the word "wonderful", when detecting a hardware button input 1423 of the electronic device with the second touch 1421 maintained as illustrated in FIG. 14D, the electronic device may paste the cut word "wonderful" on the second touch point. At this point, as illustrated in FIG. 14E, the electronic device may paste the word "wonderful" with an animation effect as if the word "wonderful" were emitted from the finger like a sponge or pipette emitting liquid.

In the above embodiment of the present disclosure, the electronic device may edit text according to the sponge edit method.

FIGS. 15A, 15B, 15C, 15D, 15E, 15F, and 15G are views illustrating a screen configuration for editing a reproduction list using a touch pen in an electronic device according to an embodiment of the present disclosure.

FIGS. 16A, 16B, 16C, 16D, and 16E are views illustrating a screen configuration for editing a reproduction list using a hand touch in an electronic device according to an embodiment of the present disclosure.

Figure 15A:
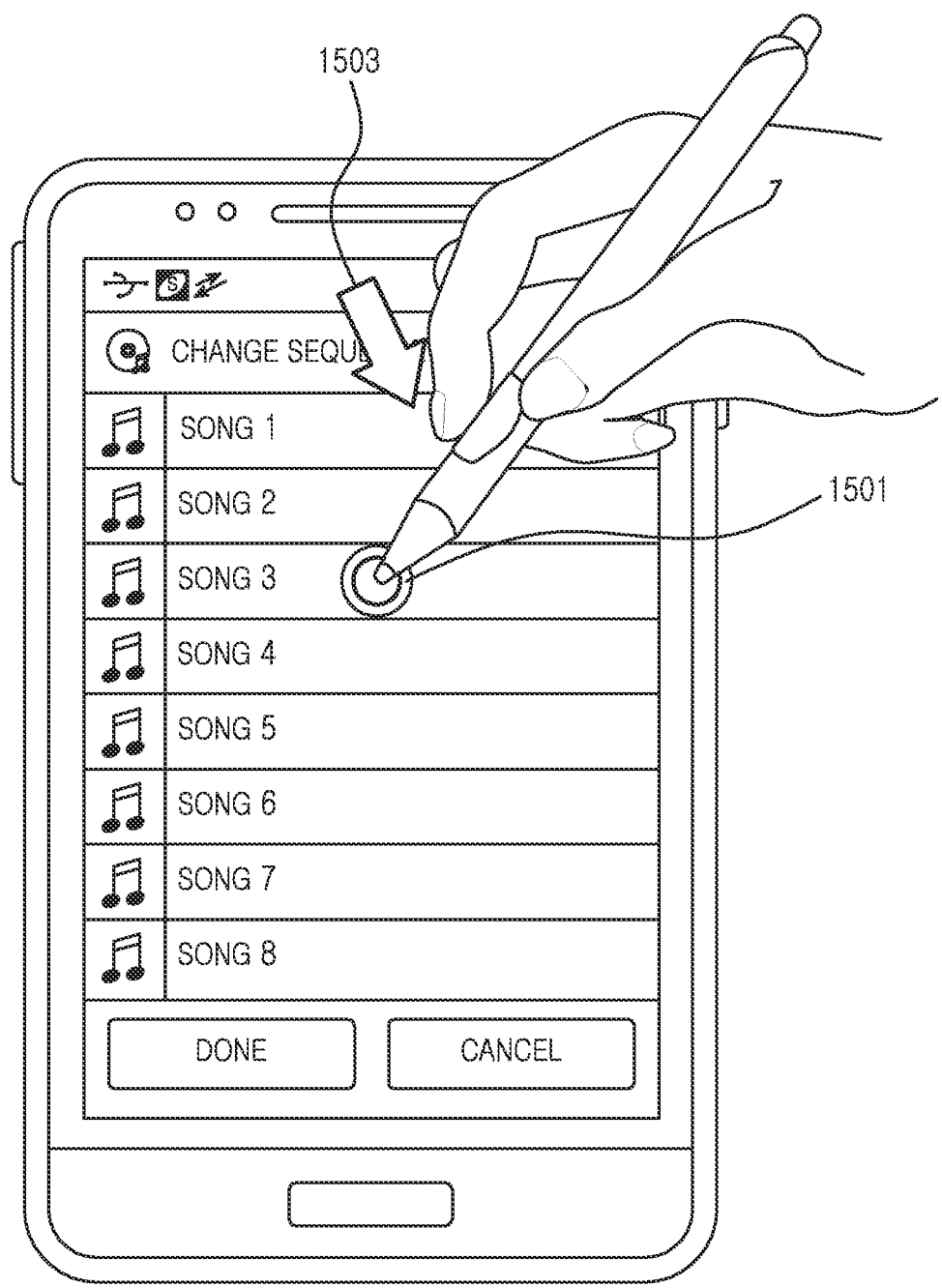
FIGS. 15A, 15B, 15C, 15D, 15E, 15F, and 15G are views illustrating a screen configuration for editing a reproduction list using a touch pen in an electronic device according to an embodiment of the present disclosure.
Figure 15B:
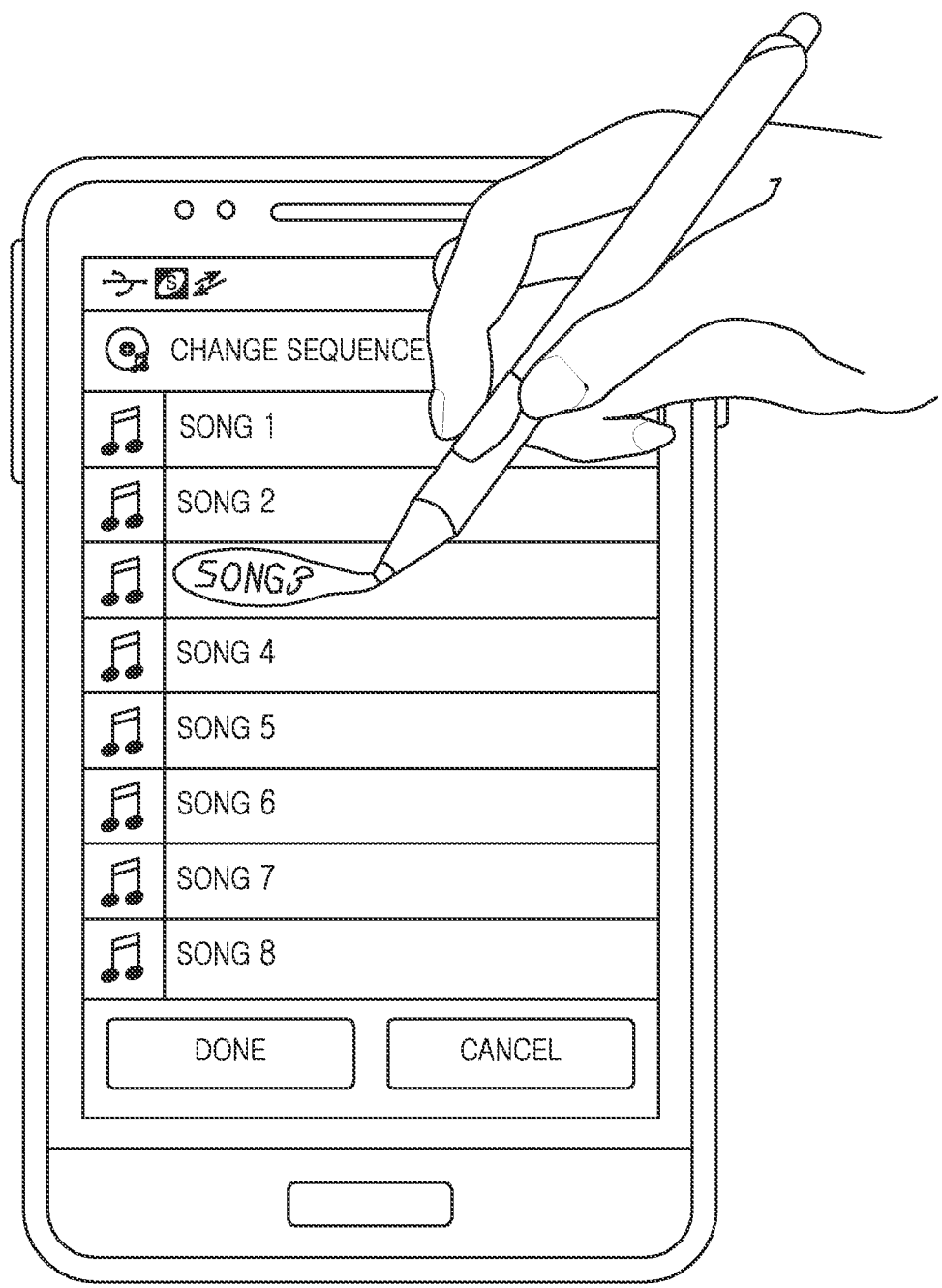

In another embodiment of the present disclosure, the electronic device may edit a reproduction list according to the sponge edit method as illustrated in FIGS. 15A to 15G and FIGS. 16A to 16E. For example, when detecting a button input 1503 of the touch pen by maintaining of a touch 1501 of a list "song 3" by the touch pen as illustrated in FIG. 15A, the electronic device may cut the list "song 3". At this point, as illustrated in FIG. 15B, the electronic device may cut the list "song 3" with an animation effect as if the list "song 3" were absorbed into the touch pen like a sponge or pipette absorbing liquid. Similarly with an operation of absorbing liquid using a pipette, the electronic device may cut the list "song 3" using the sponge effect at a point at which a button input is released after the button input 1503 of the touch pen is detected.

Figure 15C:
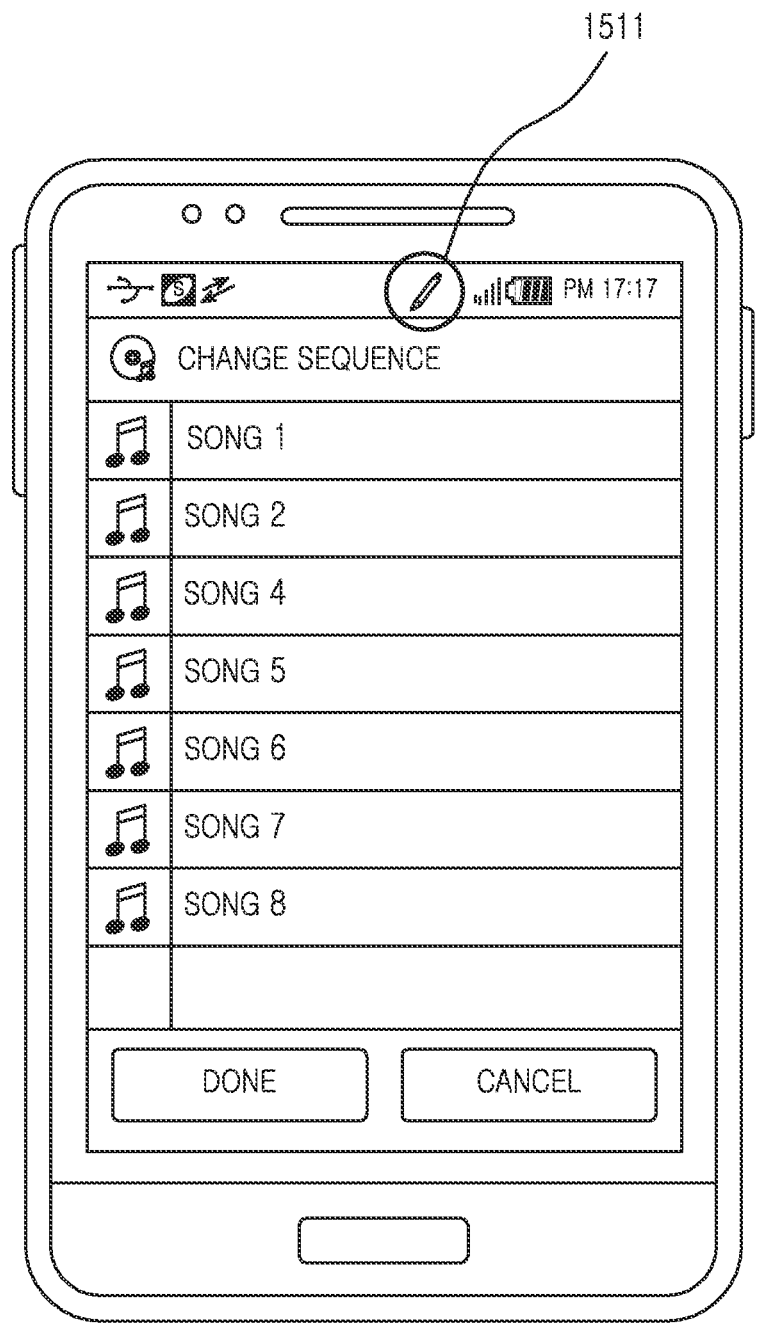

In case of cutting the list "song 3", the electronic device may rearrange a reproduction list displayed on the display unit 152 as illustrated in FIG. 15C. As illustrated in FIG. 15C, the electronic device may display a notice icon 1511 representing whether a cut reproduction list exists. At this point, the notice icon 1511 may display the number of cut reproduction lists.

Figure 15D:
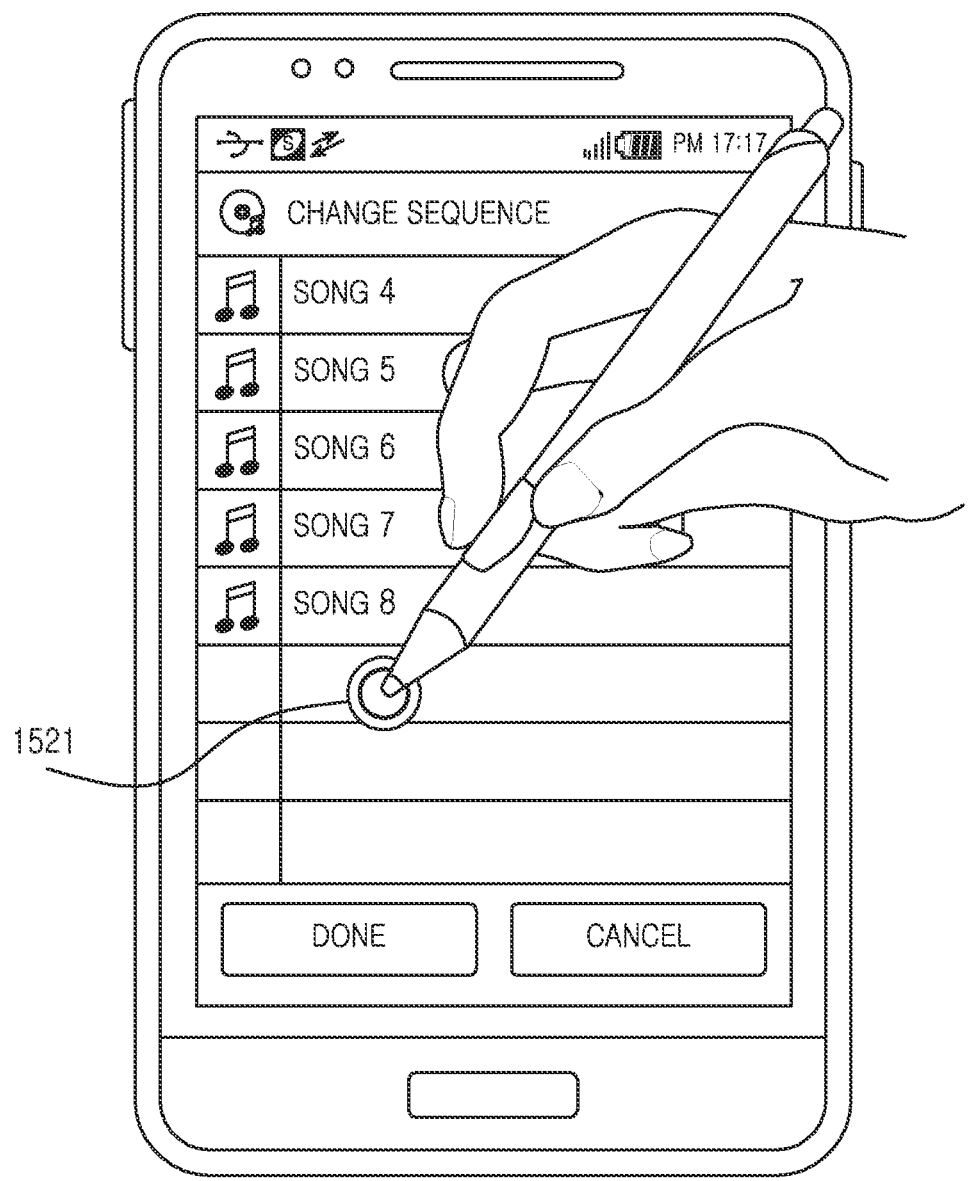
Figure 15E:
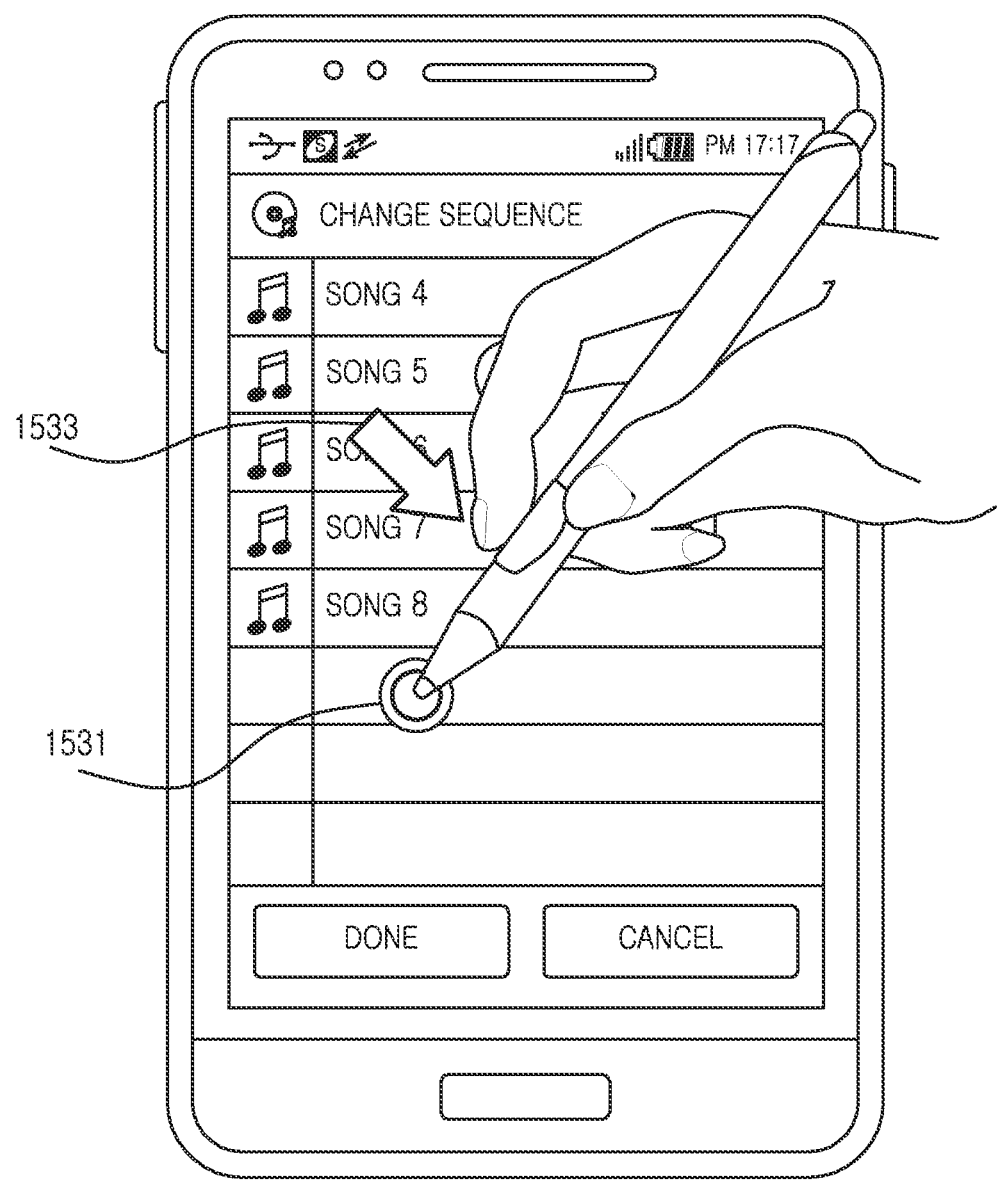
Figure 15F:
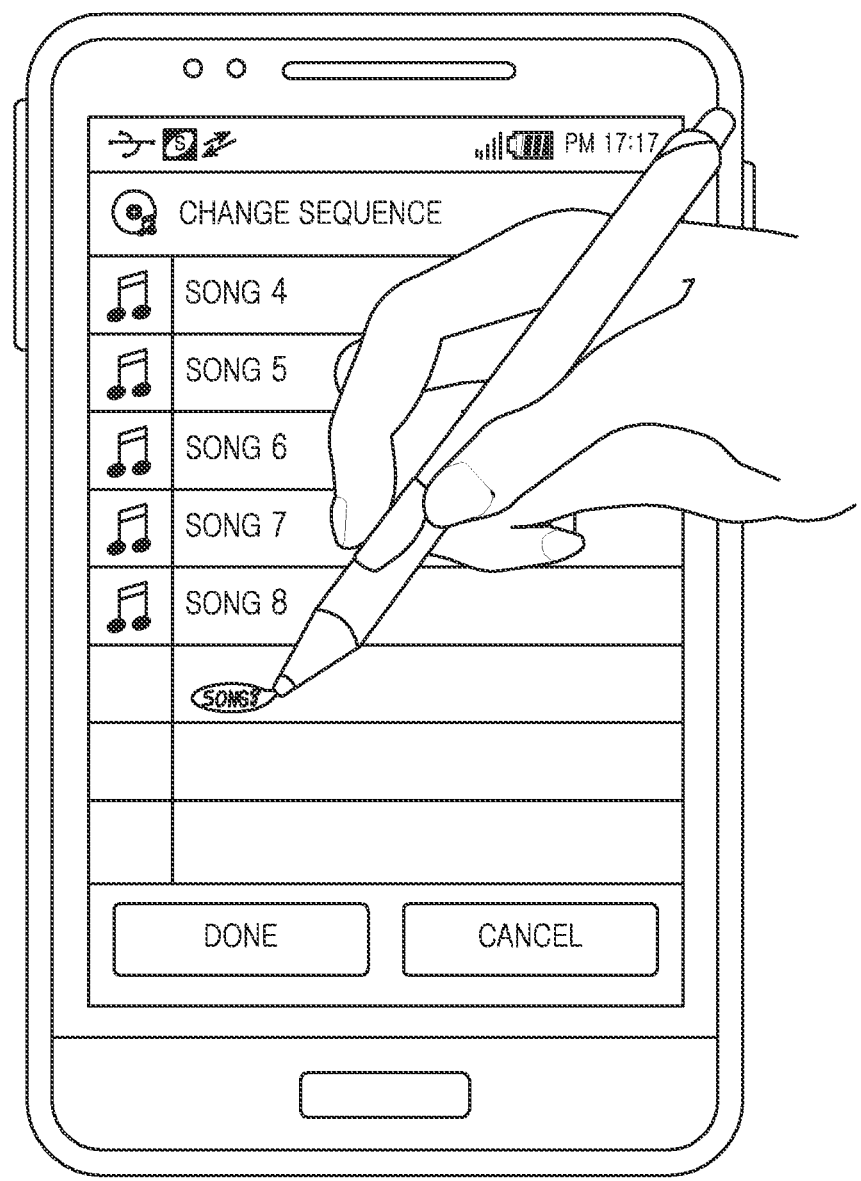
Figure 15G:
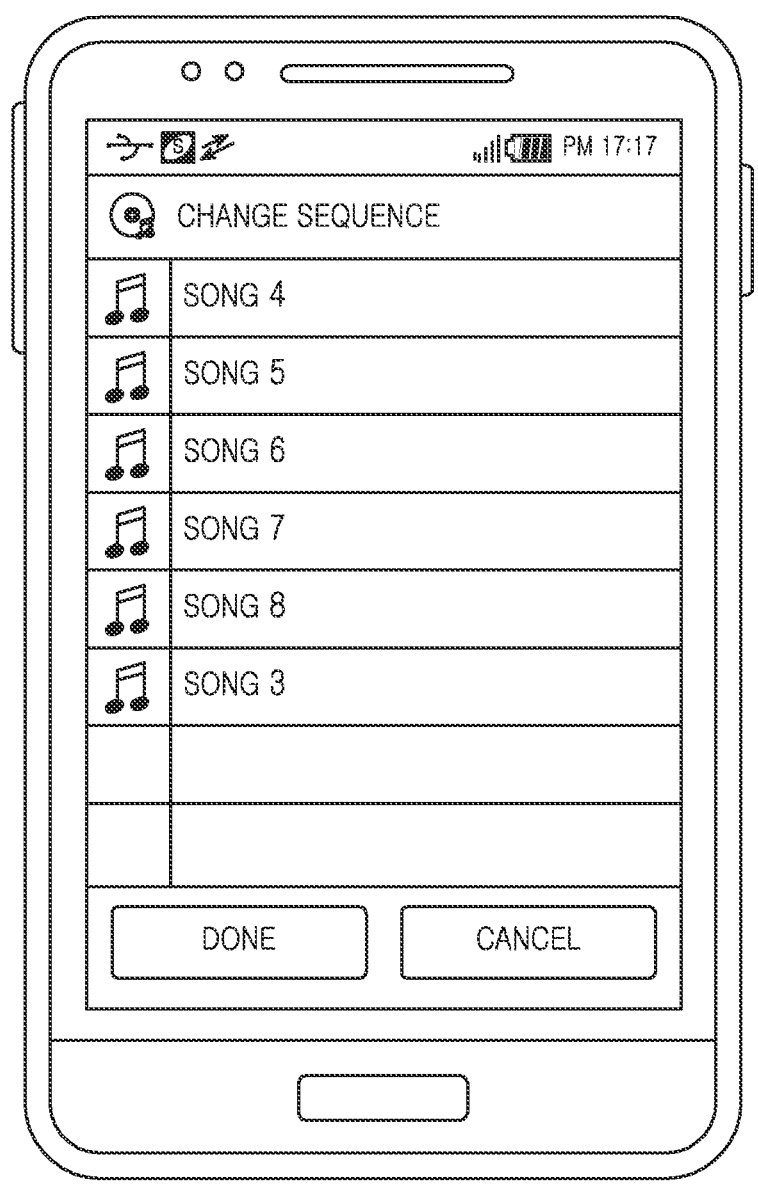

After cutting the list "song 3", when detecting a second touch 1521 as illustrated in FIG. 15D, the electronic device may paste the cut list "song 3" on the second touch point as illustrated in FIG. 15G. At this point, as illustrated in FIG. 15F, the electronic device may paste the list "song 3" on the second touch point with an animation effect as if the list "song 3" were emitted from the touch pen like a sponge or pipette emitting liquid.

After cutting the list "song 3", when detecting a button input 1533 of the touch pen with a second touch 1531 maintained as illustrated in FIG. 15E, the electronic device may paste the list "song 3" on the second touch point. At this point, as illustrated in FIG. 15F, the electronic device may paste the list "song 3" on the second touch point with an animation effect as if the list "song 3" were emitted from the touch pen like a sponge or pipette emitting liquid.

Figure 16A:
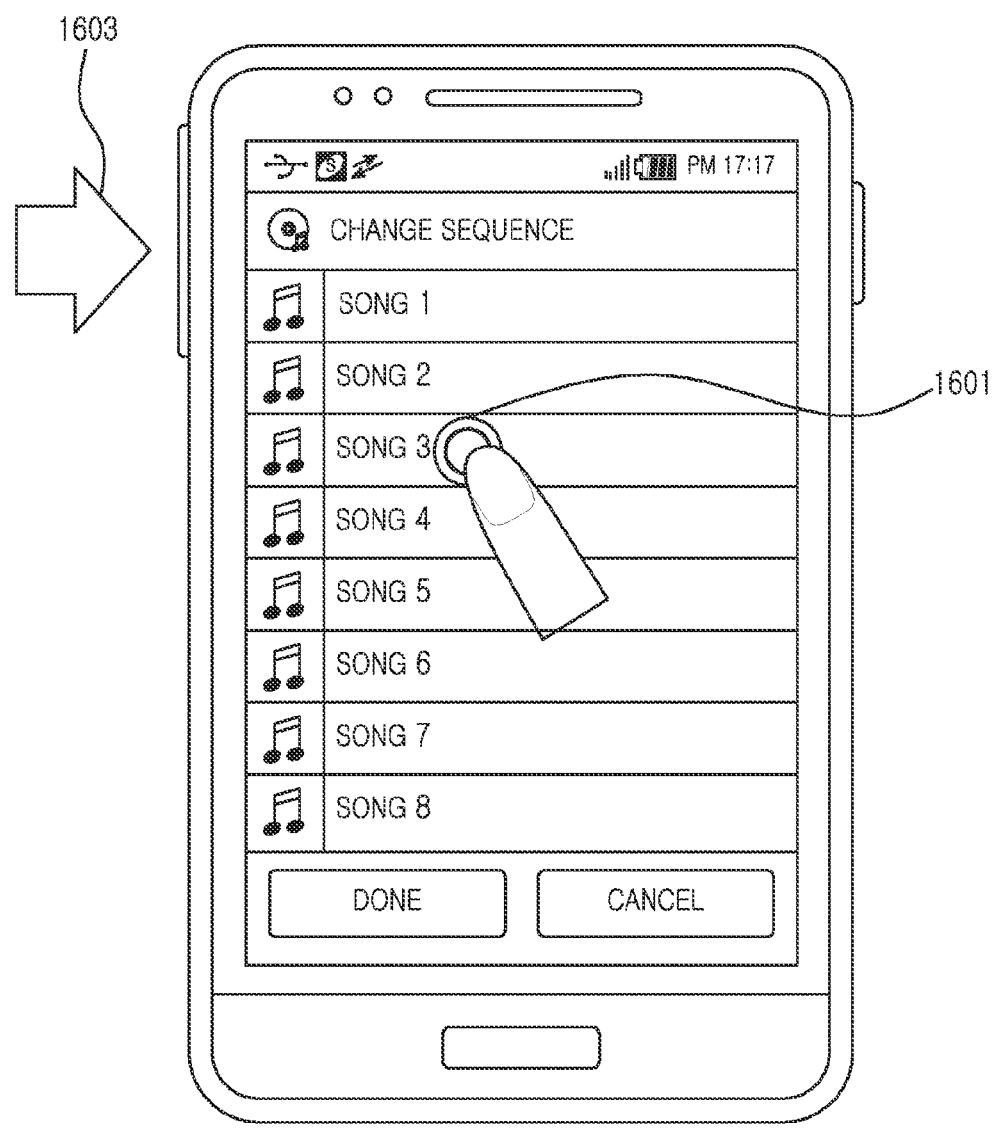
FIGS. 16A, 16B, 16C, 16D, and 16E are views illustrating a screen configuration for editing a reproduction list using a hand touch in an electronic device according to an embodiment of the present disclosure.
Figure 16B:
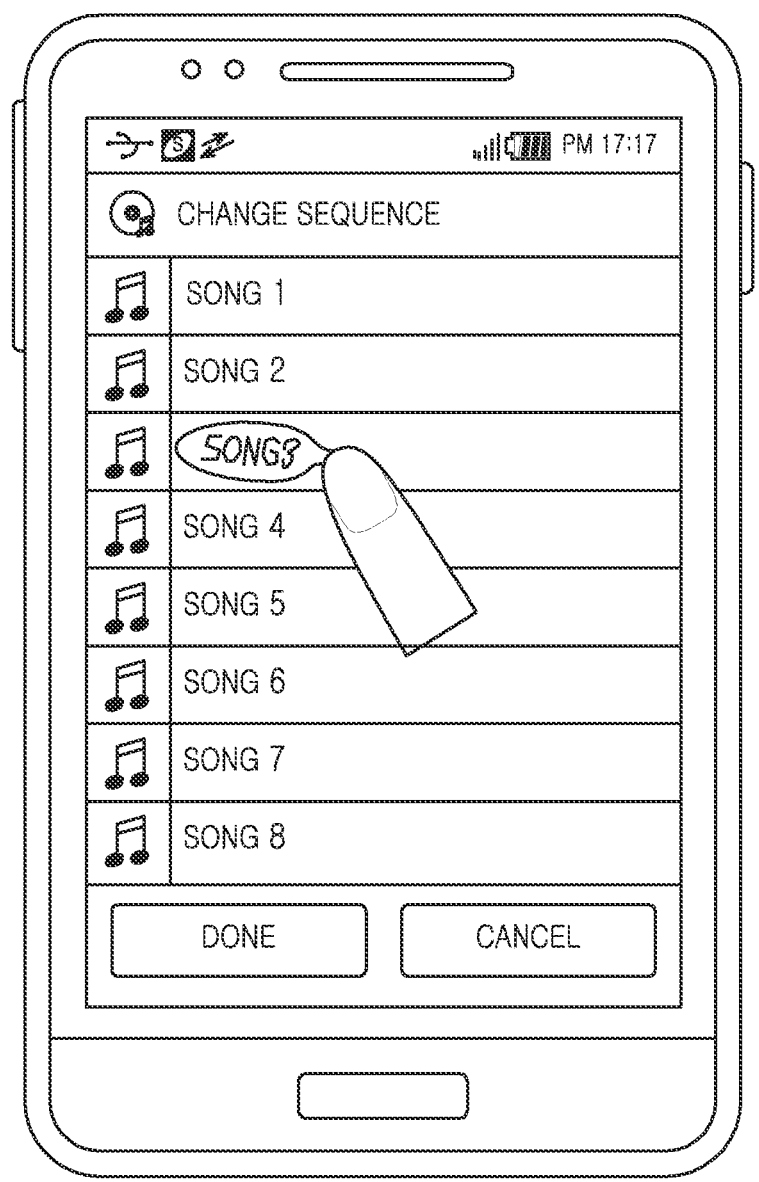

For another example, when detecting a hardware button input 1603 of the electronic device with a touch 1601 of the list "song 3" by a user's finger maintained as illustrated in FIG. 16A, the electronic device may perform cut on the list "song 3". At this point, as illustrated in FIG. 16B, the electronic device may cut the list "song 3" with an animation effect as if the list "song 3" were absorbed into the finger like a sponge or pipette absorbing liquid. In case of cutting the list "song 3", the electronic device may rearrange reproduction lists displayed on the display unit 152 as illustrated in FIG. 15C. Also, as illustrated in FIG. 15C, the electronic device may display a notice icon 1511 representing whether a cut reproduction list exists.

Figure 16C:
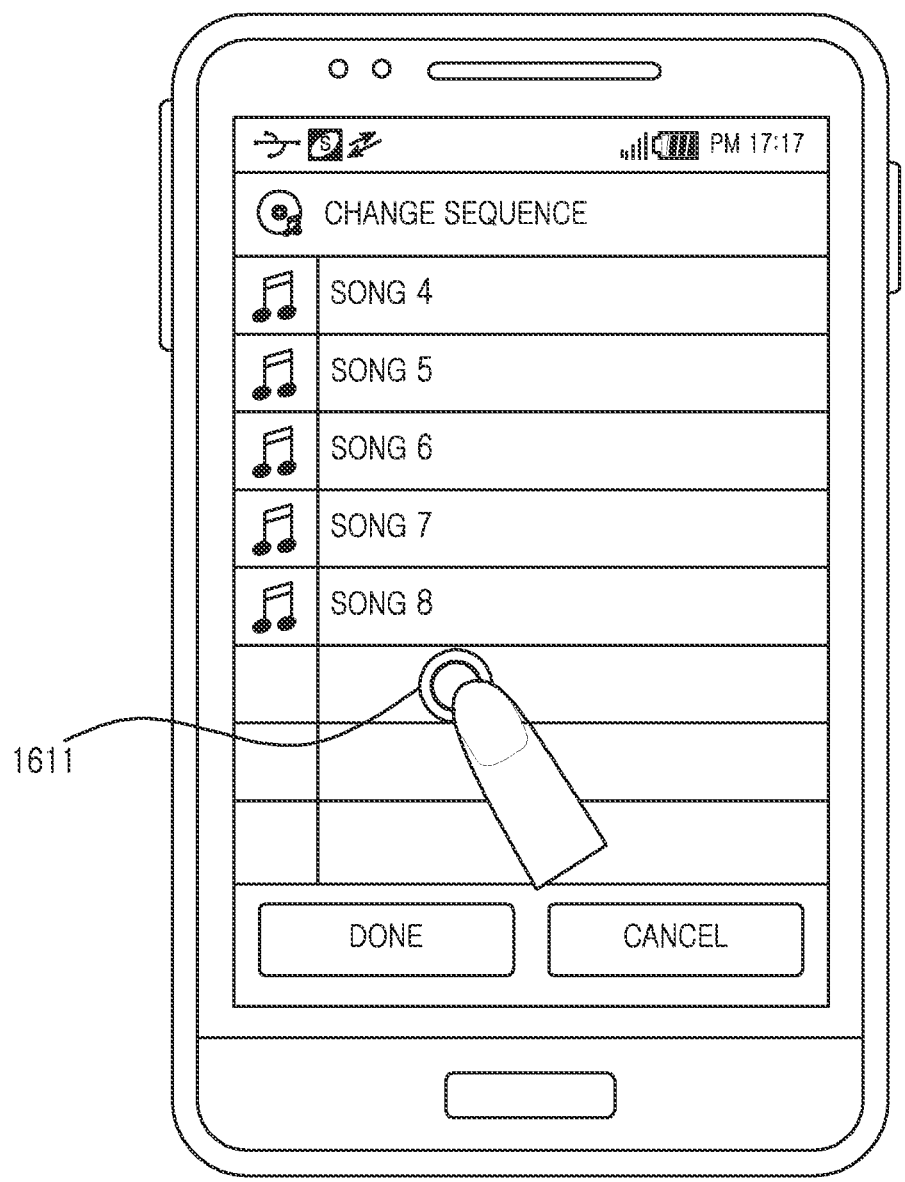

After cutting the list "song 3", when detecting a second touch 1611 as illustrated in FIG. 16C, the electronic device may paste the cut list "song 3" on the second touch point. At this point, as illustrated in FIG. 16E, the electronic device may paste the list "song 3" on the second touch point with an animation effect as if the list "song 3" were emitted from the finger like a sponge or pipette emitting liquid.

Figure 16D:
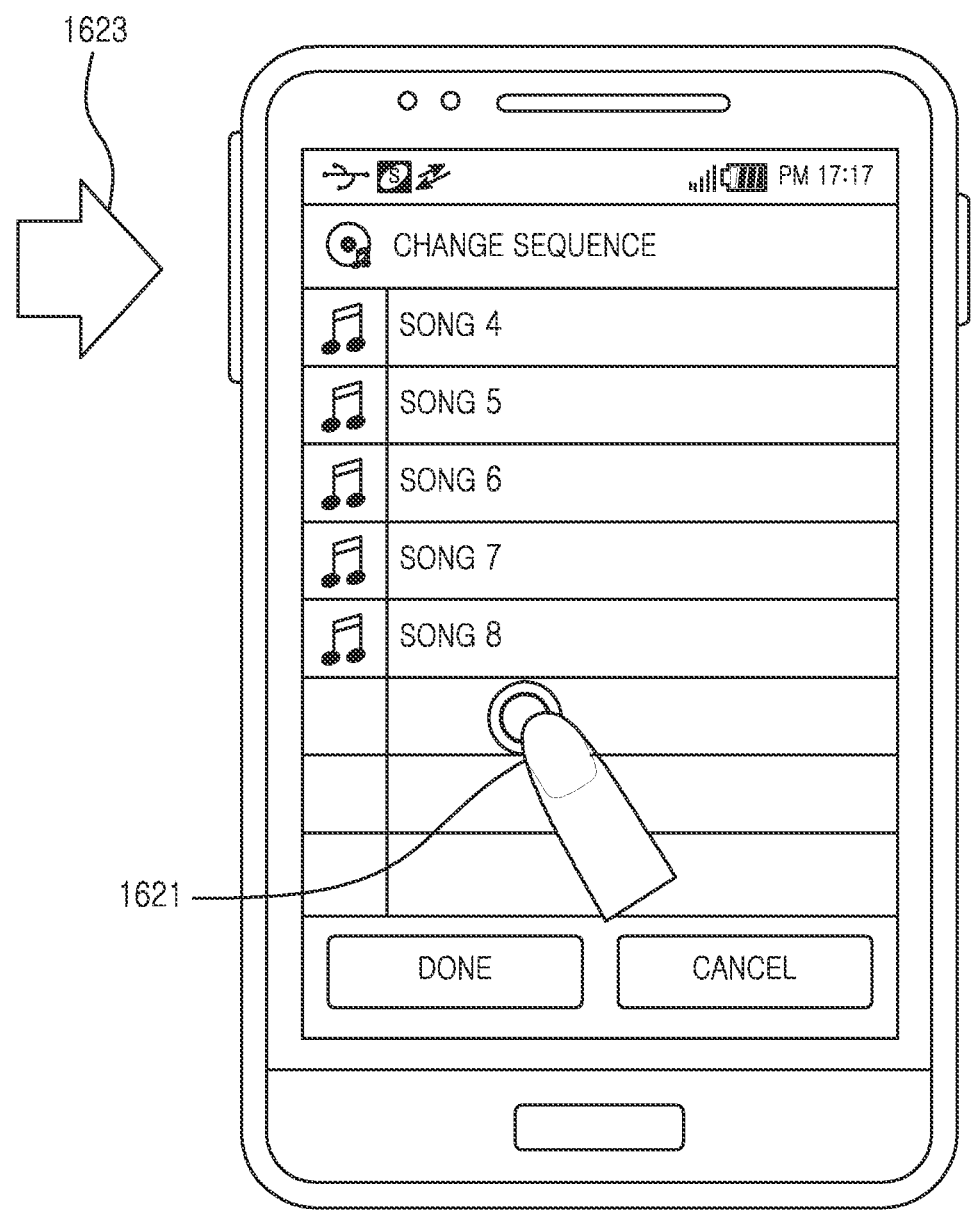
Figure 16E:
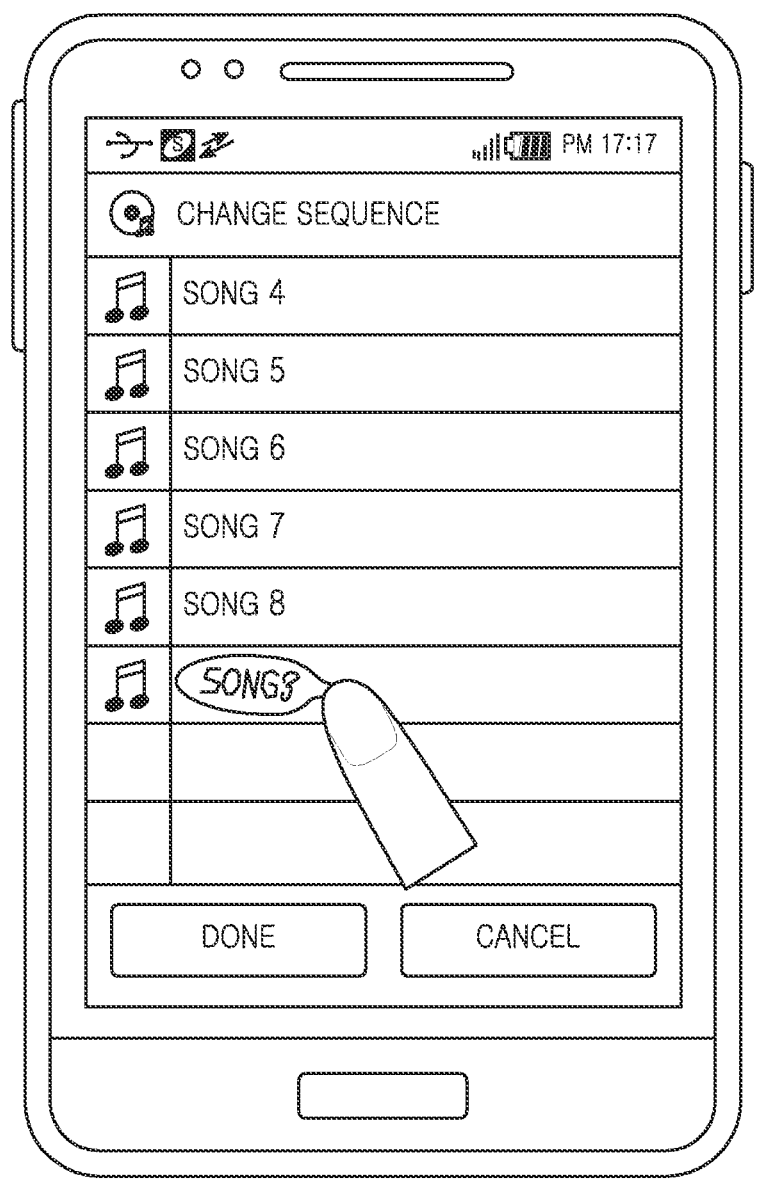

After cutting the list "song 3", when detecting a hardware input button 1623 of the electronic device with a second touch 1621 maintained as illustrated in FIG. 16D, the electronic device may paste the cut list "song 3" on the second touch point. At this point, as illustrated in FIG. 16E, the electronic device may paste the list "song 3" on the second touch point with an animation effect as if the list "song 3" were emitted from the finger like a sponge or pipette emitting liquid.

In case of cutting at least one object as illustrated in FIGS. 11C, 13C, and 15C, the electronic device may rearrange objects displayed on the display unit 152. In another embodiment of the present disclosure, in case of cutting at least one object, the electronic device may not rearrange the objects displayed on the display unit 152. For example, the electronic device may leave a cut object region as a vacant space.

Figure 7:
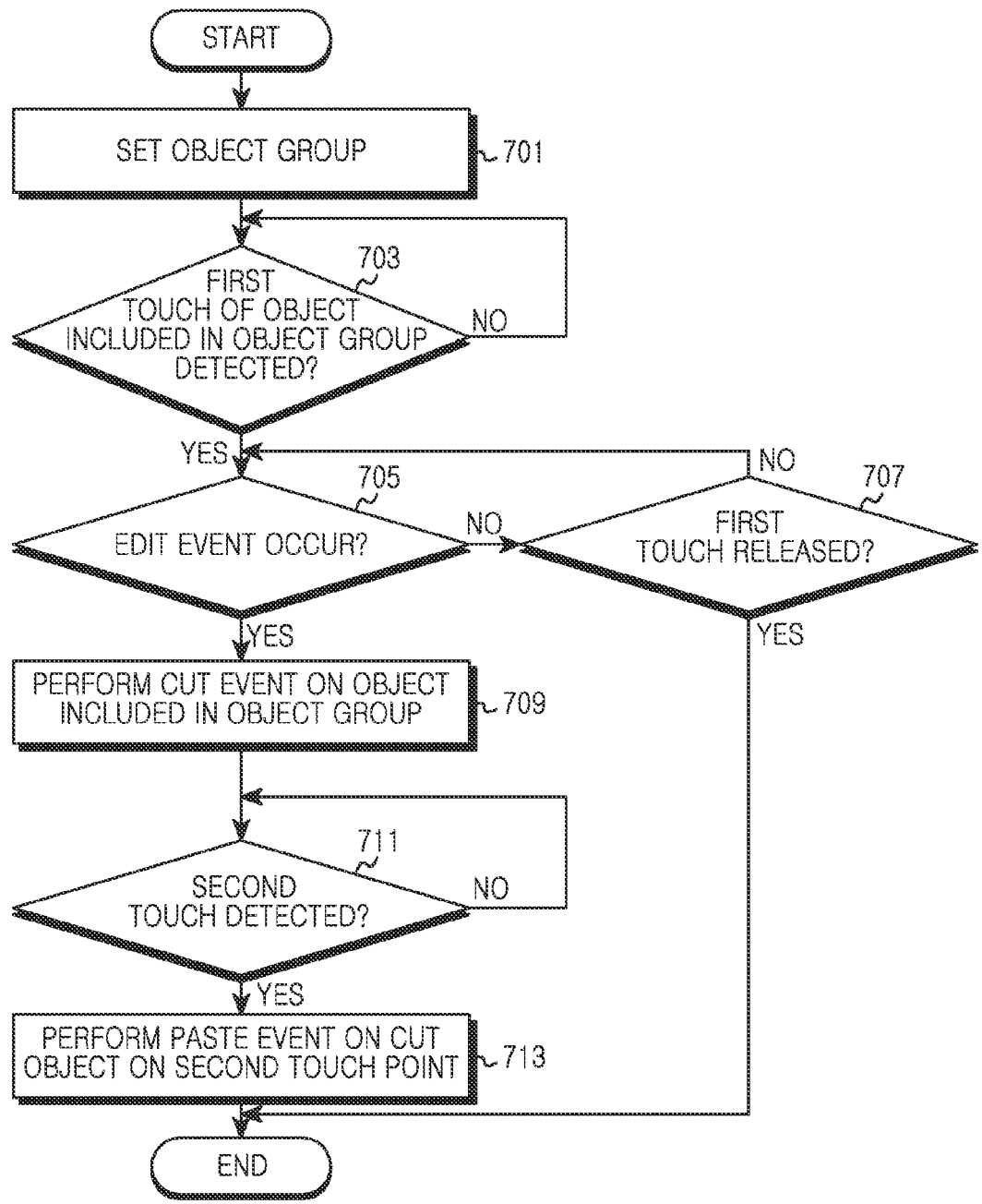
FIG. 7 is a flowchart illustrating a procedure for editing a plurality of display information using a sponge edit method in an electronic device according to an embodiment of the present disclosure.

FIG. 7 is a flowchart illustrating a procedure for editing a plurality of display information using a sponge edit method in an electronic device according to an embodiment of the present disclosure.

Referring to FIG. 7, the electronic device may set an object group in operation 701. For example, the electronic device may recognize at least one object included in an object select region set by considering multi-touched points detected via the touch input 154 as the object group. For another example, the electronic device may recognize at least one object included in an object select region set by consideration of a touch point and drag information detected via the touch input unit 154 as the object group. For still another example, the electronic device may recognize at least one object included in an object select region set by considering touched points successively detected via the touch input unit 154 as an object group 1301. For still further another example, when detecting an object select event, the electronic device may switch to an object select mode. At this point, the electronic device may recognize at least one object selected in the object select mode as the object group.

After setting the object group, the electronic device may proceed to operation 703 to determine whether a touch of at least one object among one or more objects included in the object group is detected.

When detecting a touch of an object included in the object group, the electronic device may proceed to operation 705 to determine whether an edit event occurs with a touch of the object included in the object group maintained. Here, the electronic device may determine whether a cut event occurs by considering at least one of button input information of the touch pen, hardware button input information of the electronic device, icon selection information, motion detection information of the electronic device, user gesture detection information, etc.

In the case where an edit event does not occur, the electronic device may proceed to operation 707 to determine whether a touch of the object included in the object group is released.

In the case where the touch of the object included in the object group is released, the electronic device may recognize it does not perform editing on the object group. Accordingly, the electronic device may end the present algorithm.

In the case where the touch of the object included in the object group is not released, the electronic device may proceed to operation 705 to determine whether an edit event occurs with the touch of the object included in the object group maintained.

In the case where an edit event occurs with the touch of the object included in the object group maintained in operation 705, the electronic device may proceed to operation 709 to cut the object included in the object group. At this point, the electronic device generates an animation effect as if objects included in the object group were absorbed into the touch pen or the finger according to the sponge edit method. Additionally, the electronic device may generate a sound as if the objects included in the object group were absorbed into the touch pen or the finger according to the sponge edit method. Here, the electronic device may store cut object information in the data storage 112.

After that, the electronic device may proceed to operation 711 to determine whether a second touch is detected. For example, the electronic device may determine whether the second touch is detected via the touch input unit 154.

When detecting the second touch, the electronic device may proceed to operation 713 to paste the object included in the object group on the second touch point. For example, the electronic device may generate an animation effect as if objects included in the object group were emitted from the touch pen or the finger that has touched the second touch point according to the sponge edit method and display the objects included in the object group on the second touch point. Additionally, the electronic device may generate a sound as if the objects included in the object group were emitted according to the sponge edit method.

As described above, the electronic device may paste the cut objects of the object group on the second touch point. At this point, the electronic device may paste the cut objects of the object group by considering whether an object exists on the second touch point. For example, in the case where another object exists on the second touch point, the electronic device may change the position of another object existing on the second touch point and paste the cut objects of the object group on the second touch point. For another example, the electronic device may change the paste position of the cut objects of the object group to a point on which another object does not exist, and paste the objects.

Figure 8:
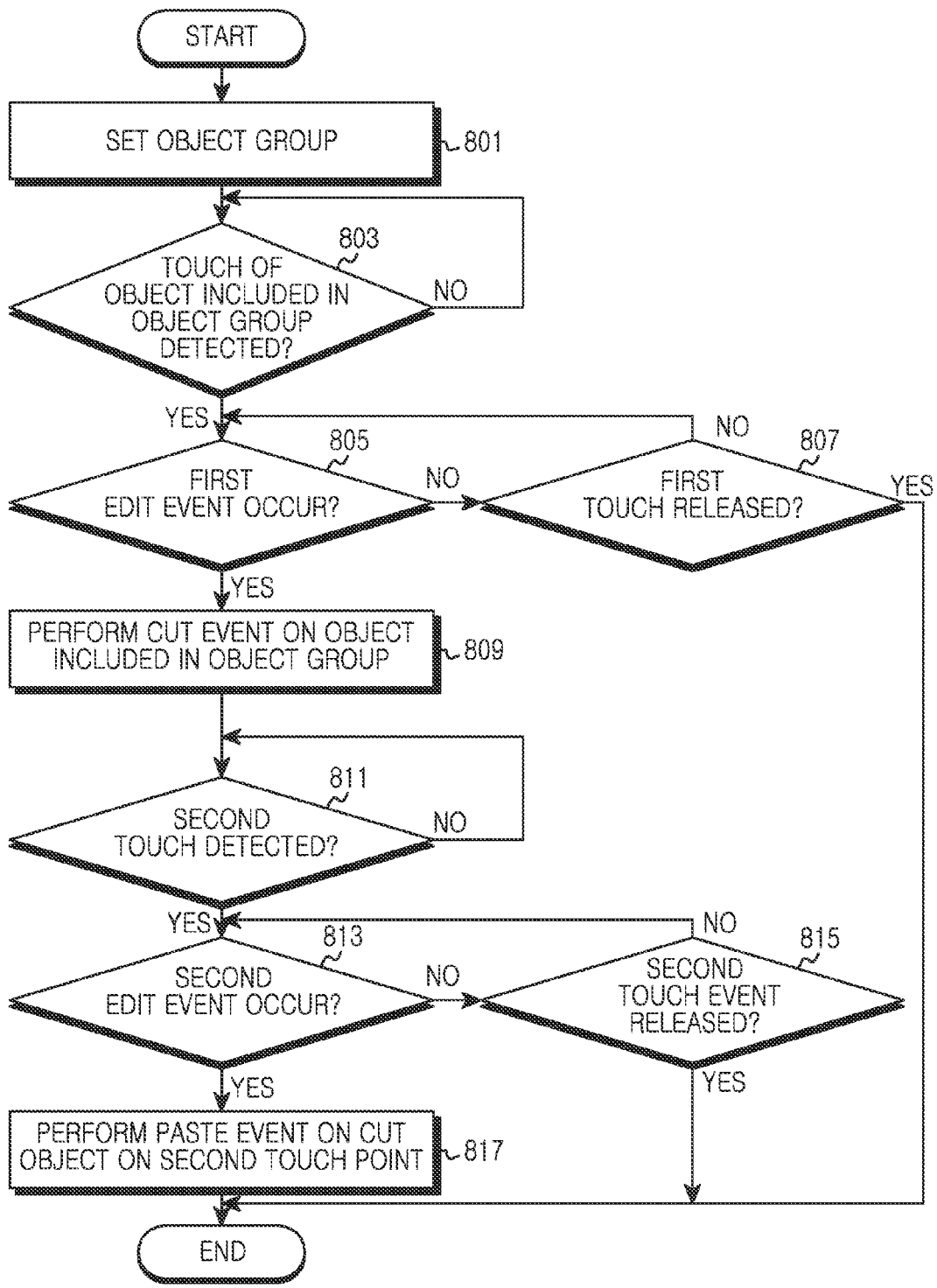
FIG. 8 is a flowchart illustrating a procedure for editing a plurality of display information using a sponge edit method in an electronic device according to an embodiment of the present disclosure.

FIG. 8 is a flowchart illustrating a procedure for editing a plurality of display information using a sponge edit method in an electronic device according to another embodiment of the present disclosure.

Referring to FIG. 8, the electronic device may set an object group in operation 801. For example, the electronic device may recognize at least one object included in an object select region set by considering multi-touched points detected via the touch input 154 as the object group. For another example, the electronic device may recognize at least one object included in an object select region set by considering a touch point and drag information detected via the touch input unit 154 as the object group. For still another example, the electronic device may recognize at least one object included in an object select region set by considering touched points successively detected via the touch input unit 154 as an object group 1301. For still further another example, when detecting an object select event, the electronic device may switch to an object select mode. At this point, the electronic device may recognize at least one object selected in the object select mode as the object group.

After setting the object group, the electronic device may proceed to operation 803 to determine whether a touch of at least one object among one or more objects included in the object group is detected.

When detecting a touch of an object included in the object group, the electronic device may proceed to operation 805 to determine whether an edit event occurs with a touch of the object included in the object group maintained. For example, with the touch of the object included in the object group maintained, the electronic device may determine whether a cut event occurs by considering at least one of button input information of the touch pen, hardware button input information of the electronic device, icon selection information, motion detection information of the electronic device, user gesture detection information, etc.

In the case where an edit event does not occur, the electronic device may proceed to operation 807 to determine whether a touch of the object included in the object group is released.

In the case where the touch of the object included in the object group is released, the electronic device may recognize it does not perform editing on the object group. Accordingly, the electronic device may end the present algorithm.

In the case where the touch of the object included in the object group is not released, the electronic device may proceed to operation 805 to determine whether an edit event occurs with the touch of the object included in the object group maintained.

In the case where an edit event occurs with the touch of the object included in the object group maintained in operation 805, the electronic device may proceed to operation 809 to cut the object included in the object group. At this point, the electronic device generates an animation effect as if objects included in the object group were absorbed into the touch pen or the finger according to the sponge edit method. Additionally, the electronic device may generate a sound as if the objects included in the object group were absorbed into the touch pen or the finger according to the sponge edit method. Here, the electronic device may store cut object information in the data storage 112.

After that, the electronic device may proceed to operation 811 to determine whether a second touch is detected. For example, the electronic device may determine whether the second touch is detected via the touch input unit 154.

When detecting the second touch, the electronic device may proceed to operation 813 to determine whether a second edit event occurs with the second touch maintained. Here, the electronic device may determine whether a paste event occurs by considering at least one of button input information of the touch pen, hardware button input information of the electronic device, icon selection information, motion detection information of the electronic device, user gesture detection information, etc.

In the case where the second edit event does not occur, the electronic device may proceed to operation 815 to determine whether the second touch is released.

In the case where the second touch is released, the electronic device may recognize it does not perform editing on an object group. Accordingly, the electronic device may end the present algorithm. At this point, the electronic device may restore the cut object group to a previous state of the cut event occurrence.

In the case where the second touch is not released, the electronic device may proceed to operation 813 to determine whether the second edit event occurs with the second touch maintained.

In the case where the second edit event occurs with the second touch maintained in operation 813, the electronic device may proceed to operation 817 to paste an object included in the object group on the second touch point. For example, the electronic device may generate an animation effect as if the objects included in the object group were emitted from the touch pen or the finger that has touched the second touch point according to the sponge edit method and display the objects included in the object group on the second touch point. The electronic device may generate a sound as if the objects included in the object group were emitted according to the sponge edit method.

FIGS. 17A, 17B, 17C, 17D, 17E, 17F, 17G, and 17H are views illustrating screen configuration for editing a plurality of icons using a touch pen in an electronic device according to an embodiment of the present disclosure.

Figure 17A:
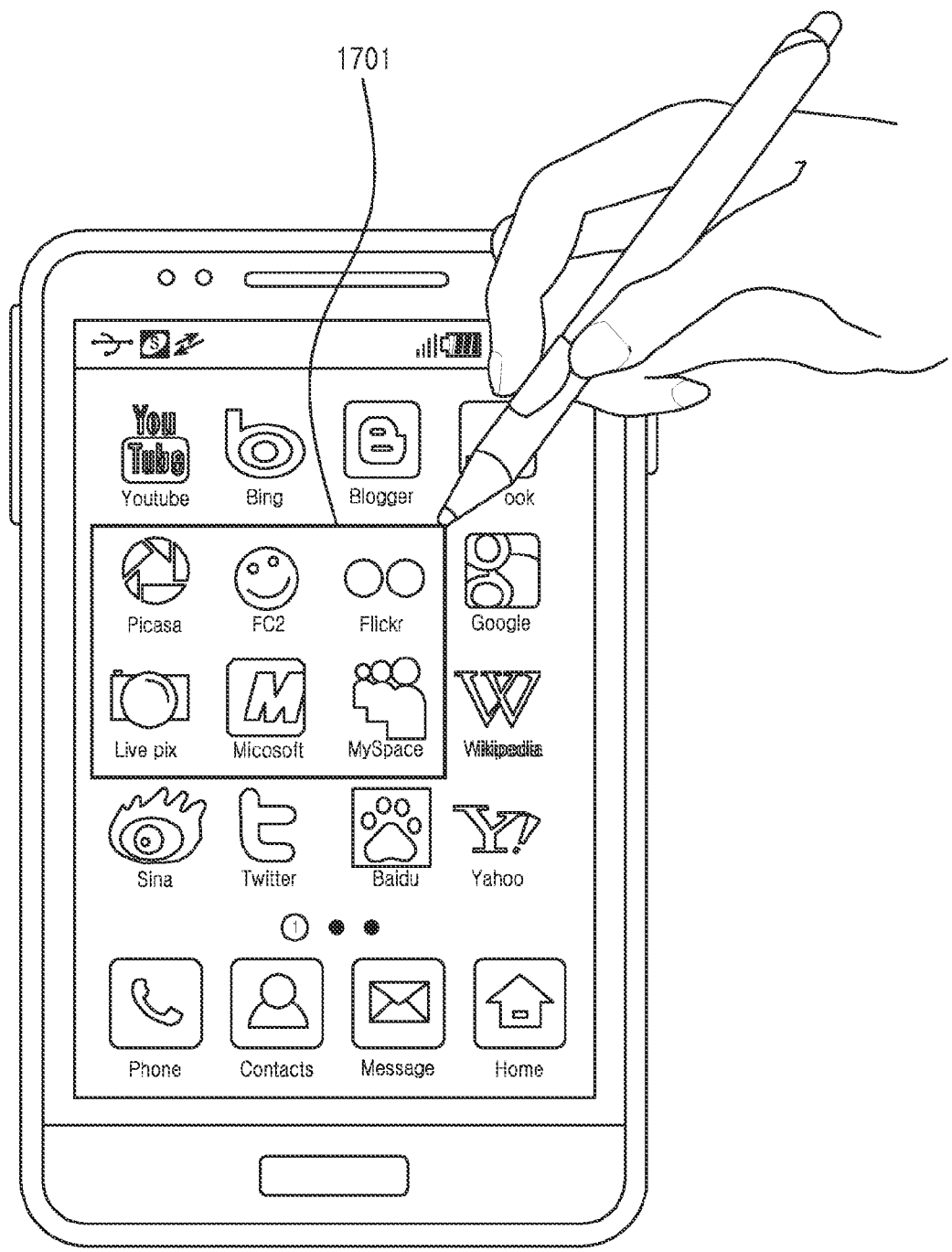
FIGS. 17A, 17B, 17C, 17D, 17E, 17F, 17G, and 17H are views illustrating a screen configuration for editing a plurality of icons using a touch pen in an electronic device according to an embodiment of the present disclosure.
Figure 17B:
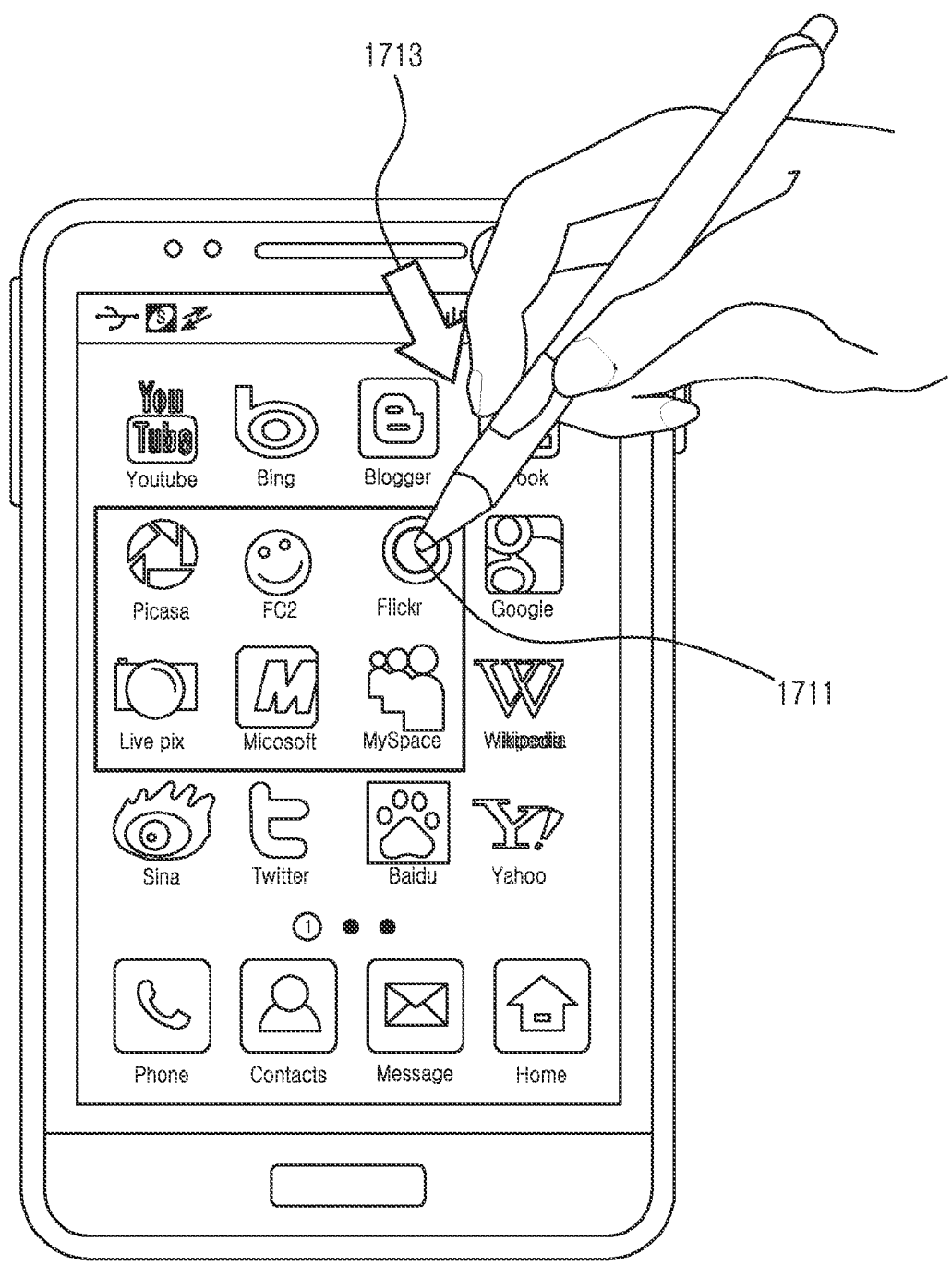
Figure 17C:
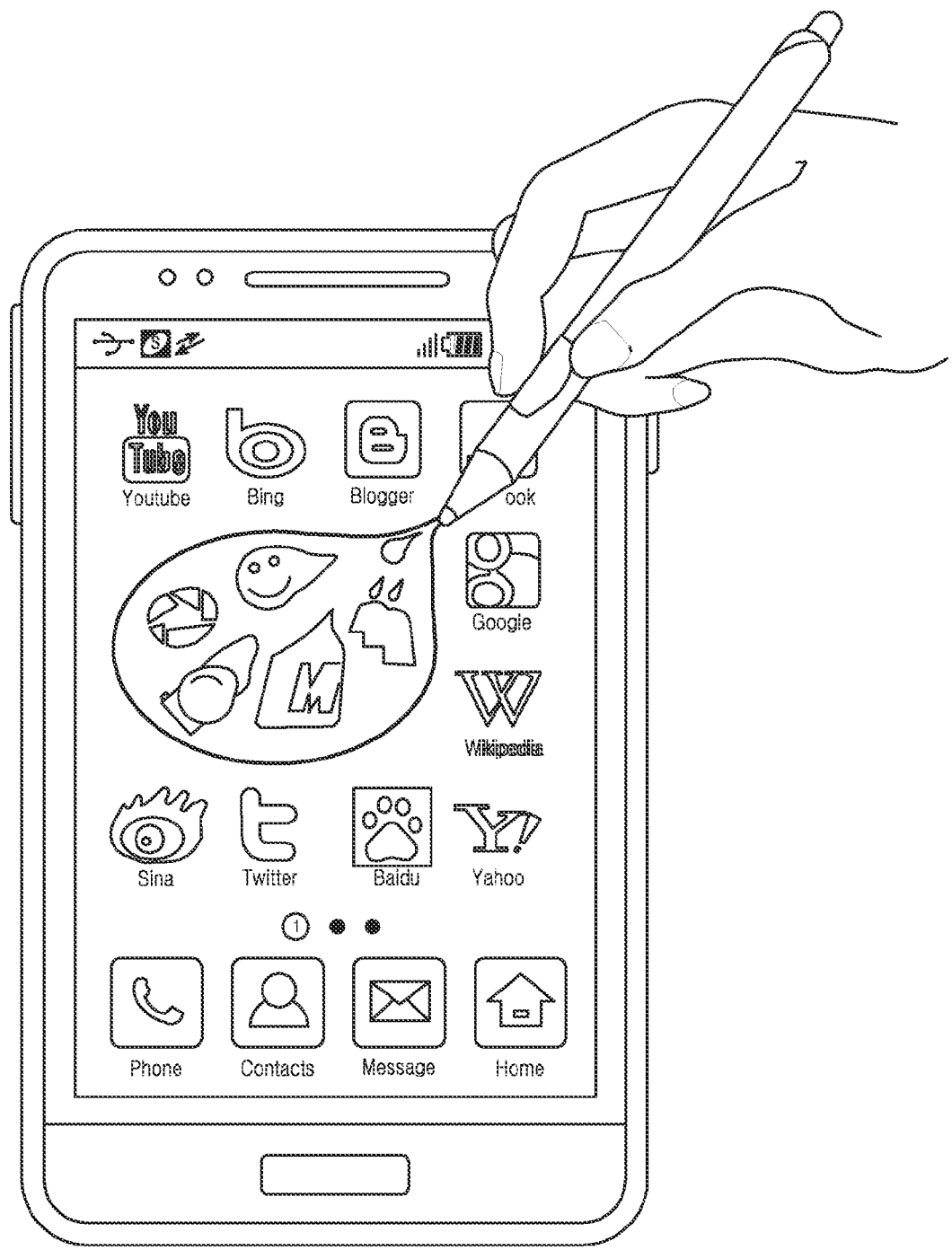

As described above, the electronic device may edit at least one object included in the object group by considering touch information detected via the touch input unit 154 and the edit event occur information. For example, as illustrated in FIG. 17A, the electronic device may set an object group 1701 by considering touch points successively detected via the touch input unit 154. After that, as illustrated in FIG. 17B, when detecting a button input 1713 of the touch pen with a touch 1711 of an icon "Flickr" included in an object group by the touch pen maintained, the electronic device may cut an icon "Picasa", an icon "FC2", an icon "Flickr", an icon "Line pix", an icon "Microsoft", and an icon "MySpace" included in the object group. At this point, as illustrated in FIG. 17C, the electronic device may cut the objects with an animation effect as if the objects included in the object group were absorbed into the touch pen like a sponge or pipette absorbing liquid. Similarly with an operation of absorbing liquid using a pipette, the electronic device may cut objects included in the object group using a sponge effect at a point at which a button input is released after the button input 1713 of the touch pen is detected.

Figure 17D:
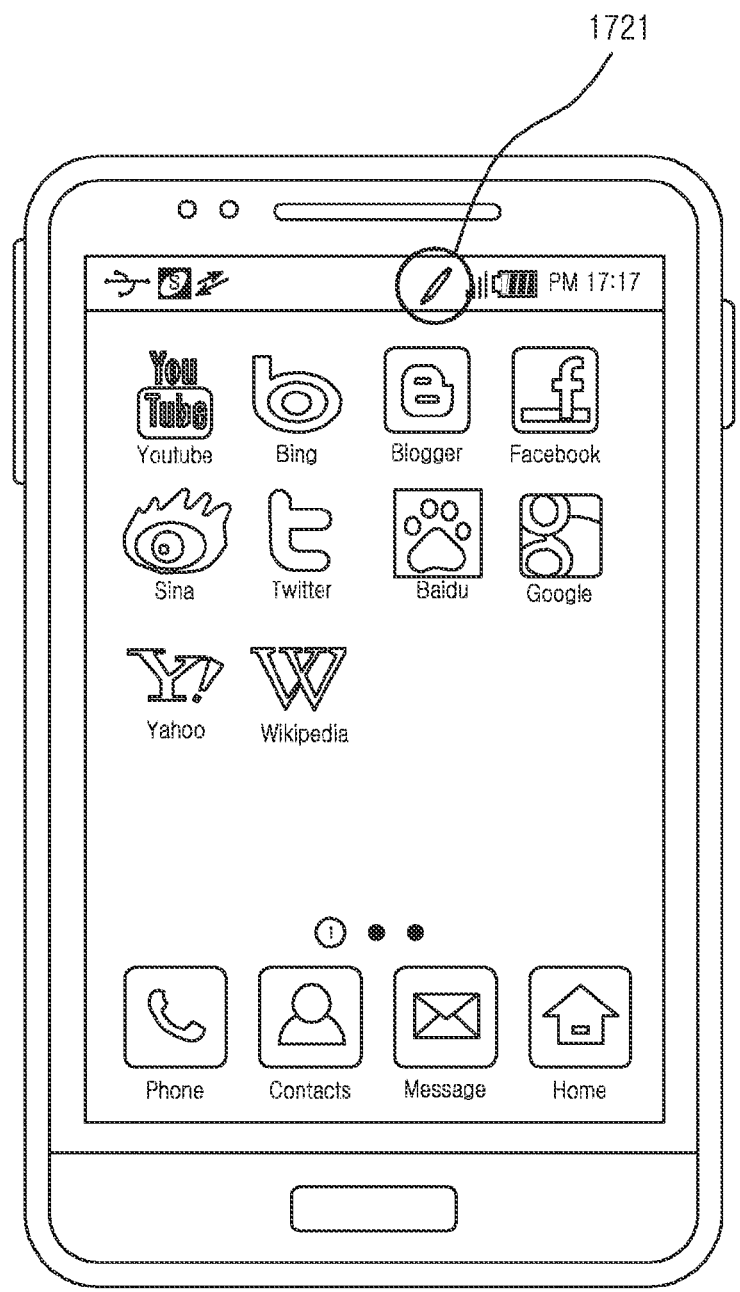

In case of cutting the object group, as illustrated in FIG. 17D, the electronic device may rearrange objects displayed on the display unit 152. As illustrated in FIG. 17D, the electronic device may display a notice icon 1721 representing whether a cut object exists. At this point, the notice icon 1721 may display the number of cut objects.

Figure 17E:
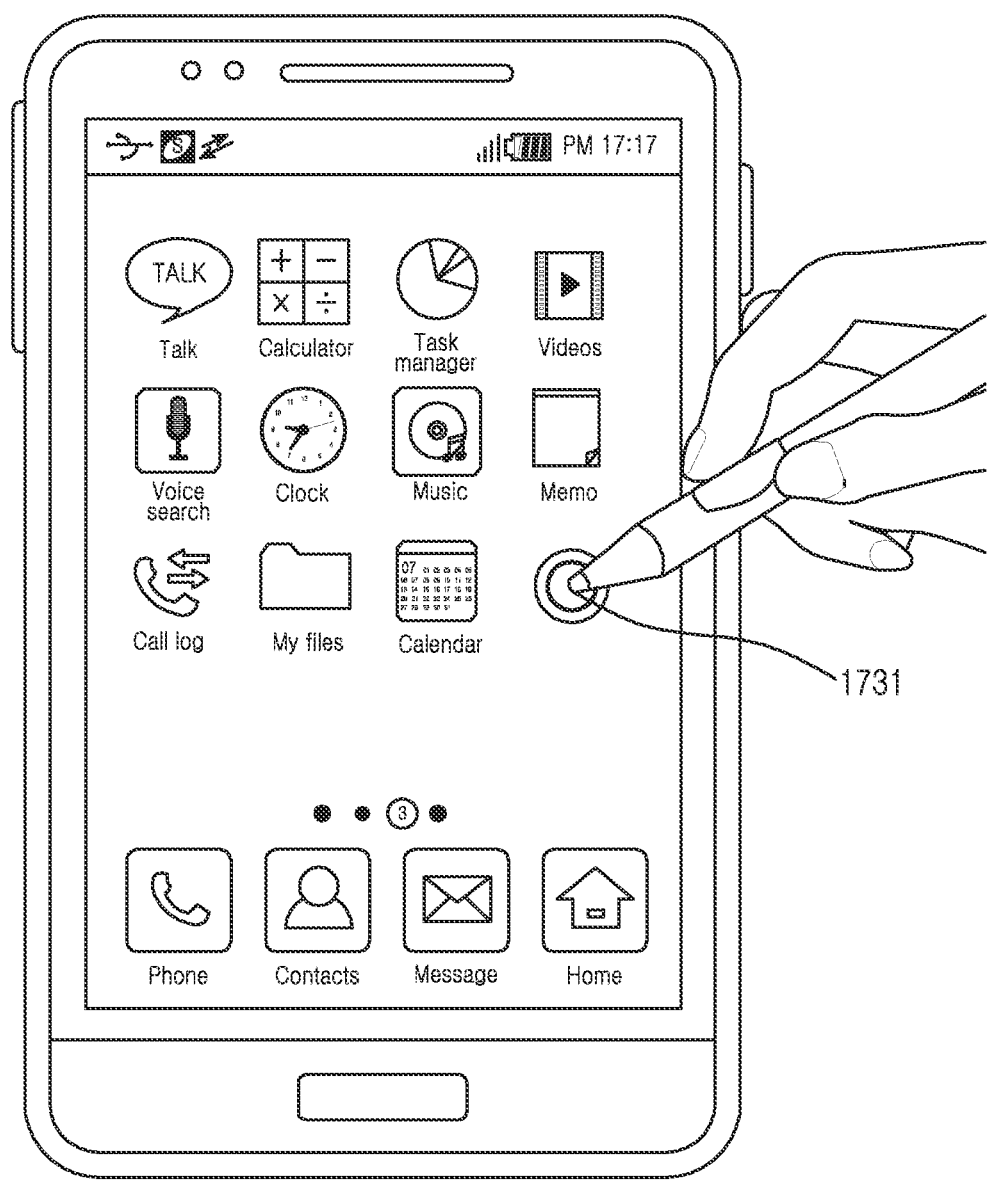
Figure 17F:
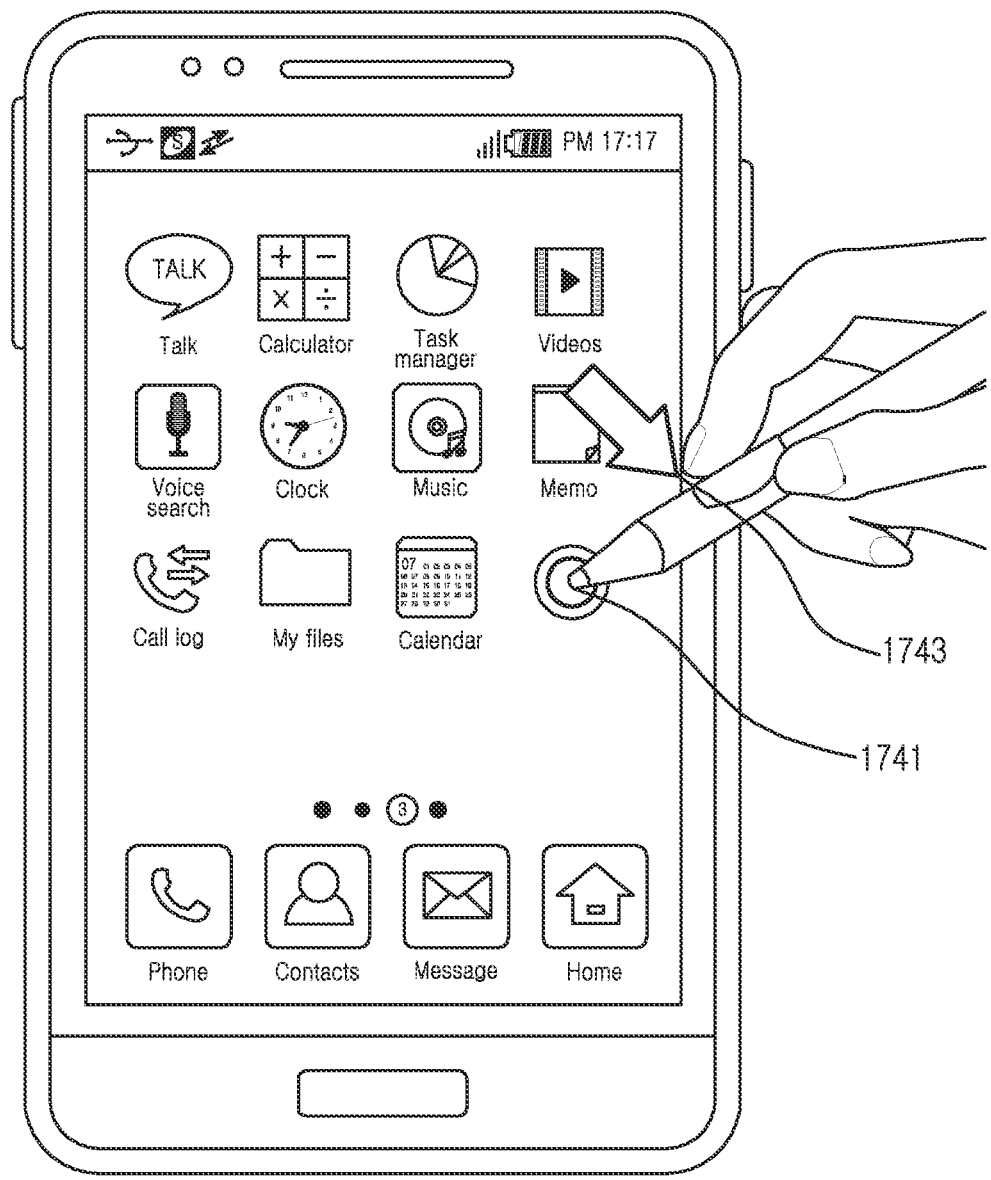
Figure 17G:
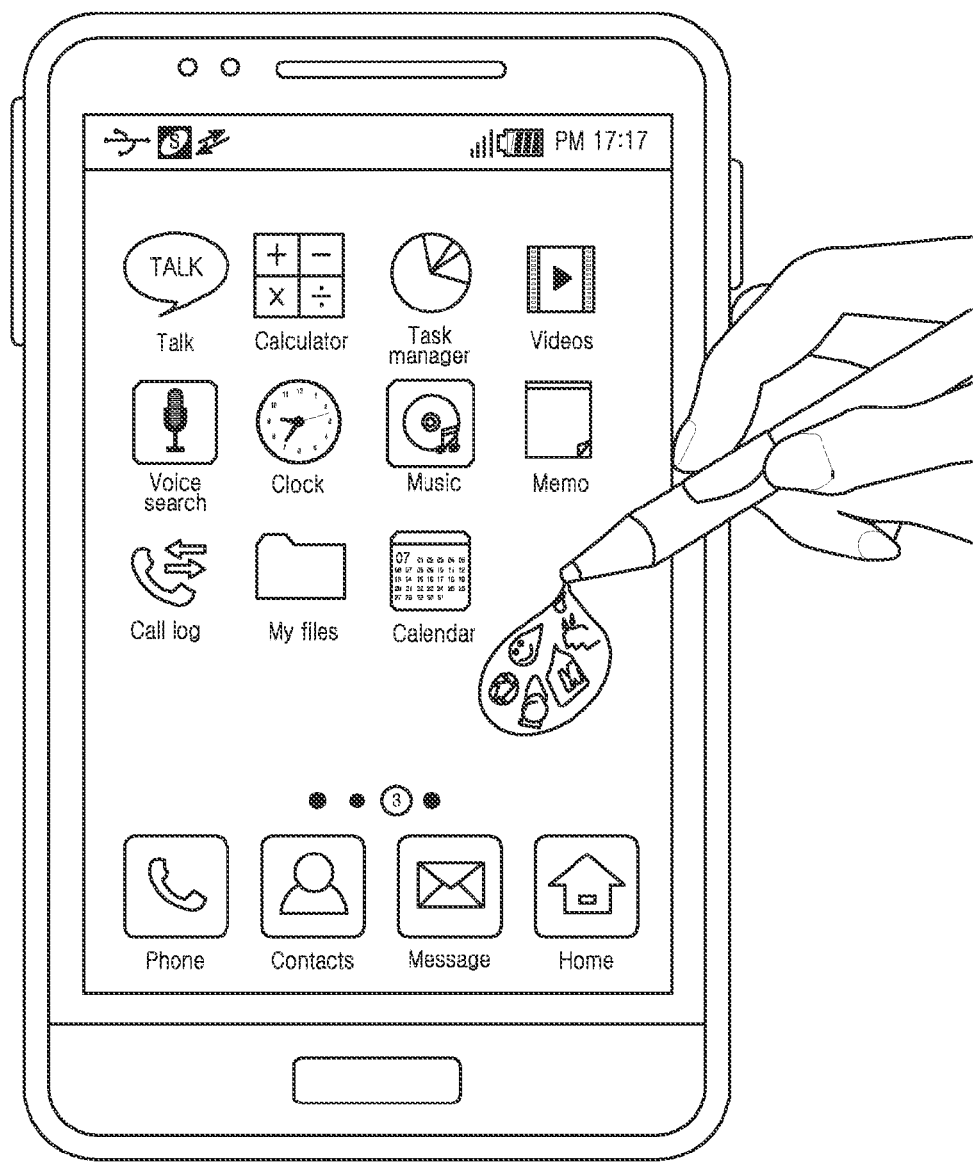
Figure 17H:

After cutting the object group, when detecting a second touch 1731 as illustrated in FIG. 17E, the electronic device may paste cut objects included in the object group on the second touch point as illustrated in FIG. 17H. At this point, the electronic device may paste the objects on the second touch point with an animation effect as if the objects included in the object group were emitted from the touch pen like a sponge or pipette emitting liquid.

After cutting the object group, when detecting a button input 1743 of the touch pen with a second touch 1741 maintained as illustrated in FIG. 17F, the electronic device may paste the cut objects included in the object group on the second touch point. At this point, as illustrated in FIG. 17G, the electronic device may paste the objects on the second touch point with an animation effect as if the objects included in the object group were emitted from the touch pen like a sponge or pipette emitting liquid.

Figure 18A:
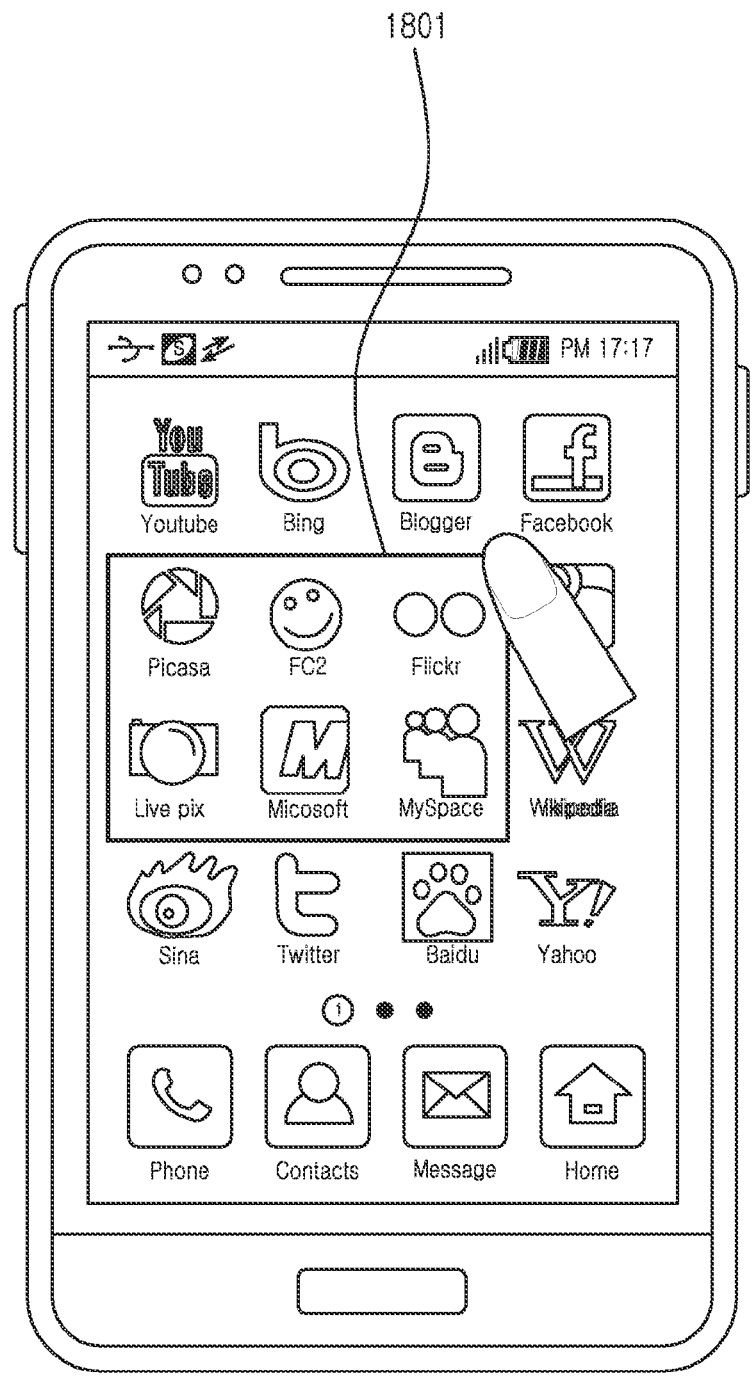
FIGS. 18A, 18B, 18C, 18D, 18E, and 18F are views illustrating a screen configuration for editing a plurality of icons using a hand touch in an electronic device according to an embodiment of the present disclosure.
Figure 18B:
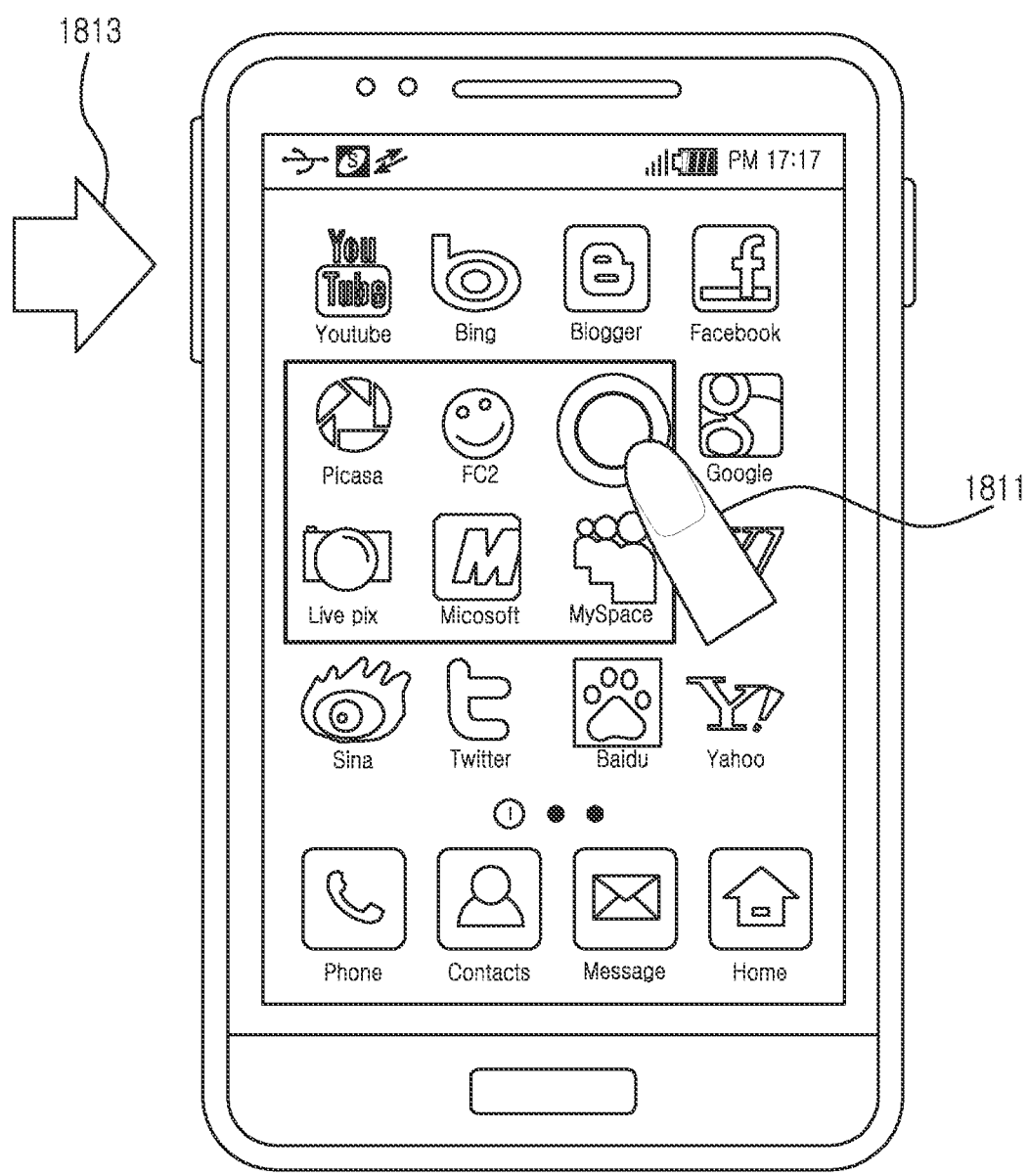
Figure 18C:

For another example, as illustrated in FIG. 18A, the electronic device may set an object group 1801 by considering touch points successively detected via the touch input unit 154. After that, as illustrated in FIG. 18B, when detecting a hardware button input 1813 of the electronic device with a touch 1811 of an icon "Flickr" included in the object group by a user's finger maintained, the electronic device may cut an icon "Picasa", an icon "FC2", an icon "Flickr", an icon "Line pix", an icon "Microsoft", and an icon "MySpace" included in the object group. At this point, as illustrated in FIG. 18C, the electronic device may cut the objects with an animation effect as if the objects included in the object group were absorbed into the finger like a sponge or pipette absorbing liquid. In case of cutting the object group, as illustrated in FIG. 17D, the electronic device may rearrange the objects displayed on the display unit 152. Also, as illustrated in FIG. 17D, the electronic device may display a notice icon 1721 representing whether a cut object exists. At this point, the notice icon 1721 may represent the number of cut objects.

Figure 18D:
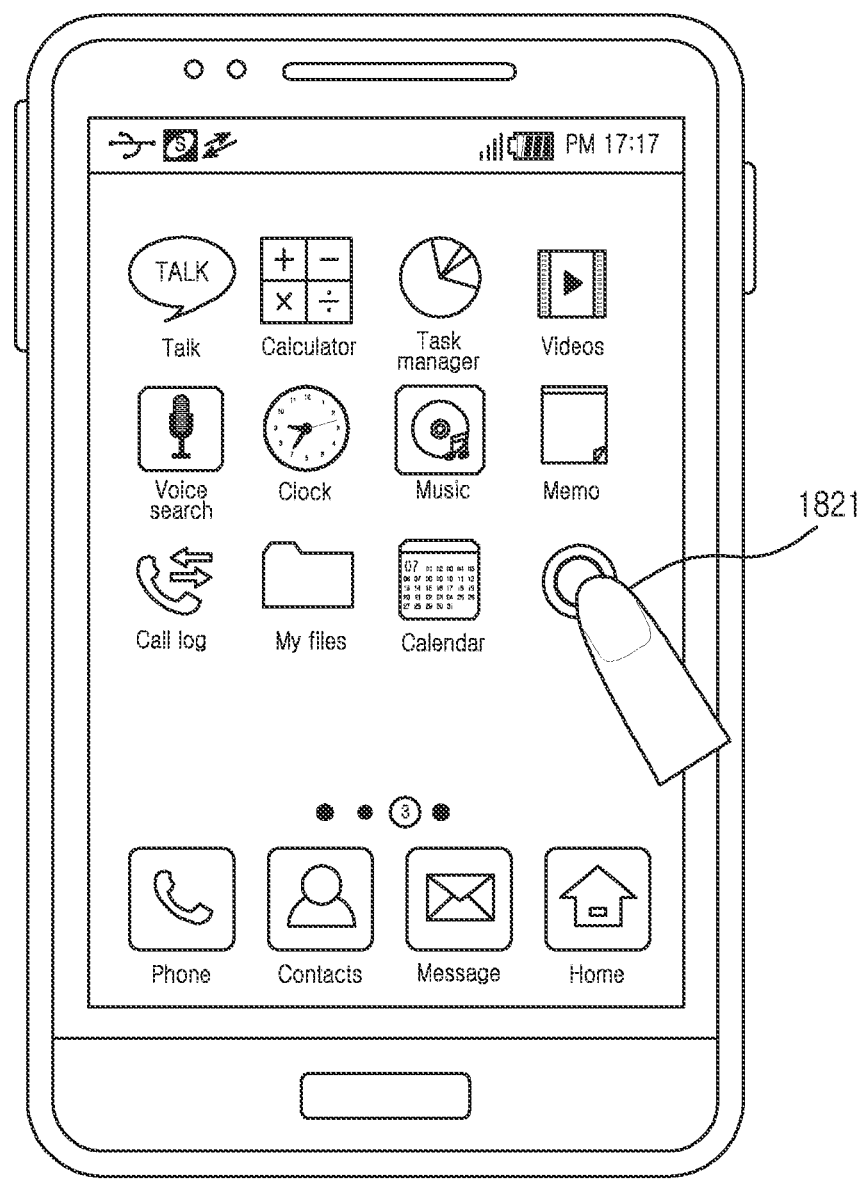

After cutting the object group, when detecting a second touch 1821 as illustrated in FIG. 18D, the electronic device may paste the cut objects included in the object group on the second touch point. At this point, as illustrated in FIG. 18F, the electronic device may paste the objects on the second touch point with an animation effect as if the objects included in the object group were emitted from the finger like a sponge or pipette emitting liquid.

Figure 18E:
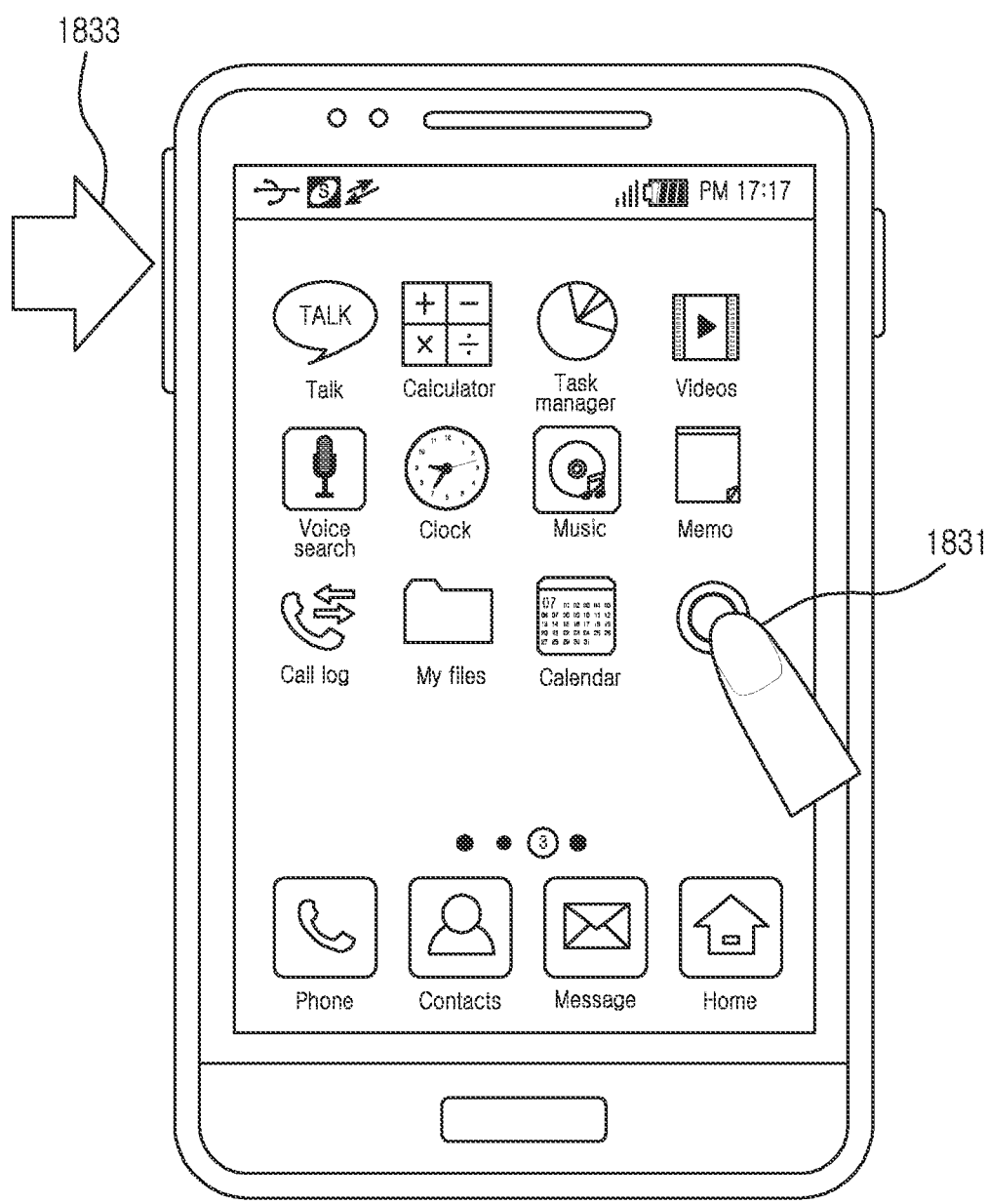
Figure 18F:
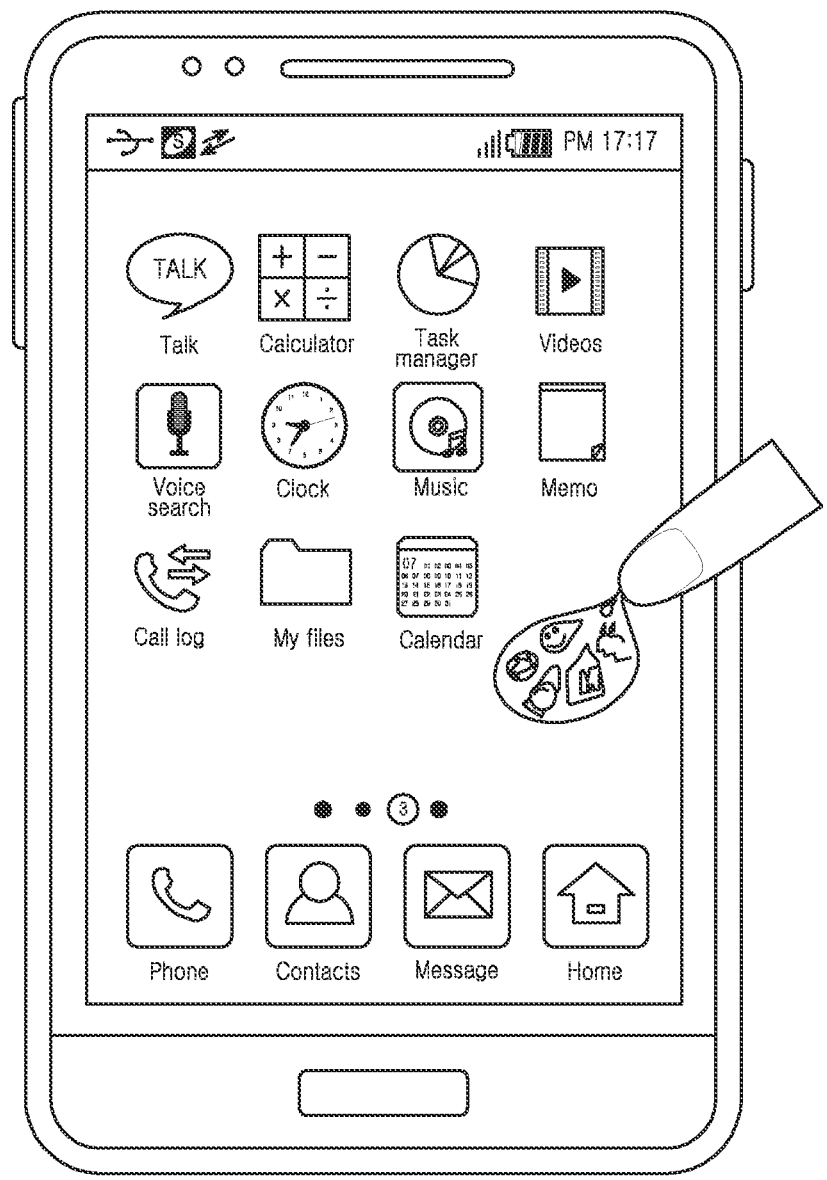

After cutting the object group, when detecting a hardware button input 1833 of the electronic device with a second touch 1831 maintained as illustrated in FIG. 18E, the electronic device may paste the cut objects included in the object group on the second touch point. At this point, as illustrated in FIG. 18F, the electronic device may paste the objects on the second touch point with an animation effect as if the objects included in the object group were emitted from the finger like a sponge or pipette emitting liquid.

Figure 9:
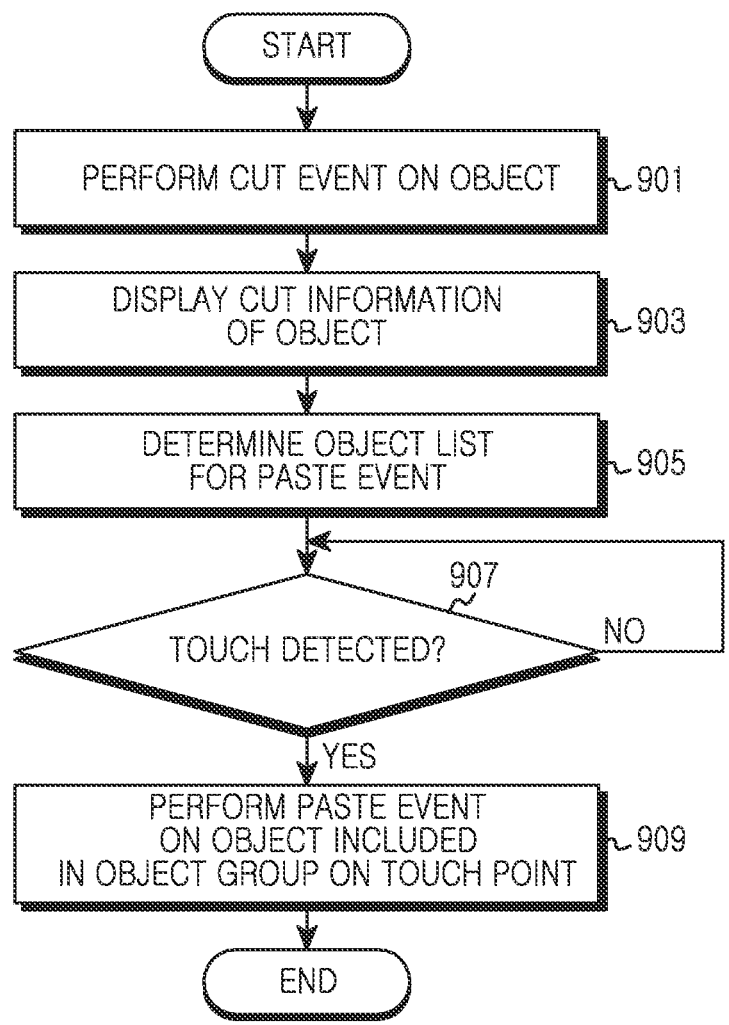
FIG. 9 is a flowchart illustrating a procedure for selectively editing display information using a sponge edit method in an electronic device according to an embodiment of the present disclosure.
Figure 19A:
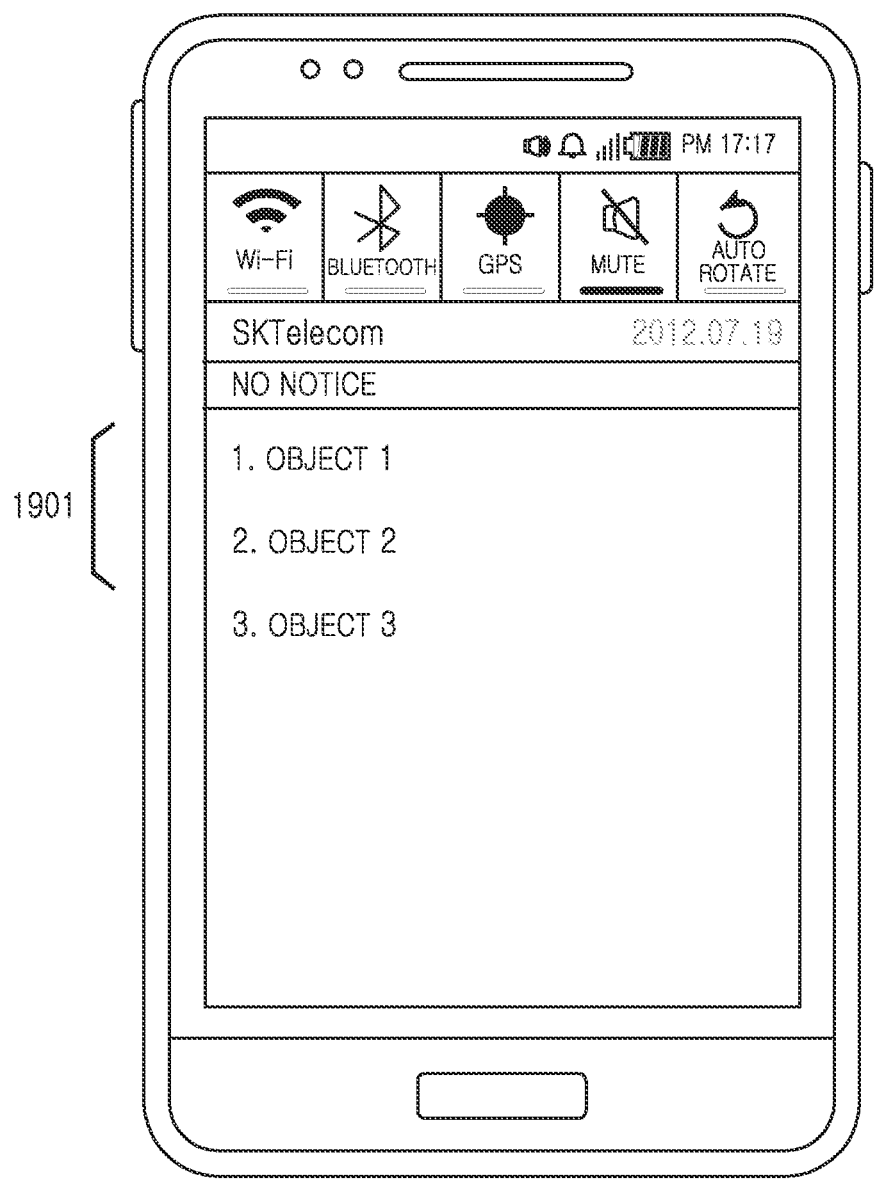
FIGS. 19A, 19B, and 19C are views illustrating screen configuration for displaying a plurality of edit lists in an electronic device according to an embodiment of the present disclosure.
Figure 19B:
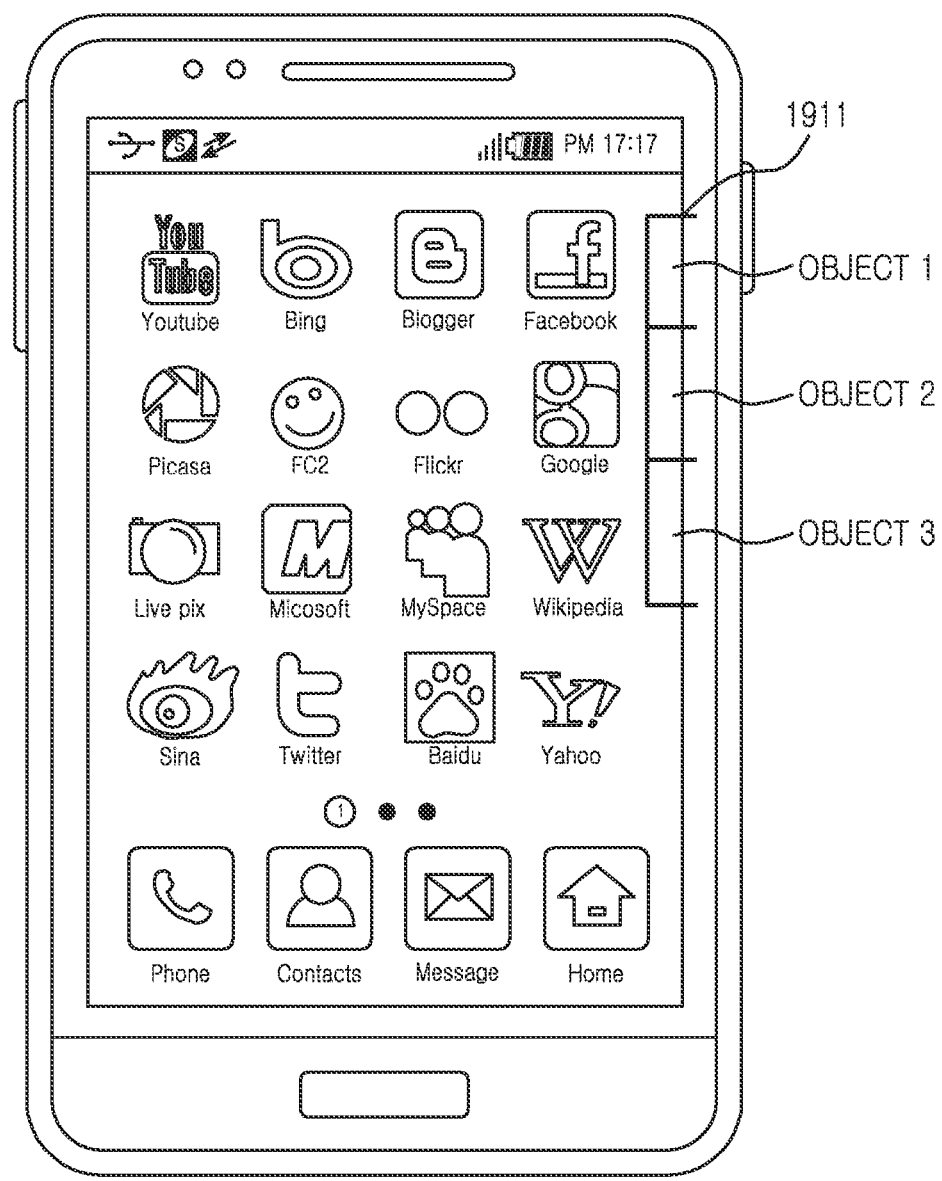
Figure 19C:
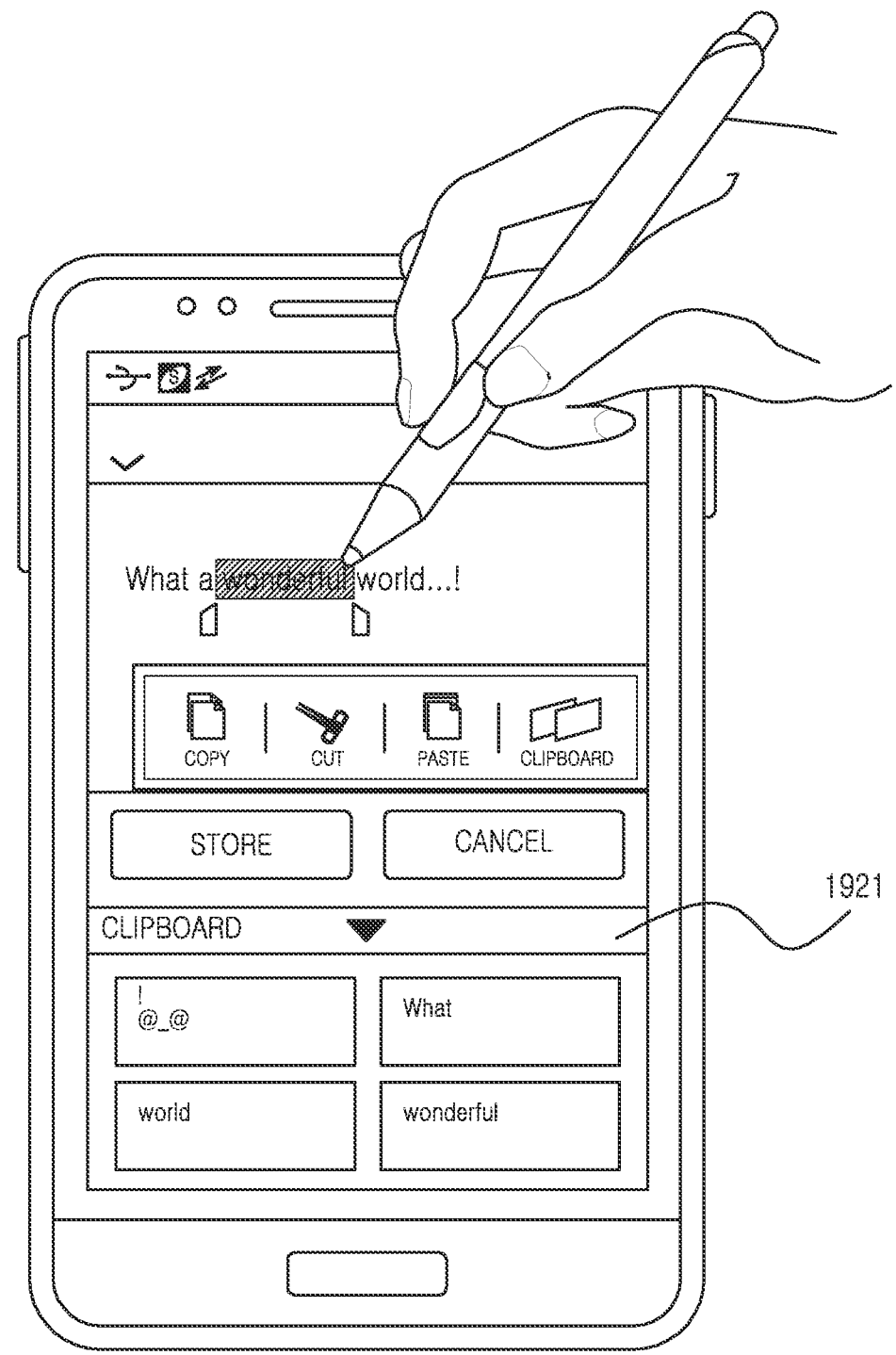

FIG. 9 is a flowchart illustrating a procedure for selectively editing display information using a sponge edit method in an electronic device according to an embodiment of the present disclosure. FIGS. 19A, 19B, and 19C are views illustrating screen configuration for displaying a plurality of edit lists in an electronic device according to an embodiment of the present disclosure.

Referring to FIG. 9, the electronic device may perform a cut event on an object in operation 901. For example, in the case where a cut event occurs by maintaining of a touch of an object by the touch pen or the finger as illustrated in FIGS. 3 to 6, the electronic device may cut the touched object. For another example, in the case where a cut event occurs by maintaining of a touch of an object included in an object group by the touch pen or the finger as illustrated in FIGS. 7 and 8, the electronic device may cut the objects included in the object group.

In case of performing a cut event on an object, the electronic device may proceed to operation 903 to display cut information of the object on the display unit 152. For example, the electronic device may display whether a cut object exists and the number of cut objects using a notice icon as illustrated in FIGS. 11C, 13C, 15C, and 17C. When detecting selection of the notice icon, the electronic device may display a list of cut objects on the display unit 152. For another example, in the case where a notice bar is executed, the electronic device may display a list 1901 of cut objects on the notice bar as illustrated in FIG. 19A. For still another example, in the case where a cut object exists, the electronic device may display a list of cut objects using a separate popup window 1911 as illustrated in FIG. 19B. For yet another example, the electronic device may set a portion of the display unit 152 as a region 1921 for displaying a list of cut objects and display the list of cut objects as illustrated in FIG. 19C.

After displaying cut information on the display unit 152, the electronic device may proceed to operation 905 to determine an object list on which it will perform a paste event. For example, the electronic device may select at least one object to paste among one or more cut objects.

After that, the electronic device may proceed to operation 907 to determine whether a touch is detected.

When detecting a touch, the electronic device may proceed to operation 909 to paste an object included in the object list on which it will perform a paste event in operation 905 on the touch point. For example, the electronic device may generate an animation effect as if objects included in the object list were emitted from the touch pen or the finger that has touched the touch point according to the sponge edit method and display the objects included in the object list on the touch point. Additionally, the electronic device may generate a sound as if the objects included in the object list were emitted according to the sponge edit method.

Figure 10:
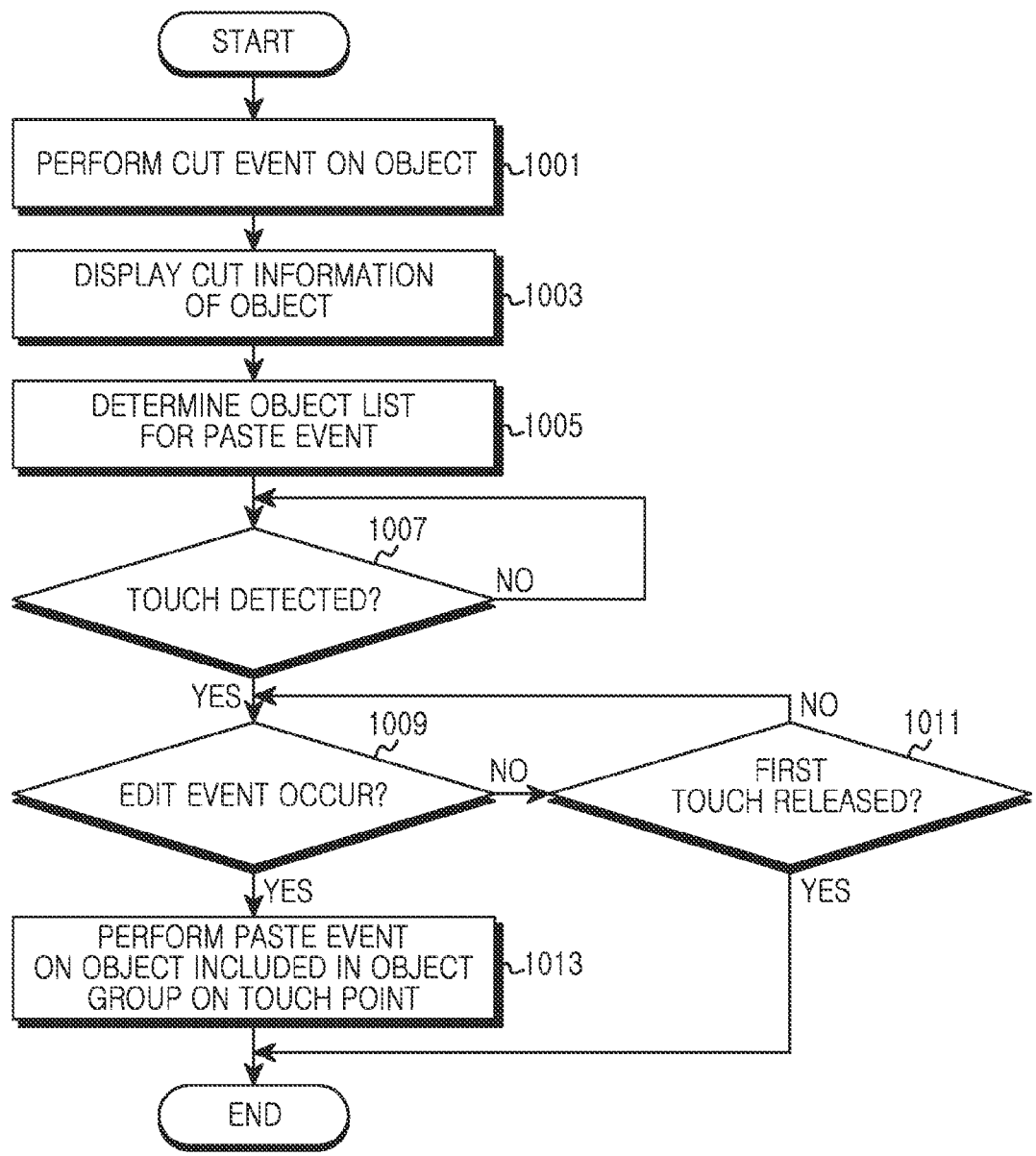
FIG. 10 is a flowchart illustrating a procedure for selectively editing display information using a sponge edit method in an electronic device according to an embodiment of the present disclosure.

FIG. 10 is a flowchart illustrating a procedure for selectively editing display information using a sponge edit method in an electronic device according to another embodiment of the present disclosure.

Referring to FIG. 10, the electronic device may perform a cut event on an object in operation 1001. For example, in the case where a cut event occurs by maintaining of a touch of an object by the touch pen or the finger as illustrated in FIGS. 3 to 6, the electronic device may cut the touched object. For another example, in the case where a cut event occurs by maintaining of a touch of an object included in an object group by the touch pen or the finger as illustrated in FIGS. 7 and 8, the electronic device may cut objects included the object group.

In case of performing a cut event on an object, the electronic device may proceed to operation 1003 to display cut information of the object on the display unit 152. For example, the electronic device may display whether a cut object exists and the number of cut objects using a notice icon as illustrated in FIGS. 11C, 13C, 15C, and 17C. When detecting selection of the notice icon, the electronic device may display a list of cut objects on the display unit 152. For another example, in the case where a notice bar is executed, the electronic device may display a list 1901 of cut objects on the notice bar as illustrated in FIG. 19A. For still another example, in the case where a cut object exists, the electronic device may display a list of cut objects using a separate popup window 1911 as illustrated in FIG. 19B. For yet another example, the electronic device may set a portion of the display unit 152 as a region 1921 for displaying a list of cut objects and display the list of cut objects as illustrated in FIG. 19C.

After displaying cut information on the display unit 152, the electronic device may proceed to operation 1005 to determine an object list on which it will perform a paste event. For example, the electronic device may select at least one object to paste among one or more cut objects.

After that, the electronic device may proceed to operation 1007 to determine whether a touch is detected.

When detecting a touch, the electronic device may proceed to operation 1009 to determine whether an edit event occurs with the touch maintained. Here, the electronic device may determine whether a paste event occurs by considering at least one of button input information of the touch pen, hardware button input information of the electronic device, icon selection information, motion detection information of the electronic device, user gesture detection information, etc.

In the case where an edit event does not occur, the electronic device may proceed to operation 1011 to determine whether the touch is released.

In the case where the touch is released, the electronic device may recognize it does not perform editing on the object. Accordingly, the electronic device may end the present algorithm. At this point, the electronic device may restore the cut object group to a previous state of the cut event occurrence.

In the case where the touch is not released, the electronic device may proceed to operation 1009 to determine whether an edit event occurs with the touch maintained.

In the case where an edit event occurs with the touch maintained in operation 1009, the electronic device may proceed to operation 1013 to paste an object included in the object list on which it will perform a paste event in operation 1005 on the touch point. For example, the electronic device may generate an animation effect as if objects included in the object list were emitted from the touch pen or the finger that has touched the touch point according to the sponge edit method and display the objects included in the object list on the touch point. Additionally, the electronic device may generate a sound as if the objects included in the object list were emitted according to the sponge edit method.

After that, the electronic device may end the present algorithm.

In the above embodiments, the electronic device generates an animation effect as if a relevant object were absorbed into a touch pen or a finger that has touched the object. At this point, the electronic device may change a point into which the object is absorbed by considering the touch point.

As described above, the electronic device having the touchscreen may easily edit display information by editing the display information displayed on the display unit using a sponge effect, and arouse a user's emotional interest via the sponge effect.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    displaying a plurality of objects in a screen of the electronic device;
    detecting a touch input on a set of objects among the plurality of objects, wherein the touch input is caused by a stylus with a first state where a physical button of the stylus is pressed while the stylus is dragged from a starting point to an ending point, and wherein the set of objects are within a rectangular area having a corner at the starting point and a corner at the ending point;
    identifying, while the touch input is maintained, whether a state of the stylus is switched from the first state to a second state where the physical button of the stylus is released;
    in response to identifying that the state of the stylus is switched to the second state, storing information regarding the set of objects and displaying a visual effect of sucking the set of objects into a tip of the stylus;
    after the displaying of the visual effect, removing the set of objects from the screen and displaying, within an indicator area on the screen, a representation for notifying that the set of objects is cut;
    detecting another touch input on an empty space of the screen, wherein the other touch input is caused by the stylus with the second state;
    identifying, while the other touch input is maintained, whether the state of the stylus is switched from the second state to the first state;
    in response to identifying that the state of the stylus is switched to the first state, displaying another visual effect of gushing out the set of objects from the tip of the stylus; and
    after the displaying of the other visual effect, displaying the set of objects in the screen and ceasing to display, within the indicator area, the representation for notifying that the set of objects is cut.

2. The method of claim 1, wherein the set of objects comprises at least one of an application menu, an icon, a widget, text, or a reproduction list.

3. The method of claim 1, further comprising:
    outputting, while displaying the visual effect, an audio; and
    outputting, while displaying the other visual effect, another audio.

4. An electronic device comprising:
    a touch-screen;
    a memory storing instructions; and
    a processor, operably coupled to the touch-screen and the memory, configured to execute the stored instructions to:
        control the touch-screen to display a plurality of objects in a screen,
        detect a touch input on a set of objects among the plurality of objects, wherein the touch input is caused by a stylus with a first state where a physical button of the stylus is pressed while the stylus is dragged from a starting point to an ending point, and wherein the set of objects are within a rectangular area having a corner at the starting point and a corner at the ending point, identify, while the touch input is maintained, whether a state of the stylus is switched from the first state to a second state where the physical button of the stylus is released, in response to identifying that the state of the stylus is switched to the second state, store information regarding the set of objects and display a visual effect of sucking the set of objects up into a tip of the stylus, after the displaying of the visual effect, remove the set of objects from the screen and displaying, within an indicator area on the screen, a representation for notifying that the set of objects is cut;

detect another touch input on an empty space of the screen, wherein the other touch input is caused by the stylus with the second state, identify, while the other touch input is maintained, whether the state of the stylus is switched from the second state to the first state, in response to identifying that the state of the stylus is switched to the first state, display another visual effect of pushing out the set of objects from the tip of the stylus, and after the displaying of the other visual effect, display the set of objects in the screen and ceasing to display, within the indicator area, the representation for notifying that the set of objects is cut.

5. The electronic device of claim 4, wherein the set of objects comprises at least one of an application menu, an icon, a widget, text, or a reproduction list.

6. The electronic device of claim 4, further comprising:
a speaker operably coupled to the processor,
wherein the processor is further configured to execute the stored instructions to:
output, while displaying the visual effect, an audio via the speaker, and
output, while displaying the other visual effect, another audio via the speaker.

\* \* \* \* \*